(12) United States Patent
Sawant et al.

(10) Patent No.: US 11,153,406 B2
(45) Date of Patent: Oct. 19, 2021

(54) METHOD OF NETWORK PERFORMANCE VISUALIZATION OF SERVICE FUNCTION CHAINS

(71) Applicant: VMWARE, INC., Palo Alto, CA (US)

(72) Inventors: Sandesh Sawant, Pune (IN); Kantesh Mundaragi, Bangalore (IN); Stijn Vanveerdeghem, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/843,913

(22) Filed: Apr. 9, 2020

(65) Prior Publication Data
US 2021/0227041 A1    Jul. 22, 2021

(30) Foreign Application Priority Data
Jan. 20, 2020   (IN) .............................. 202041002329

(51) Int. Cl.
*H04L 29/08*    (2006.01)
*H04L 12/24*    (2006.01)

(52) U.S. Cl.
CPC .......... *H04L 67/2833* (2013.01); *H04L 41/22* (2013.01)

(58) Field of Classification Search
CPC ............................. H04L 67/2833; H04L 41/22
See application file for complete search history.

(56) References Cited

U.S. PATENT DOCUMENTS

| | | |
|---|---|---|
| 6,006,264 A | 12/1999 | Colby et al. |
| 6,104,700 A | 8/2000 | Haddock et al. |
| 6,154,448 A | 11/2000 | Petersen et al. |
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |

(Continued)

FOREIGN PATENT DOCUMENTS

| | | |
|---|---|---|
| CN | 1689369 A | 10/2005 |
| CN | 101594358 A | 12/2009 |

(Continued)

OTHER PUBLICATIONS

Non-Published Commonly Owned U.S. Appl. No. 17/067,635, filed Oct. 9, 2020, 65 pages, Nicira, Inc.

(Continued)

*Primary Examiner* — Adnan M Mirza
(74) *Attorney, Agent, or Firm* — Adeli LLP

(57) ABSTRACT

Some embodiments of the invention provide a method for monitoring a particular service chain that includes several services to perform on data messages passing through a network. The method provides a user interface to receive a selection of the particular service chain from a plurality of service chains. The particular service chain is implemented by several service paths, each of which includes several service nodes that implement the services of the service chain. The method generates a graphical display of the service paths through the service nodes, and as part of this graphical display, provides operational data relating to operations of the service nodes of the service paths. In some embodiments, the method also provides, as part of the graphical display, operational data relating to operations of individual service path.

35 Claims, 32 Drawing Sheets

(56) References Cited

U.S. PATENT DOCUMENTS

| | | |
|---|---|---|
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Haugsnes et al. |
| 8,966,024 B2 | 2/2015 | Koponen et al. |
| 8,966,029 B2 | 2/2015 | Zhang et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,009,289 B1 | 4/2015 | Jacob |
| 9,015,823 B2 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,191,293 B2 | 11/2015 | Iovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,514,941 B2 | 12/2019 | Zhang et al. |
| 10,516,568 B2 | 12/2019 | Jain et al. |
| 10,547,692 B2 | 1/2020 | Salgueiro et al. |
| 10,594,743 B2 | 3/2020 | Hong et al. |
| 10,609,091 B2 | 3/2020 | Hong et al. |
| 10,623,309 B1 | 4/2020 | Gampel et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,742,544 B2 | 8/2020 | Roeland et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,853,111 B1 | 12/2020 | Gupta et al. |
| 10,929,171 B2 | 2/2021 | Gokhale et al. |
| 10,938,716 B1 | 3/2021 | Chin et al. |
| 10,944,673 B2 | 3/2021 | Naveen et al. |
| 10,949,244 B2 | 3/2021 | Naveen et al. |
| 11,003,482 B2 | 5/2021 | Rolando et al. |
| 11,012,420 B2 | 5/2021 | Sevinc et al. |
| 11,075,839 B2 | 7/2021 | Zhuang et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |

(56) References Cited

U.S. PATENT DOCUMENTS

| | | |
|---|---|---|
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1* | 9/2011 | Rathod ............... G06Q 20/384 709/224 |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0291088 A1 | 10/2013 | Shieh et al. |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0336319 A1 | 12/2013 | Liu et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |

(56) References Cited

U.S. PATENT DOCUMENTS

| | | |
|---|---|---|
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0269717 A1 | 9/2014 | Thubert et al. |
| 2014/0269724 A1 | 9/2014 | Mehler et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0263901 A1 | 9/2015 | Kumar et al. |
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0365322 A1 | 12/2015 | Shatzkamer et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0149816 A1 | 5/2016 | Roach et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0205015 A1 | 7/2016 | Halligan et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0344565 A1 | 11/2016 | Batz et al. |
| 2016/0344621 A1 | 11/2016 | Roeland et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0026417 A1 | 1/2017 | Ermagan et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |

(56) References Cited

U.S. PATENT DOCUMENTS

| | | |
|---|---|---|
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0163531 A1 | 6/2017 | Kumar et al. |
| 2017/0163724 A1 | 6/2017 | Puri et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250902 A1 | 8/2017 | Rasanen et al. |
| 2017/0250917 A1 | 8/2017 | Ruckstuhl et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317926 A1 | 11/2017 | Penno et al. |
| 2017/0317954 A1 | 11/2017 | Masurekar et al. |
| 2017/0318097 A1 | 11/2017 | Drew et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0364794 A1 | 12/2017 | Mahkonen et al. |
| 2017/0373990 A1 | 12/2017 | Jeuk et al. |
| 2018/0027101 A1 | 1/2018 | Kumar et al. |
| 2018/0041524 A1 | 2/2018 | Reddy et al. |
| 2018/0063018 A1* | 3/2018 | Bosch ............... H04L 45/306 |
| 2018/0091420 A1 | 3/2018 | Drake et al. |
| 2018/0102919 A1 | 4/2018 | Hao et al. |
| 2018/0115471 A1 | 4/2018 | Curcio et al. |
| 2018/0123950 A1 | 5/2018 | Garg et al. |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa et al. |
| 2018/0191600 A1 | 7/2018 | Hecker et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0248713 A1 | 8/2018 | Zanier et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1 | 10/2018 | Leung et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028384 A1 | 1/2019 | Penno et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1 | 6/2019 | Jain et al. |
| 2019/0173851 A1 | 6/2019 | Jain et al. |
| 2019/0229937 A1 | 7/2019 | Nagarajan et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |
| 2020/0204492 A1 | 6/2020 | Sarva et al. |
| 2020/0213366 A1 | 7/2020 | Hong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0322271 A1 | 10/2020 | Jain et al. |
| 2020/0344088 A1 | 10/2020 | Selvaraj et al. |
| 2020/0358696 A1 | 11/2020 | Hu et al. |
| 2020/0366526 A1 | 11/2020 | Boutros et al. |
| 2020/0366584 A1 | 11/2020 | Boutros et al. |
| 2020/0382412 A1 | 12/2020 | Chandrappa et al. |
| 2020/0382420 A1 | 12/2020 | Suryanarayana et al. |
| 2021/0029088 A1 | 1/2021 | Mayya et al. |
| 2021/0044502 A1 | 2/2021 | Boutros et al. |
| 2021/0120080 A1 | 4/2021 | Mishra et al. |
| 2021/0135992 A1 | 5/2021 | Tidemann et al. |
| 2021/0136140 A1 | 5/2021 | Tidemann et al. |
| 2021/0136141 A1 | 5/2021 | Tidemann et al. |

FOREIGN PATENT DOCUMENTS

| | | |
|---|---|---|
| CN | 101729412 A | 6/2010 |
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |

(56) References Cited

FOREIGN PATENT DOCUMENTS

| WO | 2008095010 A1 | 8/2008 |
|---|---|---|
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |
| WO | 2020171937 A1 | 8/2020 |
| WO | 2021086462 A1 | 5/2021 |

OTHER PUBLICATIONS

Siasi, N., et al., "Container-Based Service Function Chain Mapping," 2019 SoutheastCon, Apr. 11-14, 2019, 6 pages, IEEE, Huntsville, AL, USA.

Author Unknown, "Datagram," Jun. 22, 2012, 2 pages, retrieved from https://web.archive.org/web/20120622031055/https://en.wikipedia.org/wiki/datagram.

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, Cisco.

Casado, Martin, et al., "Virtualizing the Network Forwarding Plane," Dec. 2010, 6 pages.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Non-Published Commonly Owned U.S. Appl. No. 16/444,826, filed Jun. 18, 2019, 125 pages, VMware, Inc.

Non-Published Commonly Owned U.S. Appl. No. 16/444,845, filed Jun. 18, 2019, 124 pages, VMware, Inc.

Non-Published Commonly Owned U.S. Appl. No. 16/444,884, filed Jun. 18, 2019, 98 pages, VMware, Inc.

Non-Published Commonly Owned U.S. Appl. No. 16/444,907, filed Jun. 18, 2019, 98 pages, VMware, Inc.

Non-Published Commonly Owned U.S. Appl. No. 16/444,927, filed Jun. 18, 2019, 99 pages, VMware, Inc.

Non-Published Commonly Owned U.S. Appl. No. 16/444,935, filed Jun. 18, 2019, 98 pages, VMware, Inc.

Non-Published Commonly Owned U.S. Appl. No. 16/444,956, filed Jun. 18, 2019, 98 pages, VMware, Inc.

Non-Published Commonly Owned U.S. Appl. No. 16/444,964, filed Jun. 18, 2019, 98 pages, VMware, Inc.

Non-Published Commonly Owned U.S. Appl. No. 16/444,978, filed Jun. 18, 2019, 98 pages, VMware, Inc.

Non-Published Commonly Owned U.S. Appl. No. 16/444,989, filed Jun. 18, 2019, 98 pages, VMware, Inc.

Non-Published Commonly Owned U.S. Appl. No. 16/445,004, filed Jun. 18, 2019, 98 pages, VMware, Inc.

Non-Published Commonly Owned U.S. Appl. No. 16/445,016, filed Jun. 18, 2019, 99 pages, VMware, Inc.

Non-Published Commonly Owned U.S. Appl. No. 16/445,023, filed Jun. 18, 2019, 99 pages, VMware, Inc.

Non-Published Commonly Owned U.S. Appl. No. 16/445,031, filed Jun. 18, 2019, 99 pages, VMware, Inc.

Non-Published Commonly Owned U.S. Appl. No. 16/445,035, filed Jun. 18, 2019, 98 pages, VMware, Inc.

Non-Published Commonly Owned U.S. Appl. No. 16/445,044, filed Jun. 18, 2019, 98 pages, VMware, Inc.

Non-Published Commonly Owned U.S. Appl. No. 16/445,051, filed Jun. 18, 2019, 99 pages, VMware, Inc.

Non-Published Commonly Owned U.S. Appl. No. 16/445,058, filed Jun. 18, 2019, 99 pages, VMware, Inc.

Non-Published Commonly Owned U.S. Appl. No. 16/445,062, filed Jun. 18, 2019, 98 pages, VMware, Inc.

Non-Published Commonly Owned U.S. Appl. No. 16/445,064, filed Jun. 18, 2019, 99 pages, VMware, Inc.

Non-Published Commonly Owned U.S. Appl. No. 16/668,477, filed Oct. 30, 2019, 31 pages, VMware, Inc.

Non-Published Commonly Owned U.S. Appl. No. 16/668,485, filed Oct. 30, 2019, 55 pages, VMware, Inc.

Non-Published Commonly Owned U.S. Appl. No. 16/668,505, filed Oct. 30, 2019, 39 pages, VMware, Inc.

Non-Published Commonly Owned U.S. Appl. No. 16/741,544, filed Jan. 13, 2020, 31 pages, VMware, Inc.

Non-Published Commonly Owned U.S. Appl. No. 16/785,674, filed Feb. 10, 2020, 29 pages, VMware, Inc.

Non-Published Commonly Owned U.S. Appl. No. 16/816,067, filed Mar. 11, 2020, 55 pages, Nicira, Inc.

Non-Published Commonly Owned Related U.S. Appl. No. 16/843,919 with similar specification, filed Apr. 9, 2020, 123 pages, VMware, Inc.

Non-Published Commonly Owned U.S. Appl. No. 16/905,909, filed Jun. 18, 2020, 36 pages, Nicira, Inc.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Non-Published Commonly Owned U.S. Appl. No. 16/945,675, filed Jul. 31, 2020, 51 pages, Nicira, Inc.

Non-Published Commonly Owned U.S. Appl. No. 16/945,868, filed Aug. 1, 2020, 48 pages, Nicira, Inc.

Lin, Po-Ching, et al., "Balanced Service Chaining in Software-Defined Networks with Network Function Virtualization," Computer: Research Feature, Nov. 2016, 9 pages, vol. 49, No. 11, IEEE.

* cited by examiner

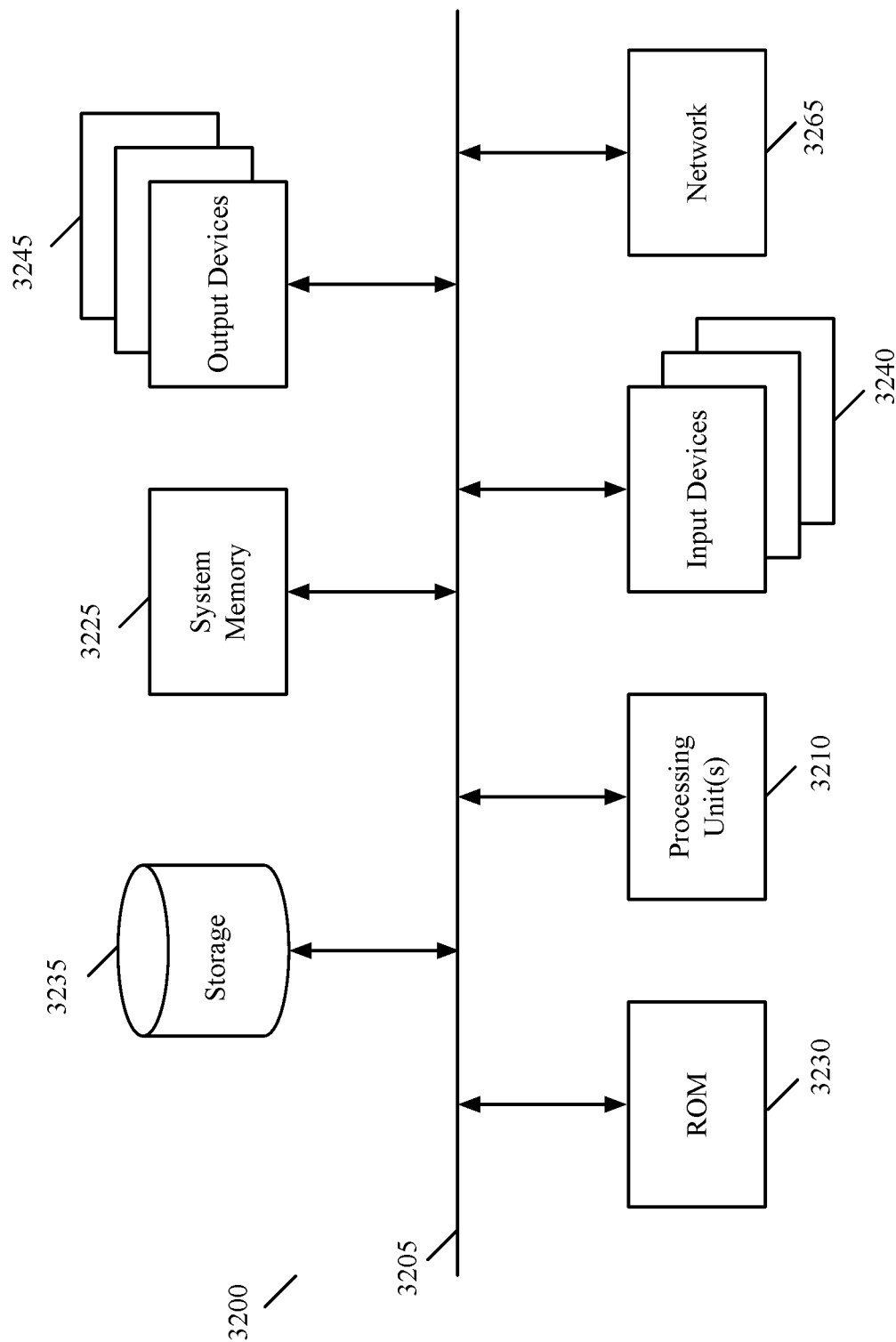

METHOD OF NETWORK PERFORMANCE VISUALIZATION OF SERVICE FUNCTION CHAINS

RELATED APPLICATIONS

Benefit is claimed under 35 U.S.C. 119(a)-(d) to Foreign application Serial No. 202041002329 filed in India entitled "A METHOD OF NETWORK PERFORMANCE VISUALIZATION OF SERVICE FUNCTION CHAINS", on Jan. 20, 2020, by VMware, Inc., which is herein incorporated in its entirety by reference for all purposes.

The present application is related in subject matter to U.S. patent application Ser. No. 16/843,929, filed Apr. 9, 2020, now published as U.S. Patent Publication 2021/0227042, which is incorporated herein by reference.

BACKGROUND

Datacenters today use service chains that designate a series of service operations to perform on data messages of a network. These service chains are implemented by service paths which each define a specific set of service nodes for a set of data to pass through. Each service node implements one of the service operations designated in the service chain. However, the tools presently used to monitor networks do not include interfaces to monitor the implementation of service chains. Therefore, there is a need in the art for a user interface to troubleshoot the service paths and service nodes implementing a service chain. The present art also does not use service proxies to collect data transmission characteristics of individual service nodes. The lack of service proxies collecting the data leads to inadequate monitoring of service nodes in a service chain. Therefore, there is a need in the art for a method that uses service proxies that monitor the individual service nodes to collect operational statistics and modifies the service paths in response to the collected operational statistics.

BRIEF SUMMARY

Some embodiments of the invention provide a method for monitoring a particular service chain that includes several service operations to perform on data messages passing through a network. The method provides a user interface to receive a selection of the particular service chain from a plurality of service chains. The particular service chain is implemented by several service paths, each of which includes several service nodes. Each service node performs one of the services of the service chain. The method generates a graphical display of the service paths through the service nodes, and as part of this graphical display, provides operational data relating to operations of the service nodes of the service paths. In some embodiments, the method also provides, as part of the graphical display, operational data relating to operations of the nodes of an individual service path. In some embodiments, the method further includes defining the plurality of service paths for the particular service chain.

"Operational data" refers herein to data gathered at least partly while service nodes are in operation. The operational data may include operational statistical data derived from one or more measurements (e.g., performance measurements) of the operations of a service node. In some embodiments, operational data may also include data that is not derived from a measurements of the service nodes, such as an identifier of the service node, a packet type or packet types handled by the service node, etc.

The graphical display of some embodiments includes a node representation of each service node and a link connecting the node representations of each successive pair of service nodes in at least one service path. In some embodiments, the graphical display includes a concurrent representation of the plurality of service paths. A single service node may provide a particular service for multiple service paths of the service chain in some embodiments. The method of some embodiments updates the graphical display to add a node representation of any newly implemented service node of the displayed service chain or to remove node representations of any service node(s) that is/are no longer implemented.

The method of some embodiments responds to various received user commands. In some embodiments operational data for a service node is provided after receiving a selection of the service node (e.g., via a cursor click or cursor hover operation). The graphical display of some embodiments provides operational data relating to operations of a set of service nodes on an individual service path after receiving a selection of the individual service path. Similarly, the graphical display of some embodiments receives a selection of a particular service. Once a service is selected, the graphical display then provides operational data relating to the operations of a set of service nodes that each implement instantiations of the particular service.

The method of some embodiments allows a user to set threshold values for some particular performance parameters. For example, the method may allow a user to set a threshold for throughput of the service chain, aggregate latency of all service nodes of a particular service type, etc. Similarly, the method of some embodiments provides an interface option for setting a threshold for a performance parameter for a particular service type. In some embodiments, the method provides a visual cue to indicate whether a performance parameter has gone beyond a threshold. For example, the method may change the color of one or more graphical elements to indicate the performance parameter has gone beyond the threshold.

In addition to monitoring the service chains of a network, the method of some embodiments allows a user to alter the operations of those service chains. For example, the method of some embodiments provides interface options for instantiating an additional service node for a particular service and/or shutting down or restarting an already operating service node.

In the method of some embodiments, data may be received from service proxies that monitor service nodes. A service proxy may be implemented on the same device as a service node it monitors, or on a different device from the service node. In some embodiments, each service node has its own service proxy. In other embodiments, a single service proxy may monitor multiple nodes.

In some embodiments, a service node (sometimes called a "service instance runtime") is implemented on a device of the network and the operational data includes operational statistics received from a service proxy implemented on the same device. The device may be a service appliance or a host computer of the network. A service appliance is a device designed to provide a particular service or a small set of services rather than operating as a general purpose computing device. Service devices of some embodiments implement their own service proxies in addition to (or as part of) the service they are designed for. A host computer is a physical computer that implements (hosts) virtual machines (VMs) or containers that implement service nodes. VMs and containers are sometimes collectively referred to as "service machines." Each host computer of some embodiments implements service proxies for the service nodes implemented on that host computer.

In other embodiments, a service proxy is implemented on a separate device from a service node it monitors. For example, service nodes of a service appliance that does not implement a service proxy may be implemented on host computers or other devices of the network. Similarly, the methods of some embodiments may implement a service node on one host machine and a service proxy to monitor that node on another host machine.

Implementing service proxies on or off the same device that implements the service nodes they are monitoring are not mutually exclusive options. For example, some embodiments may implement (1) service proxies on a host computer to monitor the service nodes on that host computer and (2) additional service proxies on the host computer to monitor service nodes that are implemented on one or more appliances that lack service proxies of their own.

In some embodiments, at least part of the operational data is generated from operational statistics. The operational statistics are based on data received from a service proxy that collects data transmission characteristics relating to a particular service node. These operational statistics may be calculated at one or more service proxies, calculated at a server of the network, or calculated partially at a server and partially at one or more service proxies. In some cases, these calculations may include aggregation of data transmission characteristics (e.g., averages, sums, weighted averages, etc.). The data transmission characteristics of some embodiments include a latency and/or a throughput of a service node. The latency is the time for a query to be sent to the service node and a reply received (e.g., received at the service proxy). A throughput value represents the amount of data in the data messages that passes through a service node in a particular amount of time. The operational data of some embodiments includes data received from the service proxies relating to packets received by a particular service node (e.g., packet type, error rate, drop rate, etc.) and/or data relating to payload size.

The method of some embodiments is implemented on a telecommunications network and the particular service chain includes a set of service operations applied to a particular type of data message flow. For example, the method may be implemented on a 5G network, 4G network, or LTE network.

Some embodiments of the invention provide a method for monitoring and adjusting a service chain that includes multiple services to perform on data messages passing through a network. The method operates on a service chain implemented by multiple service paths each of which includes multiple service nodes that implement multiple services of the service chain. The method receives operational data relating to a set of service nodes among the multiple service nodes. The method analyzes the operational data. In response to the analysis of the operational data, the method alters the service paths implementing the service chain.

The methods of some embodiments alter the service paths in multiple ways. In some embodiments, the method alters the service paths by instantiating a new service node to implement a particular service of the service chain. Instantiating the new service node in some embodiments is in response to operational data indicating that a throughput of one or more service nodes implementing the particular service is beyond a threshold (e.g., lower than a set minimum threshold or above a set maximum threshold) throughput. Instantiating the new service node in some embodiments is in response to operational data indicating that a latency of one or more service nodes implementing the particular service is beyond a threshold latency.

The method of some embodiments may alter service paths by deactivating an existing service node that is implementing a particular service. Deactivating the existing service node in some embodiments may be in response to operational data indicating that a throughput of one or more service nodes implementing the particular service is beyond a threshold throughput. In some embodiments, deactivating the existing service node may be in response to operational data indicating that a latency of one or more service nodes implementing the particular service is beyond a threshold latency.

Some embodiments alter service paths by restarting an existing service node that is implementing a particular service. For example, the method of such embodiments may restart a service node in response to operational data indicating errors in the existing service node or in response to operational data indicating that the existing service node has fallen below a performance threshold.

In some embodiments a particular service node implements parts of multiple service paths of the service chain. In some such embodiments, the method alters the service paths by reducing a number of service paths implemented in part by a particular service node. For example, the method may reduce the number of service paths using a particular node when the node is receiving more than a threshold amount of data in the data messages (e.g., being overloaded). The method of some embodiments, alters the service paths by increasing a number of service paths implemented in part by a particular service node. For example, the method may increase the number of service paths using a particular node in response to the particular service node receiving less than a threshold amount of data in the data messages (e.g., being underutilized).

The methods of various embodiments receive and analyze data from various sources and in various ways. In some embodiments, a particular service node is implemented on a device and the operational data for the particular service node is based at least partly on data received from a service proxy implemented on the device. The device in some embodiments may be a service appliance or a host computer of the network. In some embodiments, a particular service node is implemented on a first device and the operational data for the particular service node is based at least partly on data received from a service proxy implemented on a second device.

The method of some embodiments bases the operational data on operational statistics received from service proxies. Analyzing the operational data in some embodiments includes aggregating operational statistics data with previously collected operational statistics data. The aggregation may include calculating a weighted sum of the operational statistics data. The operational statistics of some embodiments includes data transmission characteristics of the service nodes received from the service proxies. The data transmission characteristics of a particular service node may include a throughput of the particular service node and/or a latency time for the particular service node.

In some embodiments, the service proxy collects other data. The service proxy collects data relating to packets received by a particular service node in some embodiments.

The service proxy collects data relating to the sizes of payloads received by a particular service node in some embodiments.

Various embodiments include various other elements or limitations. For example, the network of some embodiments is a telecom network and a particular service chain is a set of service functions each applied to a particular type of data message flow. In some embodiments, the method further includes defining the plurality of service paths for a particular service chain. The service nodes of some embodiments include at least one of: a service implemented on a virtual machine (VM), a service implemented on a container, or a service implemented by an appliance.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 32 conceptually illustrates an electronic system with which some embodiments of the invention are implemented.

DETAILED DESCRIPTION

Figure 1:
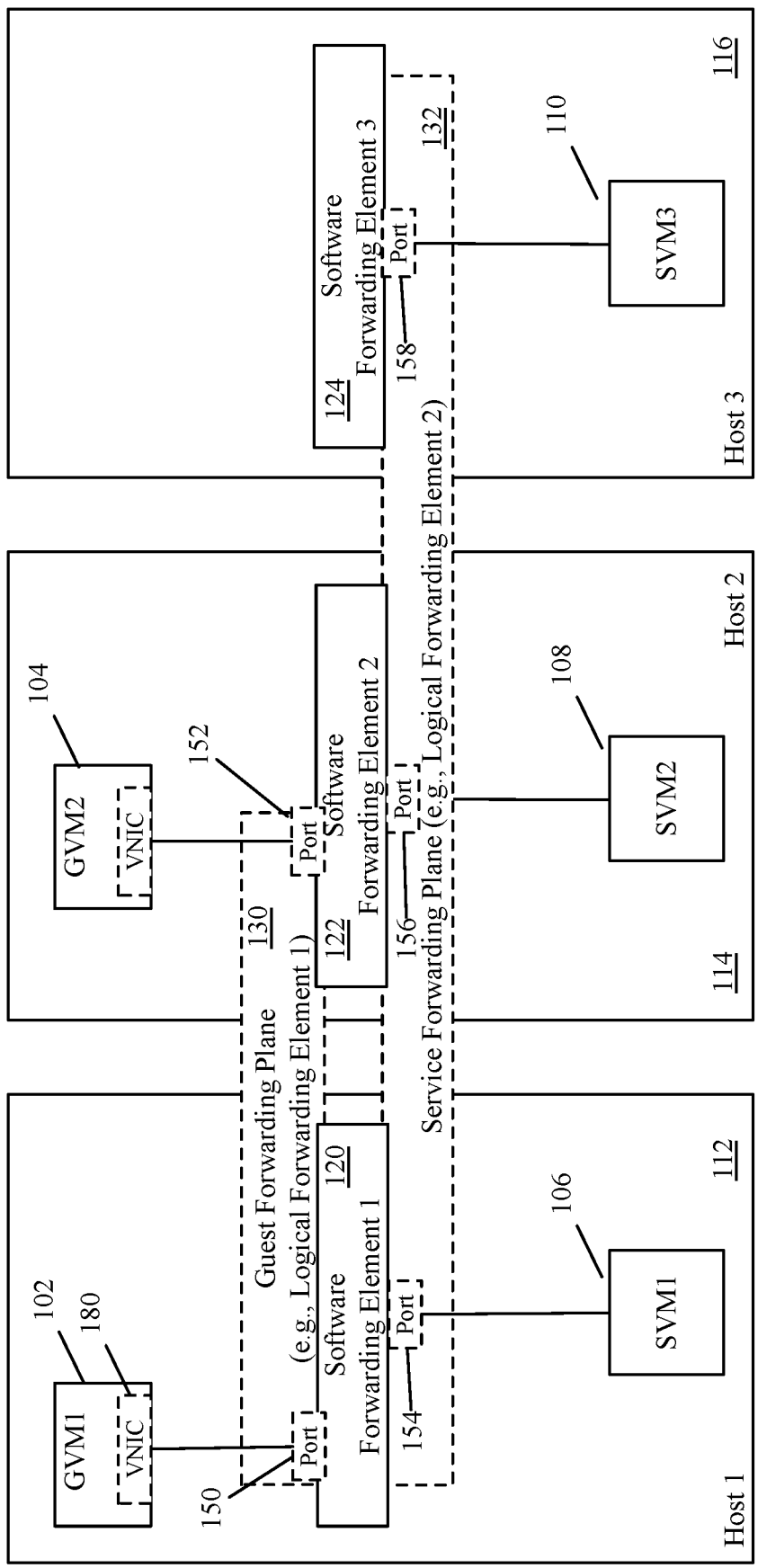
FIG. 1 illustrates an example of segregated guest and service planes that are implemented in some embodiments by two logical forwarding elements.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for monitoring a particular service chain that includes several service operations to perform on data messages passing through a network. The method provides a user interface to receive a selection of the particular service chain from a plurality of service chains. The particular service chain is implemented by several service paths, each of which includes several service nodes. Each service node performs one of the services of the service chain. The method generates a graphical display of the service paths through the service nodes, and as part of this graphical display, provides operational data relating to operations of the service nodes of the service paths. In some embodiments, the method also provides, as part of the graphical display, operational data relating to operations of the nodes of an individual service path. In some embodiments, the method further includes defining the plurality of service paths for the particular service chain.

In some embodiments, a service node performs a middlebox service operation, such as a firewall, an intrusion detection system, an intrusion prevention system, a load balancer, an encryptor, a message monitor, a message collector, or any number of other middlebox services. In some embodiments, multiple instances of a category of services may be implemented as separate operations. For example, a service chain may include two separate firewalls from two different vendors or multiple different virus/malware scanners.

"Operational data" refers herein to data gathered at least partly while service nodes are in operation. The operational data may include operational statistical data derived from one or more measurements (e.g., performance measurements) of the operations of a service node. In some embodiments, operational data may also include data that is not derived from a measurements of the service nodes, such as an identifier of the service node, a packet type or packet types handled by the service node, etc.

Although the discussion below describes receiving the operational data from service proxies in some embodiments, one of ordinary skill in the art will understand that other embodiments receive operational data relating to each node from other system elements. The operational data in some embodiments may include raw data and/or calculated data. Measured values and values calculated from those measured values may be referred to herein as operational statistics.

In some embodiments, the user interface and automatic monitoring of the present invention operates in a network that uses service proxies to monitor service nodes that sequentially implement a set of service paths of a service chain. The service chains, service paths, service nodes, network, and host machines, monitored by the service proxies, and which the user interface and automatic monitoring of some embodiments are applied to, are described in the following figures, FIGS. 1-19.

FIG. 1 illustrates an example of segregated guest and service planes that are implemented in some embodiments by two logical forwarding elements (LFEs) 130 and 132. As shown, two guest machines 102 and 104 and three service machines 106, 108, and 110 execute on three host computers 112, 114, and 116 along with three software forwarding elements 120, 122, and 124. In this example, the guest machines and service machines are guest virtual machines (GVMs) and service virtual machines (SVMs), but in other embodiments these machines can be other types of machines, such as containers.

Also, in this example, each logical forwarding element is a distributed forwarding element that is implemented by configuring multiple software forwarding elements (SFEs) on multiple host computers. To do this, each SFE or a module associated with the SFE in some embodiments is configured to encapsulate the data messages of the LFE with an overlay network header that contains a virtual network identifier (VNI) associated with the overlay network. As such, the LFEs are said to be overlay network constructs that span multiple host computers in the discussion below.

The LFEs also span in some embodiments configured hardware forwarding elements (e.g., top of rack switches). In some embodiments, each LFE is a logical switch that is implemented by configuring multiple software switches (called virtual switches or vswitches) or related modules on multiple host computers. In other embodiments, the LFEs can be other types of forwarding elements (e.g., logical routers), or any combination of forwarding elements (e.g., logical switches and/or logical routers) that form logical networks or portions thereof. Many examples of LFEs, logical switches, logical routers, and logical networks exist today, including those provided by VMware's NSX network and service virtualization platform.

As shown, the LFE 130 defines the guest forwarding plane that connects the GVMs 102 and 104 in order to forward data messages between these GVMs. In some embodiments, this LFE is a logical switch that connects to a logical router, which connects the GVMs directly or through a logical gateway to networks outside of the logical switch's logical network. The LFE 130 is implemented in some embodiments by configuring software switches 120 and 122 and/or their related modules (e.g., related port/VNIC filter modules) on the host computers 112 and 114 to implement a first distributed logical switch.

FIG. 1 and other figures discussed below show the source and destination GVMs being on the same logical network and being connected to the same LFE. One of ordinary skill will realize that the service operations of some embodiments do not require the source and destination machines to be connected to the same LFE, or to even be in the same network or the same datacenter. These service operations are performed on data messages that exit the source machine's network or enter a source machine's network. The figures depict the source and destination machines as connected to the same LFE to emphasize that the service plane 132 is implemented by a separate logical network than the logical network that forwards the data messages associated with the guest machines.

The LFE 132 defines the service forwarding plane that connects the SVMs 106, 108, and 110 in order to forward data messages associated with the GVMs through service paths that include the SVMs. In some embodiments, the LFE 132 is also a logical switch that is implemented by configuring software switches 120, 122, and 124 and/or their related modules on the host computers 112, 114, and 116 to implement a second distributed logical switch. Instead of configuring the same set of SFEs to implement both the guest and service forwarding planes (i.e., the guest and service LFEs), other embodiments configure one set of SFEs on a set of host computers to implement the guest forwarding plane and another set of SFEs on the set of host computers to implement the service forwarding plane. For instance, in some embodiments, each host computer executes a guest software switch and a service software switch, and these two switches and/or their related modules can be configured to implement a guest logical switch and a service logical switch.

In some embodiments, the software switches 120, 122, and 124 and/or their related modules can be configured to implement multiple guest forwarding planes (e.g., guest LFEs) and multiple service forwarding planes (e.g., service LFEs) for multiple groups of machines. For instance, for a multi-tenant datacenter, some such embodiments define a guest LFE and a service LFE for each tenant for which at least one chain of services needs to be implemented. For each group of related machines (e.g., for each tenant's machines), some embodiments define two virtual network identifiers (VNIs) to configure a shared set of software forwarding elements (e.g., software switches) to implement the two different forwarding planes, i.e., the guest forwarding plane and the service forwarding plane. These two VNIs are referred to below as the guest VNI (GVNI) and the service VNI (SVNI). In FIG. 1, the guest LFE ports 150 and 152 are associated with the GVNI, while the service LFE ports 154, 156, and 158 are associated with the SVNI, as shown.

In some embodiments, the service plane 132 is also implemented by inserting modules in input/output (IO) chains of a GVM's egress and ingress datapaths to and from an SFE 120 or 122. In this implementation, the service plane 132 can identify a data message sent from the GVM or received for the GVM, forward the data message to a set of SVMs to perform a chain of services on the data message, and then to return the data message back to the GVM's datapath so that the data message can be proceed along its datapath to the software switch or to the GVM (i.e., so that the data message can be processed based on the destination network addresses specified by the source GVM). Such a GVM is referred to below as the source GVM as the data message being processed by the service nodes is a data message identified on the GVM's egress or ingress path. In some embodiments, a GVM's egress/ingress IO chain is implemented as a set of hooks (function calls) in the GVM's VNIC (virtual network interface card) 180 or the SFE port associated with the GVM's VNIC (e.g., the SFE port communicating with the GVM's VNIC).

Figure 2:
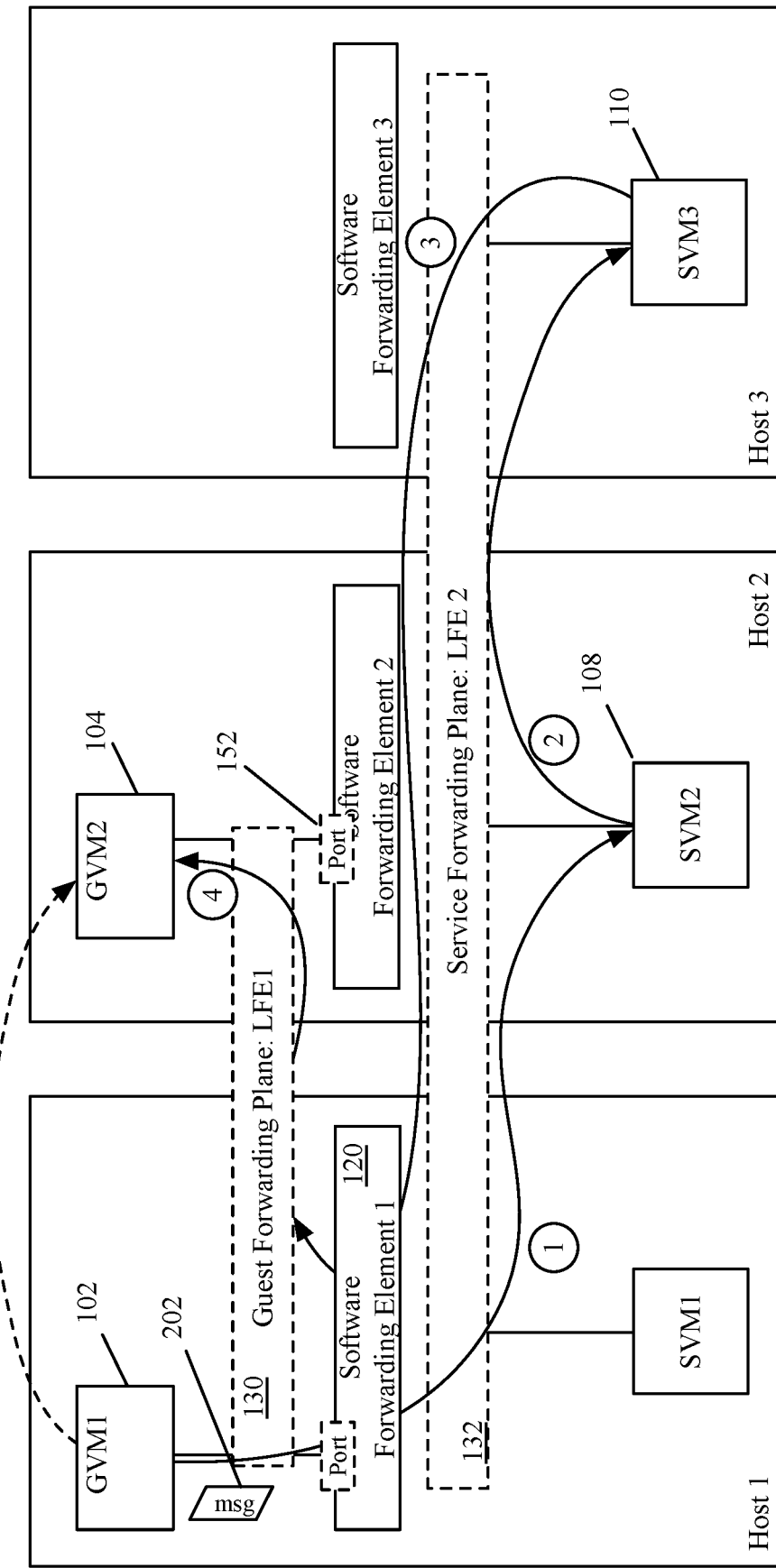
FIG. 2 illustrates a data message between two guest virtual machines (GVMs) being redirected along a service path to be processed by service virtual machines (SVMs) of some embodiments.

Before providing an example of the IO chain components of some embodiments that implement the service plane, FIG. 2 illustrates an example of a data message 202 from the GVM 102 to GVM 104 being redirected along the service plane 132 so that the data message can be processed by SVMs 108 and 110 that perform a chain of two service operations. As shown, the service LFE 132 first forwards the data message to SVM 108, and then forwards the data message to SVM 110, before returning the data message back to the egress path of GVM 102 so that the data message can be processed based on the destination network addresses specified by the source GVM 102.

The service LFE in some embodiments forwards the data message between hosts 112, 114, and 116 by using an overlay encapsulation header that stores the SVNI for the service LFE. Also, when the service LFE is a service logical switch, the service forwarding plane in some embodiments uses the MAC addresses associated with the SVMs (e.g., MAC addresses of SVM VNICs) to forward the data message between ports of the service logical switch. In some embodiments, the MAC forwarding also uses service plane MAC address associated with the source GVM, even though this GVM does not directly connect to the service plane but instead connects to the service plane through a port proxy, as further described below.

Once the data message 202 returns to the egress path of the GVM 102, the guest LFE 130 forwards the data message to its destination (e.g., as specified by the destination network address in the data message's header), which is GVM 104. The guest LFE 130 in some embodiments forwards the data message between hosts 112 and 114 by using an overlay encapsulation header that stores the GVNI for the guest LFE. Also, when the guest LFE is a logical switch, the guest forwarding plane in some embodiments uses the guest plane MAC addresses associated with the GVMs 102 and 104 to forward the data message (e.g., by using the guest plane MAC address of GVM 104 to forward the data message to the guest forwarding port 152 associated with this GVM). While the service plane of FIG. 2 captures a data message passing through a GVM's egress path, the service plane in some embodiments can also capture a data message as it is passing through a GVM's ingress path before it reaches the GVM's VNIC.

In some embodiments, a chain of service operations is referred to as a service chain. A service chain in some embodiments can be implemented with one or more sets of service nodes (e.g., service machines or appliances), with each set of service nodes defining a service path. Hence, in some embodiments, a service chain can be implemented by each of one or more service paths. Each service path in some embodiments includes one or more service nodes for performing the set of one or more services of the service chain and a particular order through these nodes.

Figure 3:
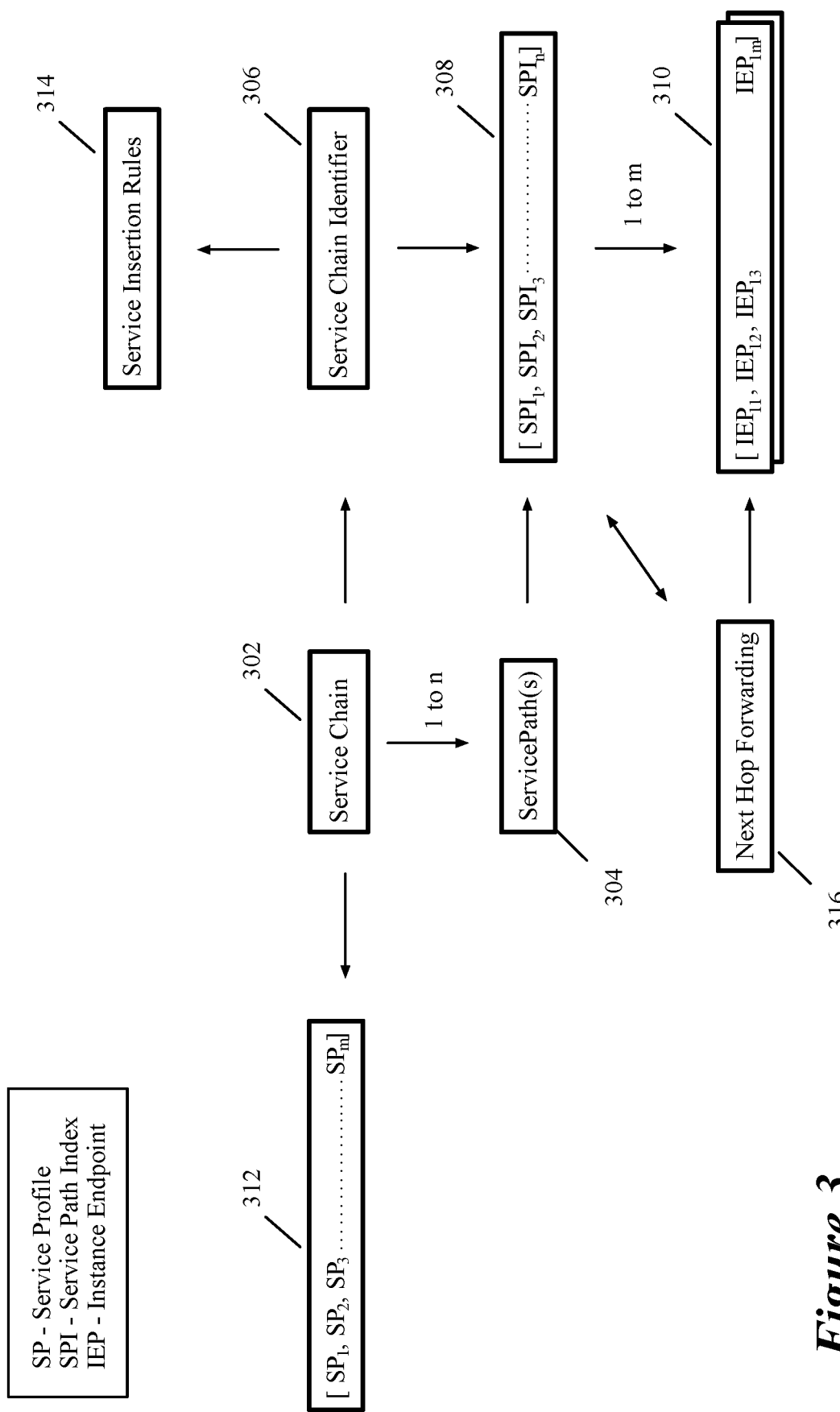
FIG. 3 conceptually illustrates a relationship between a service chain and a set of one or more service paths that implement the service chain in some embodiments.

FIG. 3 presents an object diagram that illustrates the relationship between a service chain 302 and a set of one or more service paths 304 that implement the service chain. Each service chain has a service chain (SC) identifier 306, while each service path has a service path identifier (SPI) 308. Each service path is associated with a set of m service nodes, which, as shown, are identified in terms of service instance endpoints 310. Service instance endpoints in some embodiments are logical locations in the network where traffic can go or come from a service node connected to the service plane. In some embodiments, a service instance endpoint is one LFE port (e.g., an SFE port) associated with a service node (e.g., a VNIC of an SVM). In these or other embodiments, a service instance endpoint can be associated with two LFE ports used for a service node as further described below for embodiments that use GRE encapsulation. Also, the service endpoints in some embodiments are addressable through MAC addresses associated with the LFE ports or with the SVM VNICs associated with (e.g., communicating with these LFE ports).

In some embodiments, each service chain 302 is defined by references to one or more service profiles 312, with each service profile associated with a service operation in the chain. As described below, a service node in some embodiments (1) receives, from a service manager, a mapping of a service chain identifier to a service profile that it has to implement, and (2) receives, with a data message, a service chain identifier that it maps to the service profile to determine the service operation that it has to perform. In some embodiments, the received mapping is not only based on the service chain identifier (SCI) but is also based on a service index value (that specifies the location of the service node in a service path) and a direction through a service chain (that specifies an order for performing the sequence of services specified by the service chain). The service profile in some embodiments describes the service operation that the service node has to perform. In some embodiments, a service profile can identify a set of rules for a service node to examine.

Also, in some embodiments, service insertion rules 314 are defined by reference to service chain identifier 306 for service insertion modules associated with GVMs. Such service insertion modules use these service insertion rules 314 to identify service chains to use to process data messages associated with a source GVM. As mentioned above, the data messages are referred to below as being from a source GVM as the data messages that are processed by the service chains are identified on the egress paths from or ingress paths to the GVMs.

As further described below, the service insertion (SI) rules associate flow identifiers with service chain identifiers. In other words, some embodiments try to match a data message's flow attributes to the flow identifiers (referred to below as rule identifiers of the SI rules) of the service insertion rules, in order to identify a matching service insertion rule (i.e., a rule with a set of flow identifiers that matches the data message's flow attributes) and to assign this matching rule's specified service chain as the service chain of the data message. A specific flow identifier (e.g., one defined by reference to a five-tuple identifier) could identify one specific data message flow, while a more general flow identifier (e.g., one defined by reference to less than the five tuples) can identify a set of several different data message flows that match the more general flow identifier. As such, a matching data message flow is any set of data messages that have a common set of attributes that matches a rule identifier of a service insertion rule.

As further described below, other embodiments use contextual attributes associated with a data message flow to associate the data message with a service insertion rule. Numerous techniques for capturing and using contextual attributes for performing forwarding and service operations are described in U.S. patent application Ser. No. 15/650,251, filed Jul. 14, 2017, now issued as U.S. Pat. No. 10,802,857, which is incorporated herein. Any of these techniques can be used in conjunction with the embodiments described herein.

Next hop forwarding rules 316 in some embodiments are defined by reference to the SPI values 308 and service instance endpoints 310. Specifically, in some embodiments, a service path is selected for a service chain that has been identified for a data message. At each hop, these embodiments use the forwarding rules 316 to identify the next service instance endpoint based on the SPI value for this service path along with a current service index (SI) value, which identifies the location of the hop in the service path. In other words, each forwarding rule in some embodiments has a set of matching criteria defined in terms of the SPI/SI values, and specifies a network address of the next hop service instance endpoint that is associated with these SPI/SI values. To optimize the next hop lookup for the first hop, some embodiments provide to the source GVM's service insertion module the next hop network address with the SPI, as part of a service path selection process.

Figure 4:
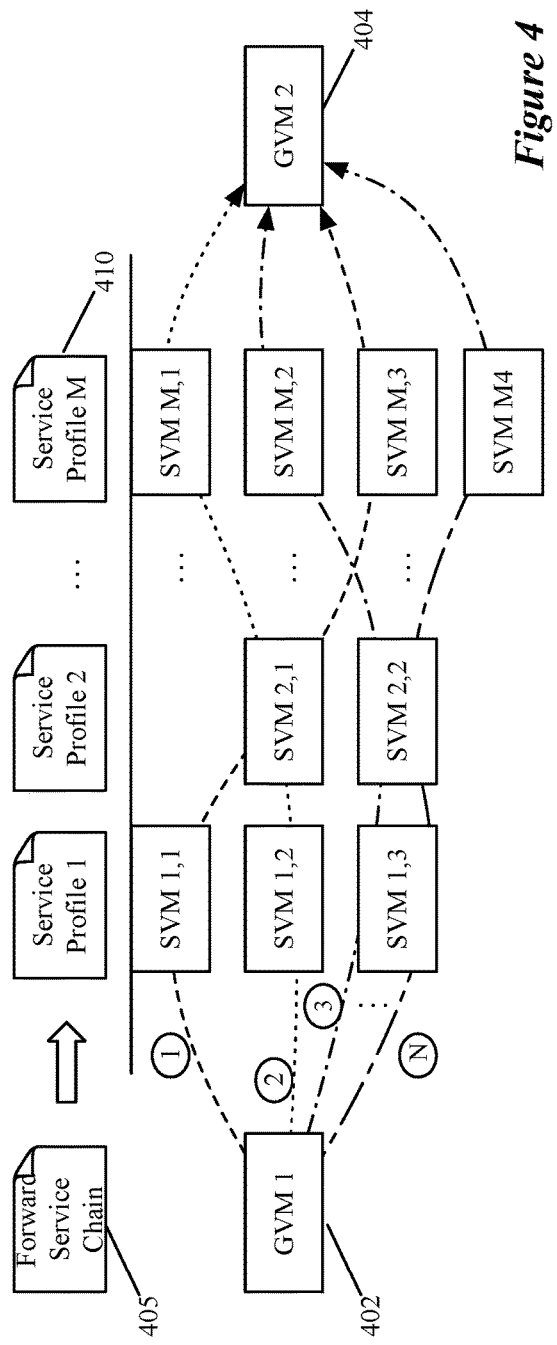
FIG. 4 illustrates an example of a service chain and its associated service paths.

FIG. 4 illustrates an example of a service chain and its associated service path. As shown, each service chain 405 in some embodiments is defined as a sequential list of service profiles 410, with each profile in this example related to a different middlebox service (such as firewall, load balancer, intrusion detector, data message monitor, etc.). Also, in this example, each of the M profiles can be implemented by one SVM in a cluster m of VMs. As shown, different clusters for different profiles can have different numbers of SVMs. Also, in some embodiments, one service profile is implemented by one service node (i.e., a cluster of several service nodes is not required to implement a service profile).

Since multiple SVMs in a cluster can provide a particular service, some embodiments define for a given service chain, multiple service paths through multiple different combinations of SVMs, with one SVM of each cluster being used in each combination. In the example of FIG. 4, there are N service paths associated with the service chain 405, traversed by data messages originating at a GVM 402 on their way to a GVM 404. Each service path is identified by a different set of dashed lines in this figure.

Specifically, the first service path passes through first SVM 1,1 of the first service profile's cluster to implement the first service of the forward service chain 405, the first SVM 2,1 of the second service profile's cluster to implement the second service of the forward service chain 405, and third SVM M,3 of the Mth service profile's cluster to implement the Mth service of the forward service chain 405. The second service path passes through second SVM 1,2 of the first service profile's cluster to implement the first service of the forward service chain 405, the first SVM 2,1 of the second service profile's cluster to implement the second service of the forward service chain 405, and first SVM M,1 of the Mth service profile's cluster to implement the Mth service of the forward service chain 405.

The third service path passes through third SVM 1,3 of the first service profile's cluster to implement the first service of the forward service chain 405, the second SVM 2,2 of the second service profile's cluster to implement the second service of the forward service chain 405, and second SVM M,2 of the Mth service profile's cluster to implement the Mth service of the forward service chain 405. The Nth service path passes through third SVM 1,3 of the first service profile's cluster to implement the first service of the forward service chain 405, the second SVM 2,2 of the second service profile's cluster to implement the second service of the forward service chain 405, and fourth SVM M,4 of the Mth service profile's cluster to implement the Mth service of the forward service chain 405. As the example illustrates, different service paths may use the same SVM for a given service operation. However, regardless of the service path that a given data message traverses, the same set of service operations is performed in the same sequence, for paths that are associated with the same service chain and the same service direction.

In some embodiments, a service chain has to be performed in a forward direction for data messages from a first GVM to a second GVM, and then in the reverse direction for data messages from the second GVM to the first GVM. In some such embodiments, the service plane selects both the service path for the forward direction and the service path for the reverse direction when it processes the first data message in the flow from the first GVM to the second GVM. Also, in some of these embodiments, the forward and reverse service paths are implemented by the same sets of service nodes but in the reverse order.

Figure 5:
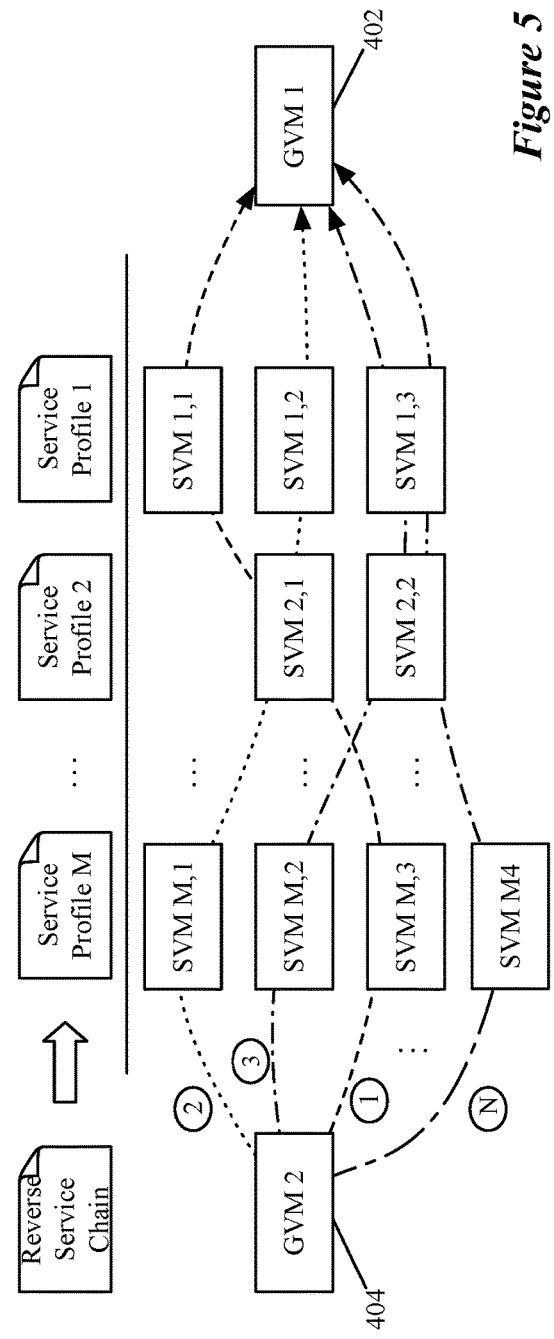
FIG. 5 illustrates examples of reverse service paths for the forward service paths illustrated in FIG. 4.

FIG. 5 illustrates examples of reverse service paths for the forward service paths illustrated in FIG. 4. While the forward service paths are for performing M services on data messages from GVM 402 to GVM 404, the reverse service paths are for performing M services on data messages from GVM 404 to GVM 402. Also, the order of these services is reversed with the service paths in FIG. 5 performing service profiles M to 1, while the service paths in FIG. 4 perform service profile 1 to M.

Also, in the examples of FIGS. 4 and 5, each reverse service path has one corresponding forward service path that is implemented by the same exact set of SVMs but in the reverse order, as indicated by the service path legends and the similar dashed lines in these figures. For example, the forward, second service path passes through SVM 1,2 for the first service associated with the first profile, SVM 2,1 for the second service associated with the second profile, and SVM M,1 for the Mth service associated with the Mth service profile, while the associated reverse, second service path passes through SVM M,1 for the first service associated with the Mth service profile, SVM 2,1 for the second service associated with the second profile, and SVM 1,2 for the second service associated with the first profile.

In some embodiments, the same service nodes are used for the forward and reverse paths because at least one of the service nodes (e.g., a firewall SVM) that implements one of the service profiles needs to see the data traffic in both directions between two data endpoints (e.g., two GVMS). In other embodiments, the same service nodes do not need to be used for both directions of data message flows between two data endpoints so long as the same set of service operations are performed in opposite orders.

Figure 6:
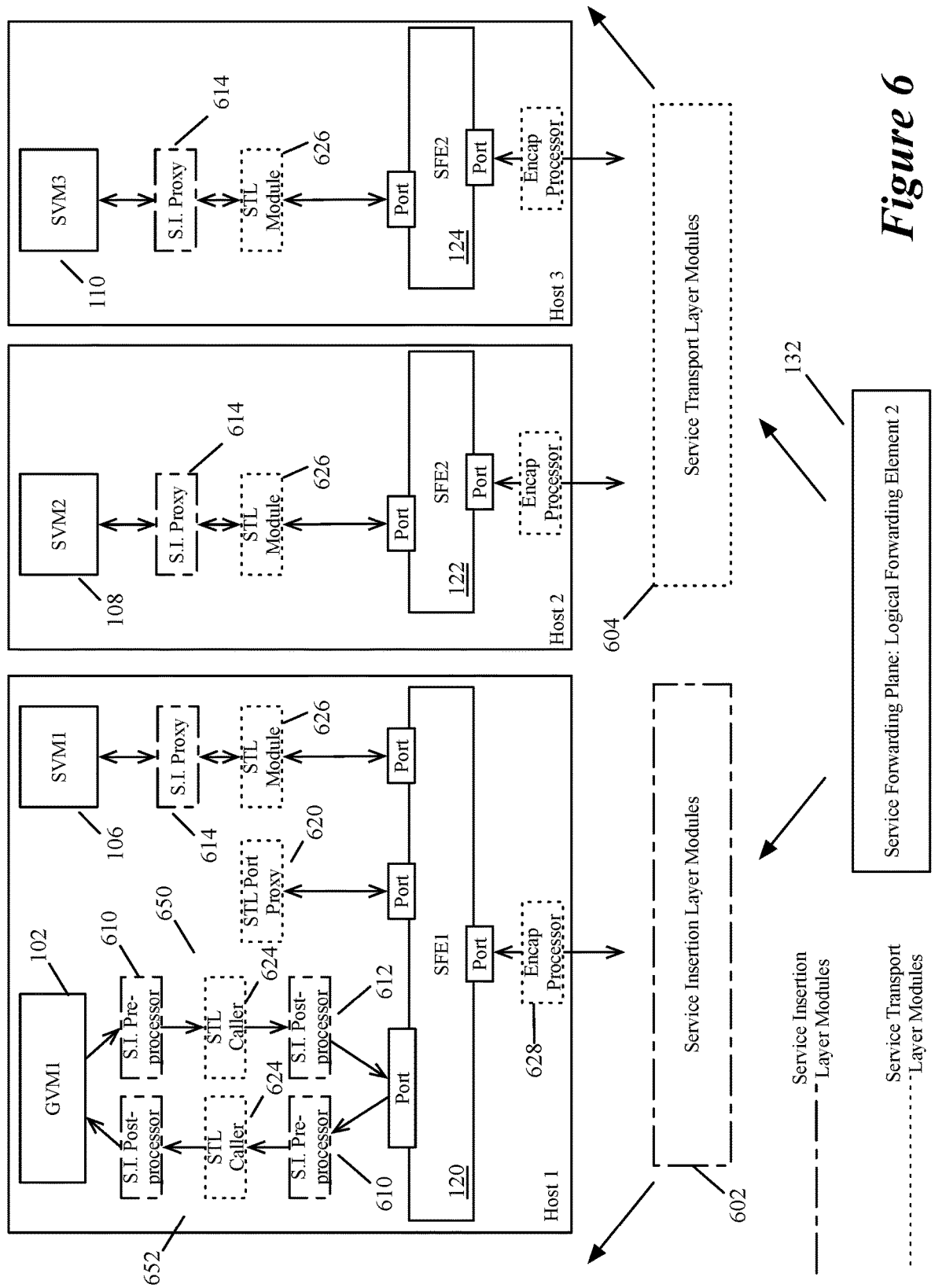
FIG. 6 illustrates an example of input/output (IO) chain components that implement a service plane in some embodiments.

FIG. 6 illustrates an example of the IO chain components that implement the service plane in some embodiments. As shown, the service plane 132 is implemented by software switches 120, 122, and 124 executing on the host computers and two sets of modules 610, 612, 614, 620, 624, 626, and 628 on these computers. The implemented service plane in this example as well some of the other examples illustrated in some of the subsequent figures is an overlay logical L2 service plane. One of ordinary skill will realize that other embodiments are implemented by other types of service planes, such as overlay L3 service planes, or overlay networks with multiple L2 logical switches and one or more logical L3 routers.

In FIG. 6, the software switches 120, 122, and 124 and modules 610, 612, 614, 620, 624, 626, and 628 implement two different layers of the service plane, which are the service insertion layer 602 and the service transport layer 604. The service insertion layer 602 (1) identifies the service chain for a data message, (2) selects the service path to use to perform the service operations of the service chain, (3) identifies the next-hop service nodes at each hop in the selected service path (including the identification of the source host computer to which the data message should be returned upon the completion of the service chain), and (4) for the service path, specifies the service metadata (SMD) header attributes for the data message. The SMD attributes in some embodiments include the network service header (NSH) attributes per RFC (Request for Comments) 8300 of IETF (Internet Engineering Task Force).

The service transport layer 604, on the other hand, formulates the service overlay encapsulation header and encapsulates the data message with this header so that it can pass between service hops. In some embodiments, the service transport layer 604 modifies the SMD header to produce the service overlay encapsulation header. For instance, in some of these embodiments, the overlay encapsulation header is a Geneve header with the SMD attributes stored in a TLV (type, length, value) section of the Geneve header. In other embodiments, the service transport layer 604 adds the service overlay encapsulation header to an SMD header that is first used to encapsulate the data message. Also, when traversing between two hops (e.g., between two service nodes) executing on the same host computer, the service transport layer in several embodiments described below does not encapsulate the data message with an overlay encapsulation header in some embodiments. In other embodiments, even when traversing between two hops on the same host computer, the service transport layer encapsulates the data message with an overlay encapsulation header.

In some embodiments, the service insertion (SI) layer 602 includes an SI pre-processor 610 and an SI post-processor 612, in each the two IO chains 650 and 652 (i.e., the egress IO chain 650 and the ingress IO chain 652) of a GVM for which one or more service chains are defined. The SI layer 602 also includes a service proxy 614 for each service node connected to the service plane (e.g., for each SVM with a VNIC paired with a service plane LFE port). The service transport (ST) layer 604 includes one STL port proxy 620 on each host computer that has one or more possible source GVMs for which one or more service chains are defined. The ST layer 604 also has (1) an STL caller 624 in each IO chain of each source GVM, (2) an STL module 626 in the IO chain of each SVM, and (3) one or more encap processors 628.

For a data message that passes through a GVM's ingress or egress datapath, the SI pre-processor 610 on this datapath performs several operations. It identifies the service chain for the data message and selects the service path for the identified service chain. The pre-processor also identifies the network address for a first hop service node in the selected service path and specifies the SMD attributes for the data message. The SMD attributes include in some embodiments the service chain identifier (SCI), the SPI and SI values, and the direction (e.g., forward or reverse) for processing the service operations of the service chain. In some embodiments, the SPI value identifies the service path while the SI value specifies the number of service nodes.

After the SI pre-processor completes its operation, the STL caller 624 in the same datapath calls the STL port proxy 620 to relay the SMD attributes and first hop's network address that the pre-processor identified, so that the port proxy can forward the SMD attributes through the service plane to the first hop. The port proxy formats the data message for forwarding to the first service node. In some embodiments, this formatting comprises replacing the original source and destination MAC addresses in the data message with a service plane MAC address that is associated with the source GVM 102 and the MAC address of the first hop service node. This formatting also stores a set of attributes for the data message that should be processed by other service transport layer modules (e.g., the other STL modules, etc.) on the same host computer. These data message attributes include the SMD attributes as well as the original source and destination MAC addresses.

The STL port proxy 620 passes the formatted data message along with its stored attributes to the software switch 120. Based on the destination MAC address (i.e., the first hop MAC address) of the formatted data message, the software switch delivers the data message to the switch port associated with the first hop SVM. When the first hop is on the same host computer as the port proxy 620, the data message is provided to the STL module 626 in the ingress IO chain of the first hop's service node on the same host computer. When the first hop is not on the same host computer, the data message is encapsulated with an encapsulating header and forwarded to the next hop, as further described below.

Each hop's STL module 626 re-formats the data message by replacing the service plane source MAC address and service plane destination MAC address (i.e., its service node's MAC address) with the original source and destination MAC addresses of the data message. It then passes this re-formatted data message with its accompanying SMD attributes to its hop's service proxy 614. This service proxy is in the IO chain of the ingress datapath of the GVM. For purposes of preventing the illustration in FIG. 6 from being overcomplicated with unnecessary detail, the ingress and egress paths of each SVM in this example are combined in this figure, unlike the ingress and egress paths 650 and 652 of the GVM 102.

The service proxy 614 encapsulates the received data message with an encapsulating NSH header that stores the data message's SMD attributes and provides this encapsulated data message to its service node when the service node can support NSH headers. When the service node is an SVM, the service proxy in some embodiments supplies the data messages and its NSH header to the SVM's VNIC through a VNIC injection process, as further described below. When the service node cannot process NSH headers, the service proxy 614 stores the SMD attributes into a legacy QinQ encapsulating header or a GRE encapsulating header, and then passes the encapsulated data message to the VNIC of the SVM. These headers will be further described below.

In some embodiments, the service proxy 614 of each service hop segregates the service node for that hop from the service transport layer. This segregation improves the security of both the SVM and the service transport layer. It also allows the service proxy to ensure that the data messages that are provided to its SVM are formatted properly, which is especially important for legacy SVMs that do not support the newer NSH format.

The service proxy 614 in some embodiments also performs liveness detection signaling with its service node to ensure that the service node is operational. In some embodiments, the service proxy sends a data message with a liveness value to its service node at least once in each recurring time period. To do this, the service proxy sets and resets a timer to ensure that it has sent a liveness signal for each time period to its service node. Each liveness value is accompanied with a liveness sequence number to allow the service proxy to keep track of liveness responses provided by the SVM. Each time the service node replies to a liveness signal, it provides to the service proxy the same liveness value in a responsive data message in some embodiments or its corresponding value in the responsive data message in other embodiments. Also, with each liveness responsive data message, the service node provides the same sequence number in some embodiments, or an incremented version of the sequence number provided by the service proxy in other embodiments.

As further described below, the service proxy of some embodiments piggybacks some of its liveness detection signaling on each data message that it passes to its service node from the service forwarding plane. Each time that the service proxy sends a liveness signal to its service node, it resets its liveness timer. Each time the service node processes the data message, it provides the processed data message back to the service node with the responsive liveness value and associated sequence number (incremented in some embodiments, or non-incremented in other embodiments, as mentioned above).

In some embodiments, the service proxy registers a liveness detection failure when the service node does not respond to its liveness signal within a particular time (e.g., within 0.3 seconds). After registering two successive liveness detection failures, the service proxy in some embodiments notifies a local control plane (LCP) module executing on its host the SVM has failed so that the LCP can notify a central control plane (CCP) server. In response to such a notification, the CCP removes the SVM and the service paths on which SVM resides from the forwarding and path selection rules in the data plane, and if needed, generates additional service paths for the failed SVM's associated service chain. Also, in some embodiments, the service proxy sends an in-band data message back to the source GVM to program its classifier to not select the service path on which the failed service node resides.

In some embodiments, the service proxy also performs flow programming at the behest of its service node. This flow programming in some embodiments involves modifying how the source GVM's IO chain selects service chains, service paths, and/or forwards data message flows along service paths. In other embodiments, this flow programming involves other modifications to how a data message flow is processed by the service plane. Flow programming will be further described below.

Upon receiving a data message and its SMD attributes (in an encapsulating NSH header or some other encapsulating header), the SVM performs its service operation. In some embodiments, the SVM uses mapping records that it receives from its service manager to map the SCI, SI and direction values in the SMD attributes to a service profile, and then maps this service profile to one of its rule sets, which it then examines to identify one or more service rules to process. In some embodiments, each service rule has a rule identifier that is defined in terms of data message attributes (e.g., five tuple attributes, which are the source and destination IP address, source and destination port addresses and the protocol). The SVM in some embodiments compares the rule's identifier with the attributes of the data message to identify a matching rule. Upon identifying one or more matching rules, the SVM in some embodiments performs an action specified by the highest priority matching rule. For instance, a firewall SVM might specify that the data message should be allowed to pass, should be dropped and/or should be redirected.

Once the SVM has completed its service operation, the SVM forwards the data message along its egress datapath. The service proxy in the egress datapath's IO chain then captures this data message and for this data message, identifies the network address of the next hop in the service path. To do this, the service proxy in some embodiments decrements the SI value, and then uses this decremented value along with the SPI value in the data message's stored attribute set to identify an exact match forwarding rule that identifies a next hop network address. In some embodiments, the SVM can decrement the SI value. For such cases, the service proxy in some embodiments can be configured not to decrement the SI value when its corresponding SVM decremented it.

In either configuration, the service proxy identifies the next hop network address by using the appropriate SPI/SI values to identify the next-hop forwarding rule applicable to the data message. When the proxy's service node is on multiple service paths, the proxy's forwarding rule storage stores multiple exact match forwarding rules that can specify different next hop network addresses for different SPI/SI values associated with different service paths. Assuming that the decremented SI value is not zero, the next hop in the service path is another service node. Hence, the proxy in some embodiments provides the next hop's MAC address to the proxy's associated STL module 626 in the SVM's egress datapath. This module then re-formats the data message, by specifying the SVM's MAC address and the next hop's MAC address as the source and destination MAC addresses and storing the original source and destination MAC addresses of the data message in the stored set of attributes stored for the data message. The STL module 626 then forwards the data message along the egress path, where it reaches the software switch, which then has to forward the data message and its stored attributes to the next hop service node.

When the next hop is on the same host computer, the software switch passes the data message and its attributes to the port that connects to the STL module of the next hop's service node, as described above. On the other hand, when the next hop service node is on another host computer, the software switch provides the data message to the uplink port that connects to the VTEP (VXLAN Tunnel Endpoint) that communicates through an overlay network tunnel with a VTEP on the other host computer. An encap processor 628 then captures this data message along the egress path of this port, defines an encapsulating overlay header for this data message and encapsulates the data message with this overlay header. In some embodiments, the overlay header is a single header that stores both SMD and STL attributes. For instance, in some embodiments, the overlay header is a Geneve header that stores the SMD and STL attributes in one or more TLVs.

As mentioned above, the SMD attributes in some embodiments include the SCI value, the SPI value, the SI value, and the service direction. Also, in some embodiments, the STL attributes includes the original L2 source MAC address, the original L2 destination MAC address, the data message direction, and the service-plane source MAC address of the source GVM. In some embodiments, the service direction and the service-plane source MAC address are already part of the SMD attributes. The service transport layer in some embodiments needs these attributes with each processed data message, in order to recreate the original data message and later at the end of the service-path, to return the data message to the original host to resume along its datapath.

When the encapsulated data message is received at the next hop's host computer, the data message is captured by the encap processor 628 of the software switch's downlink port that connects to the VTEP that received the data message from the prior hop's VTEP. This encap processor removes the encapsulation header from the data message and stores the STL and SMD attributes as the set of attributes of the data message. It then passes the decapsulated message to the downlink port, which then passes it to the software switch to forward to the next hop's switch port. From there the data message is processed by the STL module and service proxy before reaching the service node, as described above.

When the service proxy determines that the decremented SI value is zero, the service proxy matches the decremented SI value and the embedded SPI value with a rule that directs the service proxy to identify the next hop as the service plane MAC address of the source GVM. In some embodiments, this determination is not specified by a forwarding entry of a forwarding table, but rather is hard coded into the logic of the service proxy. Hence, when the SI value is zero, the proxy provides the source GVM's service plane MAC address to its associated STL module 626 to use to forward the data message back to the GVM's host computer. The STL module then defines the message's destination MAC (DMAC) address as the source GVM's service plane MAC address while defining the message's source MAC (SMAC) address as the service plane MAC address associated with its service node (e.g., the service plane MAC of the software switch's port associated with the service node). It also stores the original SMAC and DMAC of the data message in the attribute set of the data message.

The STL module then passes the formatted data message and its attributes along the egress path, where it reaches it associated software switch port. The software switch then passes this message to its uplink port. The encap processor 628 of this port then captures this data message, defines an encapsulating overlay header for this data message and encapsulates the data message with this overlay header. As mentioned above, this overlay header is a Geneve header that stores the SMD and STL attributes in one or more TLVs. This encapsulated data message then traverses the overlay network to reach the source GVM's host computer, where this data message is decapsulated by the downlink port's encap processor, and is then provided to the software switch, which then forwards it to the port proxy.

Once the port proxy 620 receives the decapsulated data message, it identifies the GVM associated with this data message from the original source MAC address that is now part of the decapsulated data message's stored attributes. In some embodiments, the port proxy has a record that maps the original source MAC address and service direction in the SMD attributes of a received data to a GVM on its host (e.g., to a software switch port associated with a guest forwarding plane and a GVM on its host). The port proxy then formats the data message to include its original SMAC and DMAC and provides the data message back to the source GVM's IO chain. The SI post-processor 612 in this IO chain then processes this data message, before returning this data message to the egress datapath of the GVM. The operations of this post-processor will be further described below.

One of ordinary skill will realize that the service insertion layer and service Transport layer in other embodiments are implemented differently than the exemplary implementations described above. For instance, instead of using an L2 overlay (L2 transport layer) that relies on MAC addresses to traverse the different service hops, other embodiments use an L3 overlay (L3 transport layer) that uses L3 and/or L4 network addresses to identify successive service hops. Also, the above-described service insertion and/or transport modules can be configured to operate differently.

Figure 7:
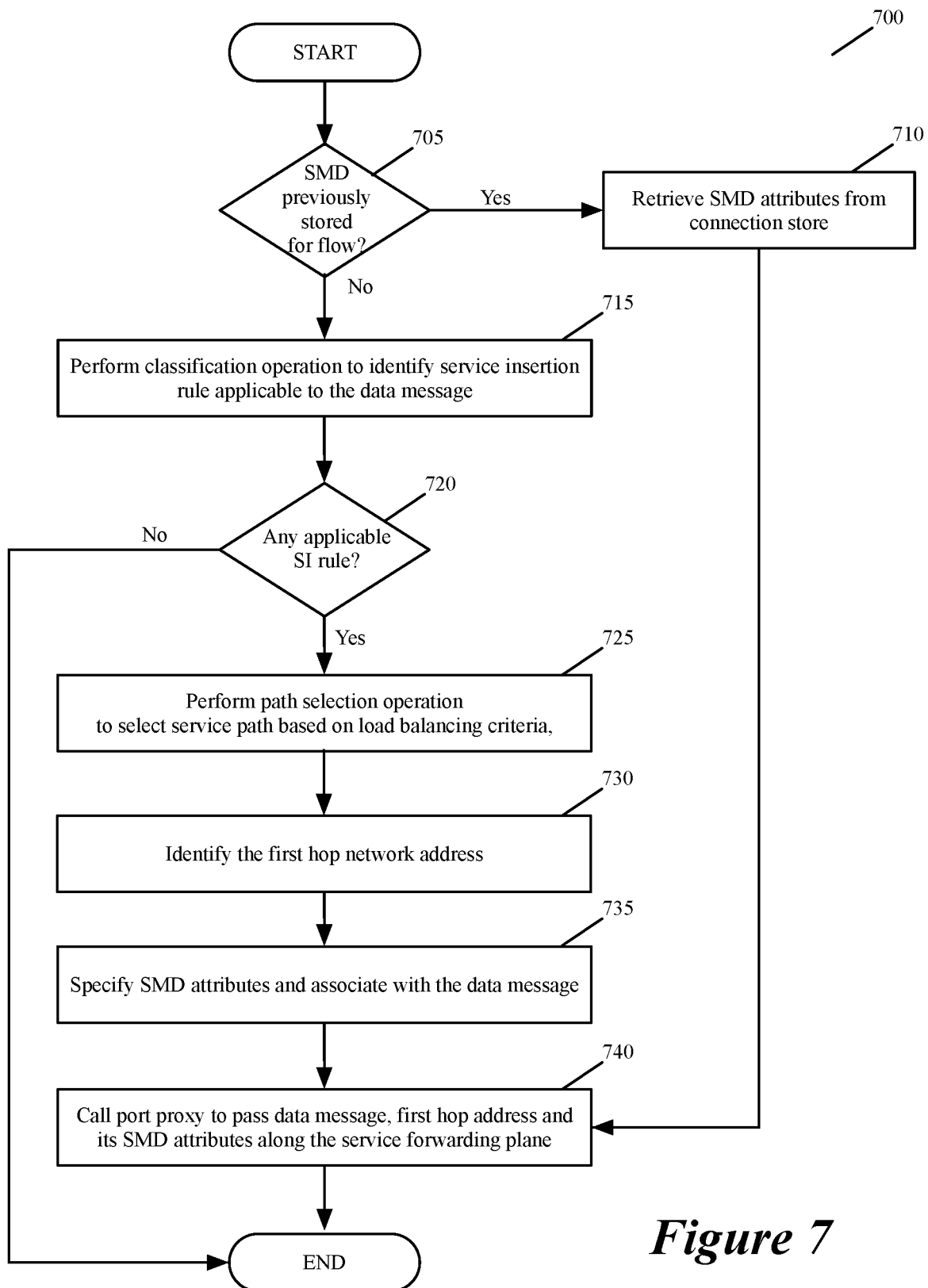
FIG. 7 illustrates a process performed by a service index pre-processor and a service transport layer caller of some embodiments.

A more detailed example of the operations of the service insertion and service transport layers will now be described by reference to FIGS. 7-16. FIG. 7 illustrates a process 700 performed by the SI pre-processor 610 and STL caller 624 of some embodiments. This process is described below by reference to the data flow example illustrated in FIG. 8. The process 700 starts when the SI pre-processor 610 is called to analyze a data message that is sent along the ingress or egress datapath of a GVM.

As shown, the process 700 initially determines (at 705) whether the pre-processor 610 has previously selected a service chain and a service path for the data message's flow and stored the SMD attributes for the selected service chain and path. In some embodiments, the process 700 makes this determination by using the data message's attributes (e.g., its five tuple attributes) to try to identify a record for the message's flow in a connection tracker that stores records of message flows for which service chains and paths were previously selected, and SMD attributes were previously stored for these chains and paths in the connection tracker records.

Figure 8:
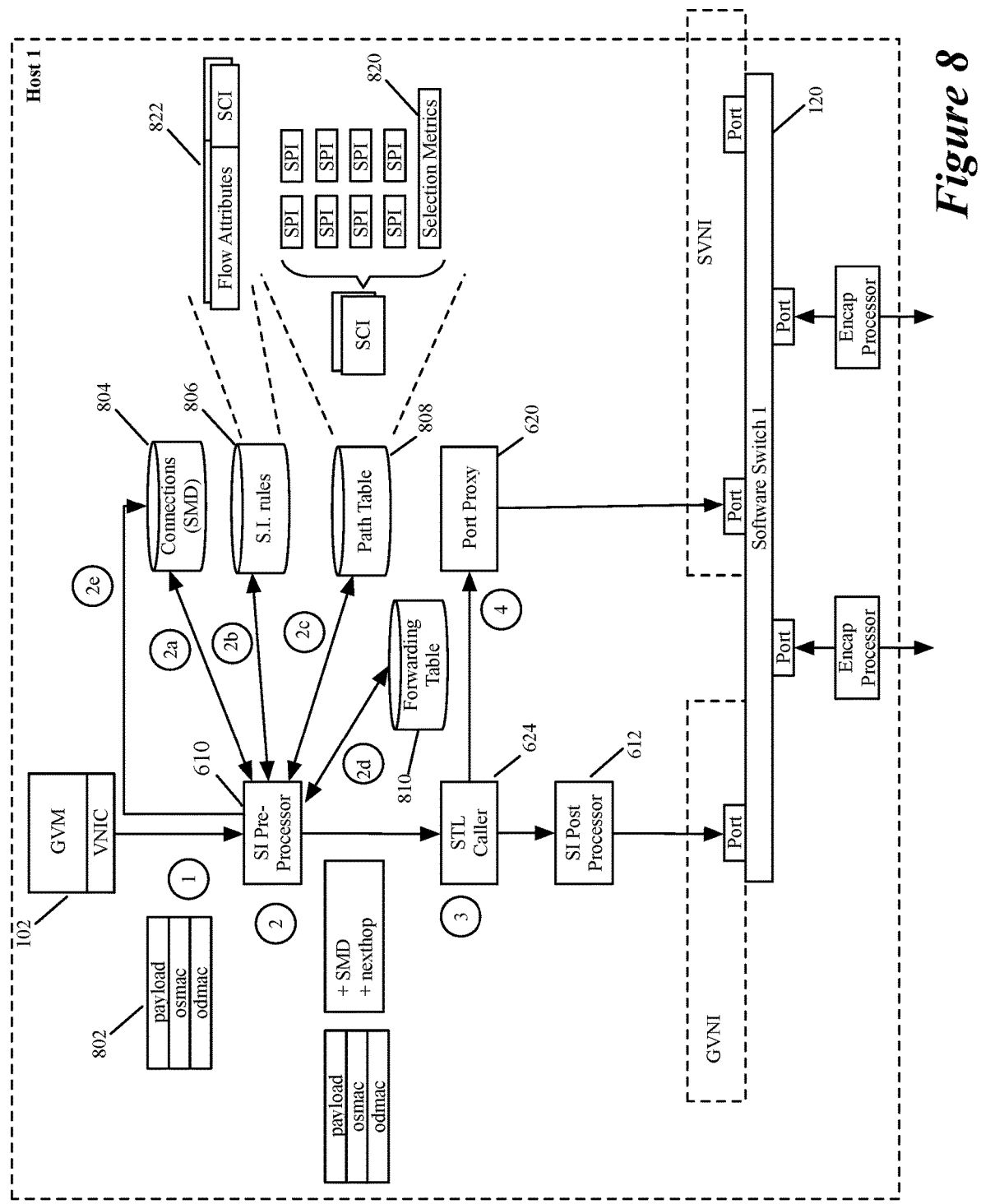
FIG. 8 illustrates a data flow example corresponding to the process described in FIG. 7.

FIG. 8 illustrates the pre-processor 610 receiving a data message 802 along the egress datapath of the GVM 102. It also shows the pre-processor initially checking a connection tracking storage 804 to try to find a connection record that has a flow identifier (e.g., a five-tuple identifier) that matches a set of attributes (e.g., five tuple attributes) of the received data message. In this example, the pre-processor 610 cannot find such a connection record as the received data message is the first data message for its flow.

When the process 700 determines (at 705) that the connection storage 804 has a connection record that matches the received data message, the process retrieves (at 710) the SMD attributes from this record, or from another record referenced by the matching connection record. The SMD attributes in some embodiments include the SCI, SPI, SI and direction values. From 710, the process transitions to 740, which will be described below.

On the other hand, when the process 700 determines (at 705) that the connection storage 804 does not have a connection record that matches the received data message, the process performs (at 715) a classification operation that tries to match the data message to a service insertion rule in a SI rule storage, which is illustrated in FIG. 8 as storage 806. In some embodiments, the SI rule storage 806 stores service insertion rules 822 that have rule identifiers defined in terms of one or more data message flow attributes (e.g., one or more of the five tuple attributes or portions thereof). Each service rule also specifies a SCI that identifies a service chain that is applicable to data message flows that match the rule identifier of the service rule.

At 720, the process determines whether the classification operation matches the data message's attributes to the rule identifier of a service insertion rule that requires a service chain to be performed on the data message. When the classification operation does not identify a service insertion rule that requires a service chain to be performed on the data message, the process 700 ends. In some embodiments, the SI rule storage 806 has a default low priority rule that matches any data message when the data message's attributes do not match any higher priority SI rule, and this default low priority rule specifies that no service chain has been defined for the data message's flow. No service chain is defined for a data message flow in some embodiments when no service operations needs to be performed on the data message flow.

On the other hand, when the classification operation matches the data message's attributes to the rule identifier of a service insertion rule that requires a service chain to be performed on the data message, the process 700 performs (725) a path selection operation to select a service path for the service chain specified by the service insertion rule identified at 715. As shown in FIG. 8, the pre-processor 610 performs a path-selection operation by examining a path storage table 808 that identifies one or more service paths for each service chain identifier.

Each service path is specified in terms of its SPI value. When multiple service paths are specified for a service chain, the path storage 808 stores for each service chain a set of selection metrics 820 for selecting one SPI from the available SPIs. Different embodiments use different selection metrics. For instance, some embodiments use a selection metric that costs a service path based on the number of hosts on which the service nodes of the service path execute. In other embodiments, these selection metrics are weight values that allow the pre-processor to select SPIs for a service chain in a load balanced manner that is dictated by these weight values. For instance, in some embodiments, these weight values are generated by a central control plane based on the load on each of the service nodes in the service path and/or based on other costs (such as number of hosts traversed by the service path, etc.).

In some of these embodiments, the pre-processor maintains a record of previous selections that it has made for a particular service chain, and selects subsequent service paths based on these previous selections. For example, for four service paths, the weight values might be 1, 2, 2, 1, which specify that on six successive SPI selections for a service chain, the first SPI should be selected once, the second and third SPIs should then be selected twice each, and the fourth SPI should be selected one. The next SPI selection for this service chain will then select the first SPI, as the selection mechanism is round robin.

In other embodiments, the weight values are associated with a numerical range (e.g., a range of hash values) and a number is randomly or deterministically generated for each data message flow to map the data message flow to a numerical range and thereby to its associated SPI. In still other embodiments, the hosts LCP selects one service path for each service chain identifier from the pool of available service paths, and hence stores just one SPI for each SCI in the path table 808. The LCP in these embodiments selects the service path for each service chain based on costs (such as the number of hosts traversed by each service path and/or the load on the service nodes of the service paths).

After identifying a service path for the identified service chain, the process 700 next identifies (at 730) the network address for the first hop of the selected service path. In some embodiments, the MAC address for this hop is stored in the same record as the selected path's SPI. Hence, in these embodiments, this MAC address is retrieved from the path selection storage 808 with the selected SPI. In other embodiments, the pre-processor retrieves the first hop's MAC address from an exact match forwarding table 810 that stores next hop network addresses for associated pairs of SPI/SI values, as shown in FIG. 8. In some embodiments, the initial SI values for the service chains are stored in the SI rules of the SI rule storage 806, while in other embodiments, these initial SI values are stored with the SPI values in that path table 808.

At 735, the process 700 specifies the SMD attributes for the data message, and associates these attributes with the data message. As mentioned above, the SMD attributes include in some embodiments the SCI, the SPI, SI and direction values. The service directions for service paths are stored with the SPI values in the path table 808 as the directions through the service chains are dependent on the service paths. Also, as mentioned below, a service chain in some embodiments has to be performed in a forward direction for data messages from a first GVM to a second GVM, and then in the reverse direction for data messages from the second GVM to the first GVM. For such service chains, the pre-processor 610 selects both the service path for the forward direction and the service path for the reverse direction when it processes the first data message in the flow from the first GVM to the second GVM.

After the SI pre-processor completes its operation, the STL caller 624 in the same datapath calls (at 740) the STL port proxy 620 to relay the SMD attributes and first hop's network address that the pre-processor identified, so that the port proxy can forward the SMD attributes through the service plane to the first hop. The operation of the port proxy 620 as well as other modules in the service insertion layers and service transport layers will be described by reference to FIGS. 9-16. These figures describe an example of processing the data message from GVM 102 through a service path that includes the SVM 106, then SVM 108 and then SVM 110.

In these figures, each GVM is a compute machine of a tenant in a multi-tenant datacenter, and connects to the software switch through a switch port that is associated with a guest VNI (GVNI) of the tenant. Also, in these figures, each SVM is a service machine for processing the GVM message traffic, and connects to the software switch through a switch port that is associated with a service VNI (SVNI) of the tenant. As mentioned above and further described below, some embodiments use the GVNI for performing the guest logical forwarding operations (i.e., for establishing a guest logical forwarding element, e.g., a logical switch or router, or a guest logical network) for the tenant, while using the SVNI for performing the service logical forwarding operations for the tenant (i.e., for establishing a service logical forwarding element, e.g., a logical switch or router, or a service logical network).

Both of these logical network identifiers (i.e., the GVNI and SVNI) are generated for the tenant by the management or control plane in some embodiments. The management or control plane of some embodiments generates different GVNIs and SVNIs for different tenants such that no two tenants have the same GVNI or SVNI. In some embodiments, each SVM is dedicated to one tenant, while in other embodiments, an SVM can be used by multiple tenants. In the multi-tenant situation, each SVM can connect to different ports of different service planes (e.g., different logical switches) for different tenants.

Figure 9:
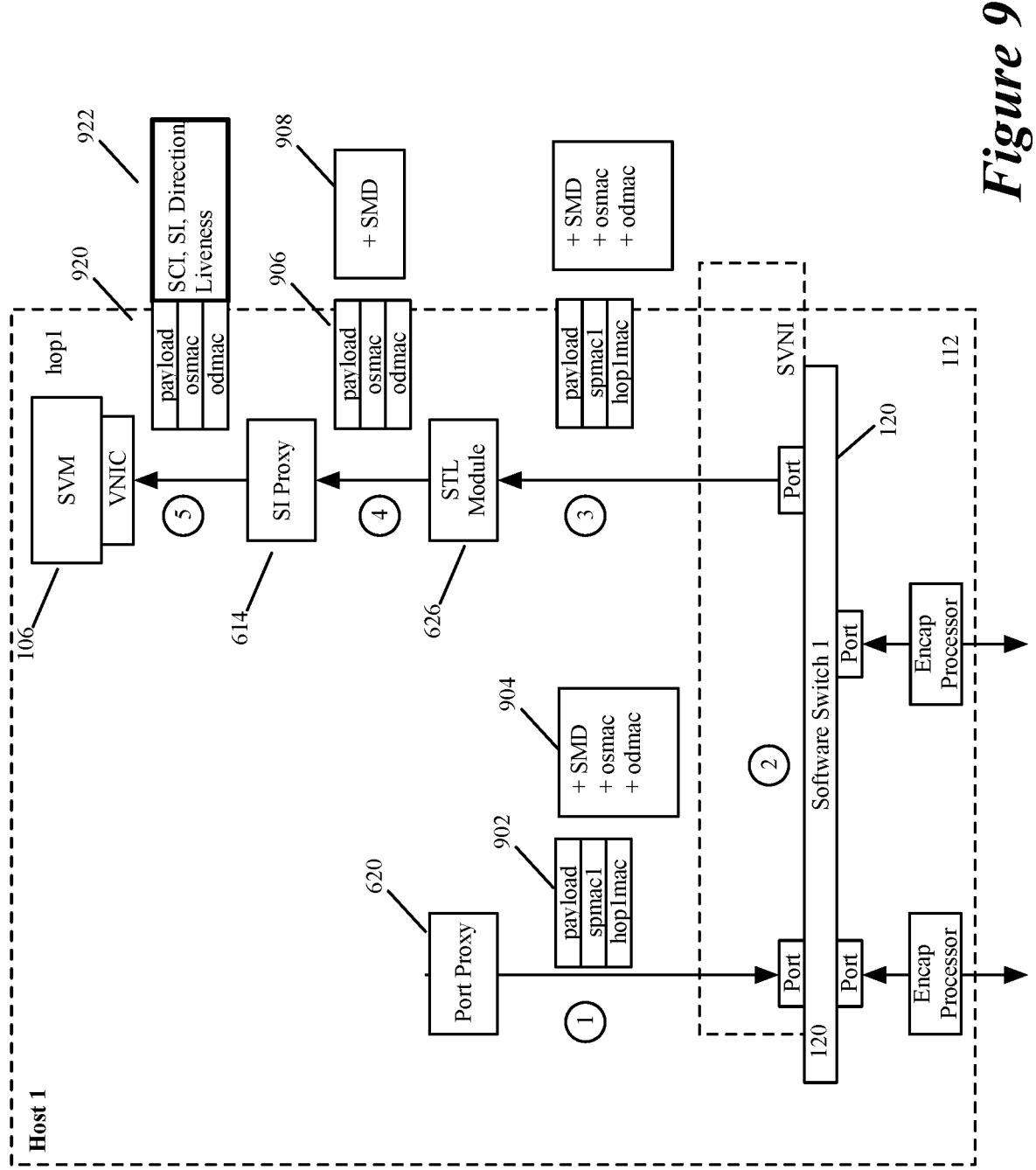
FIG. 9 illustrates an operation of a port proxy of some embodiments for formatting a data message for forwarding by a first service node.

As shown in FIG. 9, the port proxy 620 formats the data message for forwarding to the first service node, by replacing the original source and destination MAC addresses in the data message with a service plane MAC address that is associated with the source GVM 102 and the MAC address of the first hop service node. This operation is depicted as operation 1005 in the process 1000 of FIG. 10. This process 1000 is a process that the port proxy 620 or STL module 626 starts whenever an SI module (such as an SI pre-processor 610 or a SI proxy 614) is done processing a data message.

In this process 1000, the port proxy also adds (at 1010) the original source and destination MAC addresses of the data message to the set of attributes for the data message that should be processed by other service transport layer modules (e.g., the vswitch, other STL modules, the encap processor, etc.) on the same host computer. The reformatted data message 902 and the augmented attributed set 904 are depicted in FIG. 9.

After reformatting the data message and augmenting its attribute set, the port proxy 620 passes (at 1015) the formatted data message along with its stored attribute set along its egress path where it reaches the software switch 120. Based on the destination MAC address (e.g., the first hop MAC address) of the formatted data message, the software switch determines (at 1020) whether the next hop's port is local. This is the case for the example illustrated in FIG. 9. Hence, the software switch delivers (at 1025) the data message to the switch port associated with the first hop SVM 106. This port then sends the data message along the SVM's ingress path, where the data message 902 and its augmented attribute set 904 is identified by the STL module 626 through a function call of the ingress IO chain of the first hop's SVM, as shown in FIG. 9.

This STL module 626 then re-formats (at 1030) the data message by replacing the GVM's service plane MAC address and the first hop MAC address (i.e., the MAC address of SVM 106) with the original source and destination MAC addresses of the data message, which it retrieves from the augmented attribute set 904. In retrieving the original SMAC and DMAC addresses, the STL module 626 modifies the data message's attribute set. The reformatted data message 906 and the modified attributed set 908 are depicted in FIG. 9. The STL module then passes this re-formatted data message with its accompanying SMD attributes along the SVM's ingress path, where it is next processed by this hop's ingress service proxy 614.

Figure 11:
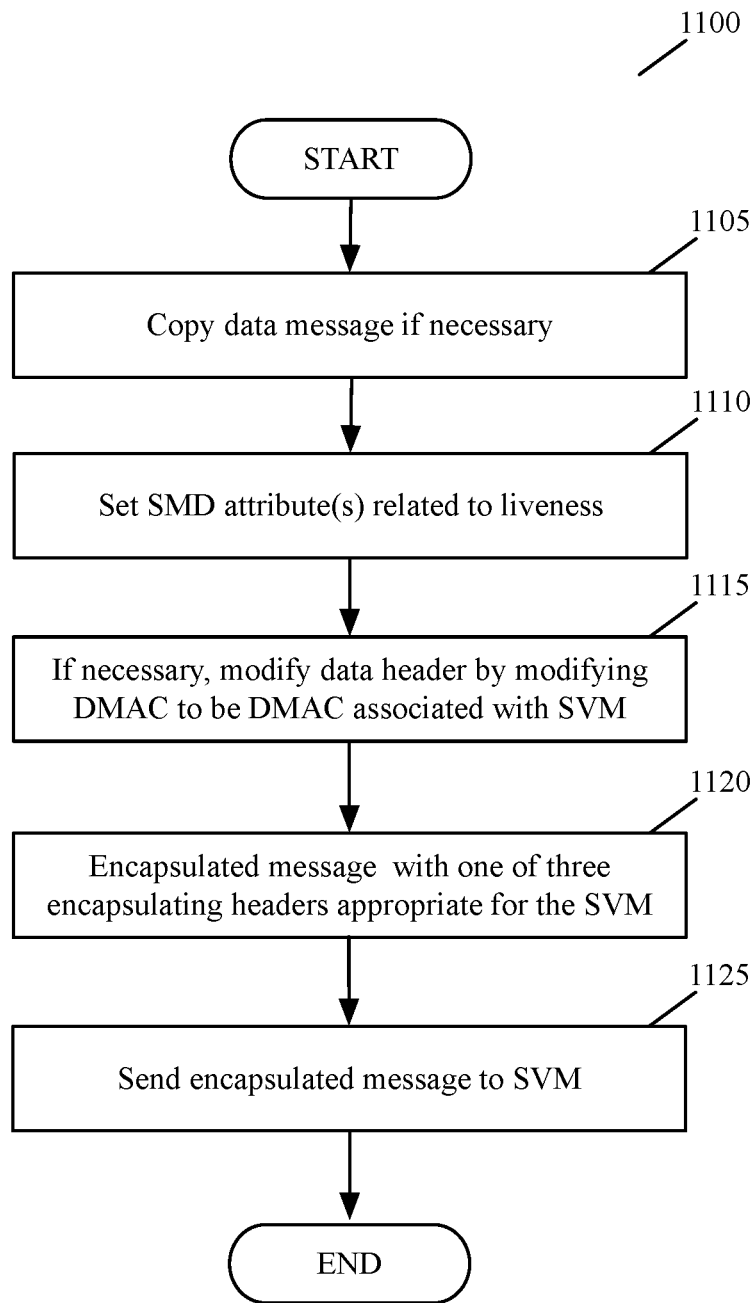
FIG. 11 illustrates a process that the service proxy of FIG. 6 performs in some embodiments each time it receives a data message traversing along an ingress path of a service node.

FIG. 11 illustrates a process 1100 that the service proxy 614 performs in some embodiments each time it receives a data message traversing along the ingress path of a service node. As shown, the service proxy initially makes (at 1105) a copy of the data message if necessary. For instance, in some embodiments, the service node only needs to receive a copy of the data message to perform its operations. One example of such a service node would a monitoring SVM that needs to obtain a data message copy for its message monitoring or mirroring operation.

In these embodiments, the service proxy copies the data messages and performs the remaining operations 1110-1125 with respect to this copy, while passing the original data message to the next service hop or back to the source GVM. To forward the original data message to the next service hop or back to the GVM, the service proxy has to perform a next-hop lookup based on the SPI/SI values and then provide the next-hop address (e.g., the next service hop's address or the service plane MAC of the source GVM) to the STL module to forward. These look up and forwarding operations are similar to those described below by reference to FIGS. 12-14.

Next, at 1110, the service proxy sets a liveness attribute in the stored SMD attribute set of the data message (which, in some embodiments, might be the data message copy at this point). This liveness attribute is a value that directs the service node to provide a responsive liveness value (the same value or related value) with the data message once it has processed the data message. With this liveness attribute, the service proxy also provides a sequence number, which the service node has to return, or increment and then return, with the responsive liveness value, as described above.

At 1115, the service proxy formats the data message, if necessary, to put it in a form that can be processed by the service node. For instance, when the service node does not know the current next hop MAC that is set as the destination MAC of the data message, the service proxy changes the destination MAC of the message to a destination MAC associated with the service node.

After formatting the data message to sanitize it for forwarding to the service node, the service proxy 614 encapsulates (at 1120) the data message with one of three encapsulation headers that it can be configured to use, and passes (at 1125) the encapsulated message along the service node's ingress path so that it can be forwarded to the service node. FIG. 9 illustrates the encapsulated data message 920 passing from the service proxy to the SVM 106 with a native NSH encapsulation header. As shown, the encapsulating header 922 includes the service chain identifier, the service index, service chain direction and liveness signal. Numerous techniques for applying and using encapsulating headers are described in U.S. patent application Ser. No. 16/444,826, now published as U.S. Patent Publication 2020/0274826, which is incorporated herein by reference. Any of these techniques can be used in conjunction with the embodiments described herein.

The SVMs of some embodiments perform service operations on data messages, then encapsulate the message with an encapsulating header and provide the encapsulated message to the service proxy. Various service operations performed by SVMs of some embodiments are described in U.S. patent application Ser. No. 16/444,826, which is incorporated herein by reference. Any of these operations can be performed by SVMs in conjunction with the embodiments described herein.

Figure 12:
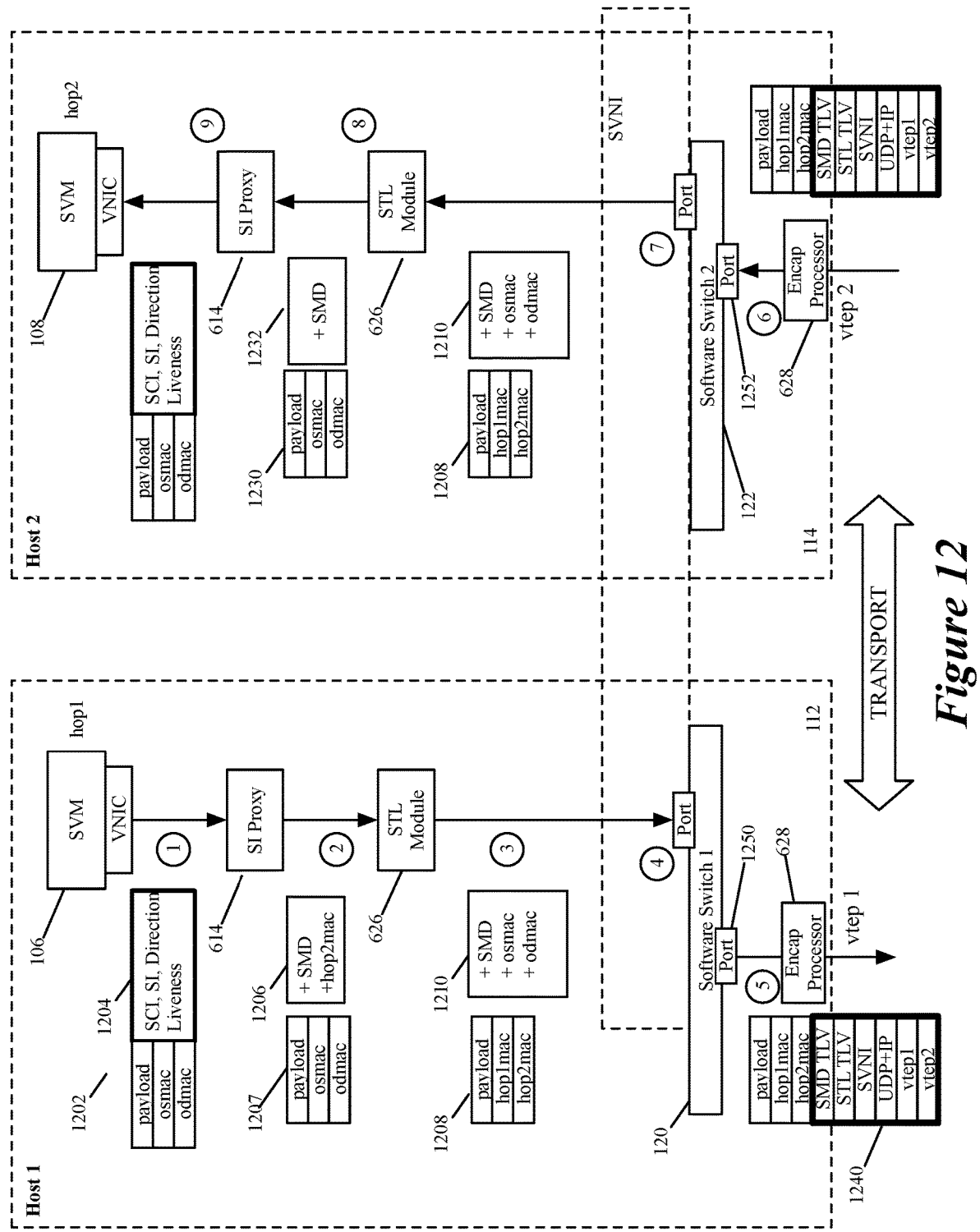
FIG. 12 illustrates an example of a data message in some embodiments being forwarded from a first hop service node to a second hop service node.

In some embodiments, the SVM can also set flow programming attribute(s) in the encapsulating header to direct the service proxy to modify the service processing of the data message's flow. This flow programming will be further described below. After encapsulating the data message, the SVM forwards the data message along its egress path. FIG. 12 illustrates an example of SVM 106 returning the encapsulated data message 1202 with the SMD and liveness attributes in its encapsulating header 1204.

Figure 13:
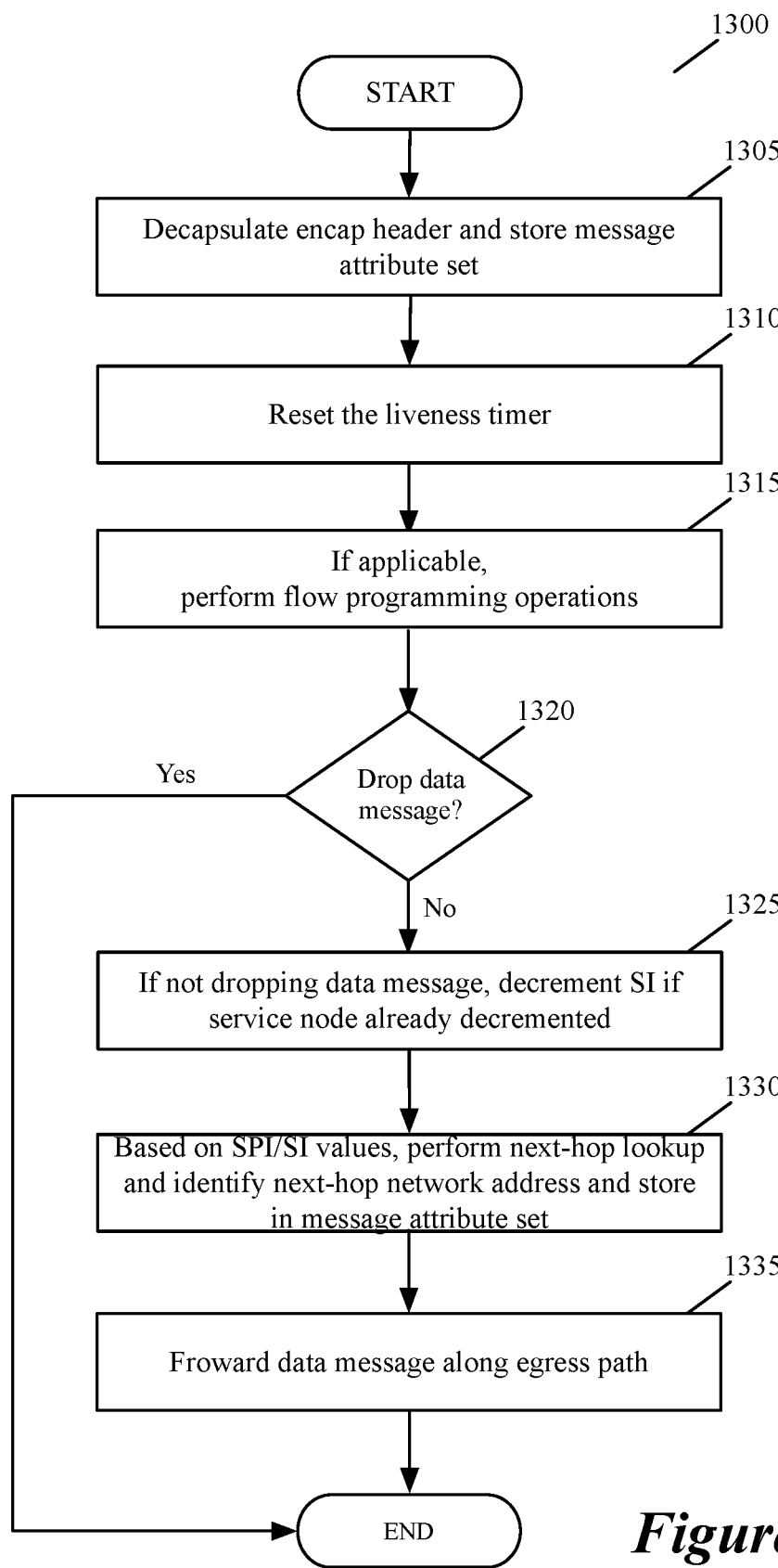
FIG. 13 conceptually illustrates a process that a service proxy performs in some embodiments each time it receives a data message traversing along an egress path of its service node.

FIG. 13 illustrates a process 1300 that the service proxy 614 performs in some embodiments each time it receives a data message traversing along the egress path of its service node. As shown, the service proxy in some embodiments initially (at 1305) removes the encapsulation header from the data message, removes the SMD attributes from this header, and stores these attributes in an attribute set that it creates for the data message. In some embodiments, the service proxy retrieves (at 1305) some or all of the SMD attributes (e.g., the SPI value, the service plane MAC address of the source GVM) for the data message from a previous record that the service proxy created before giving the data message to the service node along the ingress path. FIG. 12 illustrates an example of the attribute set 1206 that the service proxy 614 creates for the decapsulated data message 1207.

Next, 1310, the process resets the liveness timer (e.g., a timer that expires every 0.25 seconds) that it maintains to account for the liveness value that it has received from the service node, which signifies that this node is still operational. With this liveness value, the service proxy receives from the service node a sequence number, which the process validates to ensure that it is the next liveness value that needs to be received.

At 1315, the process determines whether the SVM specified any flow programming attribute(s), which require the service proxy to direct the SI post processor 612 for the source GVM to perform flow programming by sending to the post processor 612 in-band data messages. In some embodiments, the service proxy sends an in-band flow programming control signal with another data message that it generates to send back to the source GVM, where it will be intercepted by its post processor 612.

When the source GVM receives the data message with the flow programming control signal, its post processor can uniquely identify the data message flow to which it applies by using a flow identifier that is unique to this flow. As further described below, this flow identifier is derived partially based on a unique identifier of the source GVM. The unique flow identifier also allows other service plane modules, such as the service nodes, service proxies and STL modules, to uniquely identify each data message flow. This unique flow identifier in some embodiments is part of the SMD attributes that are passed between the service hops of a service path and passed back to the source GVM.

In some embodiments, however, the service proxy sends the in-band flow programming control signal with the current data message that it is processing. In some of these embodiments, the service proxy does this only when its associated service node is the last hop service node of the service path, while in other embodiments it does this even when its service node is not the last hop service node. When its service node is not the last hop service node of the service path, the service proxy embeds the flow programming in the SMD attributes of the data message, which in some embodiments eventually get forwarded to the source GVM's SI post processor as part of the data message encapsulation header when the last hop service is performed. Even in this situation, the service proxy of the last hop in other embodiments sends the flow programming signal as a separate message.

Figure 17:
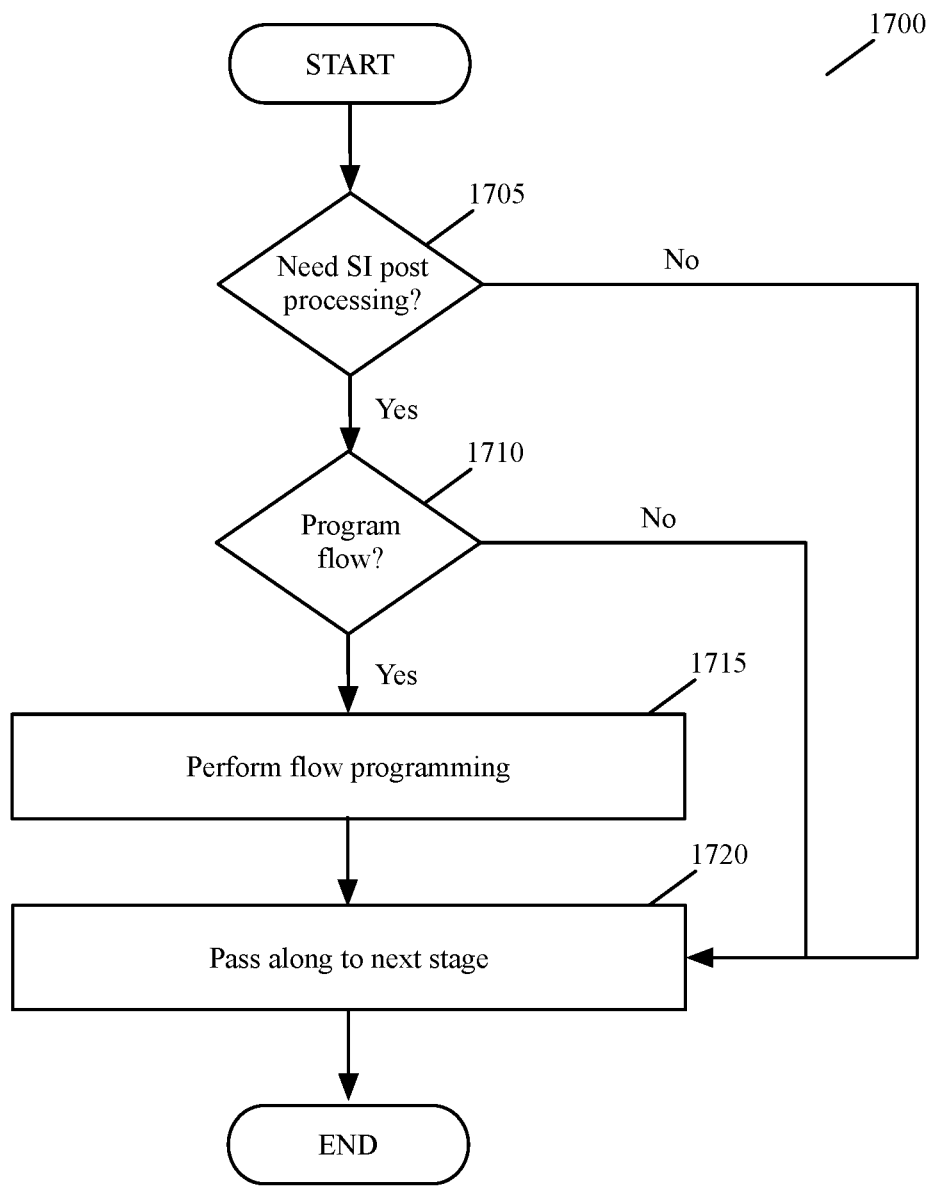
FIG. 17 conceptually illustrates a process that a service index post-processor performs in some embodiments.

The flow programming signals will be further described below by reference to FIG. 17. Also, as further described below, the service proxy also sends flow programming signals back to the source GVM when it detects that its service node has failed so that the classifier at the source GVM can select another service path for the current data message flow, as well as other data message flows. In such a situation, the service proxy also notifies the LCP on its host computer, so that the LCP can notify the CCP and the CCP, in turn, can modify the service paths specified for service chains that use the failed service node.

At 1320, the process 1300 determines whether its service node specified that the data message should be dropped. If so, the process drops the data message and then ends. Otherwise, assuming the data message should not be dropped and should continue along its service path, the service proxy in some embodiments decrements (at 1325) the SI value in case the service node has not decremented the SI value, and then uses (at 1330) this decremented value along with the SPI value in the data message's stored attribute set to identify an exact match forwarding rule that identifies a next hop network address. When the proxy's service node is on multiple service paths, the proxy's forwarding rule storage stores multiple exact match forwarding rules that can specify different next hop network addresses for different SPI/SI values.

When the decremented SI value is zero, the service proxy in some embodiments that matches the decremented SI value and the embedded SPI value with a rule that directs the service proxy to identify the next hop as the service plane MAC address of the source GVM. This rule in some embodiments does not provide a MAC address, but rather refers to the service plane MAC address that is part of the SMD attribute set stored for the data message. In some embodiments, this instructions for returning the data message to the service plane MAC address of the source GVM when the SI value is zero is not specified by a forwarding entry of a forwarding table, but rather is hard coded into the logic of the service proxy.

At 1330, the service proxy stores the next hop network address (e.g., MAC address) in the attribute set that is stored for the data message. FIG. 12 illustrates an example of the service proxy 614 storing the next hop MAC address associated with the next service node in the attribute set 1206 of the decapsulated data message 1207. After identifying the next hop network address, the service proxy returns (at 1335) the data message to the egress path of its service node, and the process 1300 ends.

Figure 10:
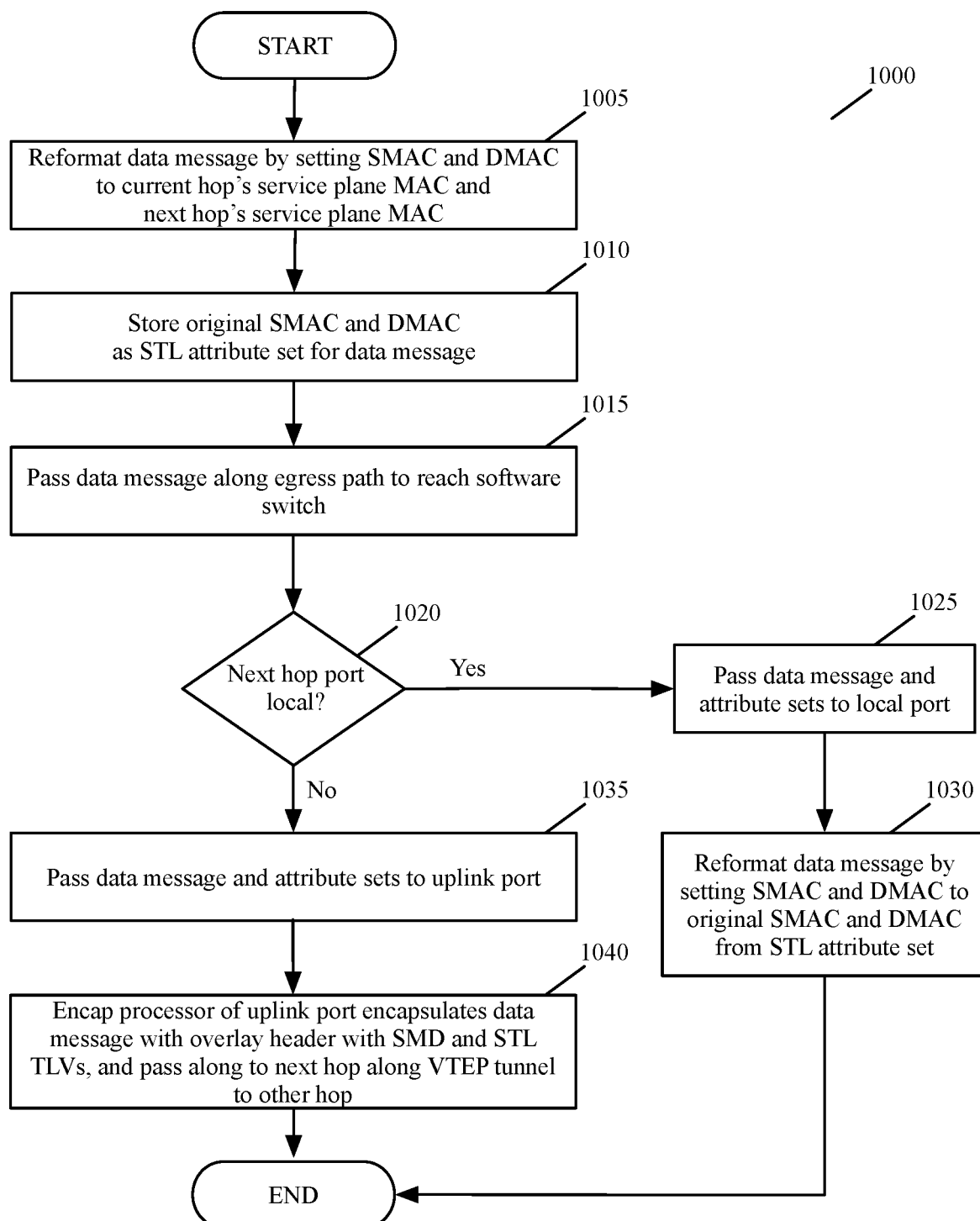
FIG. 10 conceptually illustrates a process of some embodiments for passing a data message in a service path to a next hop.

Once the service proxy returns the data message to the service node's egress path, the STL module 626 receives this data message and commences the process 1000 of FIG. 10. The STL module 626 performs the first three operations 1005-1015 of this process each time it receives a data message from a service insertion layer. Specifically, the STL module formats (at 1005) the data message for forwarding to the next hop service node, by replacing the original source and destination MAC addresses in the data message with a service plane MAC addresses of the current service hop and the next service hop (i.e., the hop1mac and hop2mac addresses in the example illustrated in FIG. 12).

At 1010, the STL module also adds the original source and destination MAC addresses of the data message to the set of attributes for the data message that should be processed by other service transport layer modules (e.g., the vswitch, the encap processor, etc.) on the same host computer. The reformatted data message 1208 and the augmented attributed set 1210 are depicted in FIG. 12. After reformatting the data message and augmenting its attribute set, the STL module 626 passes (at 1015) the formatted data message along the egress path, where it next reaches the software switch 120.

Based on the destination MAC address (i.e., the next hop MAC address) of the formatted data message, the software switch determines (at 1020) that the next hop's port is not local. Hence, the software switch provides (at 1035) the data message to the uplink port 1250 that connects to a VTEP1 that communicates through an overlay network tunnel with a VTEP2 on host 114, as illustrated in the example of FIG. 12. As shown, an STL encap processor 628 along the egress path of this uplink port (at 1040) receives this data message (e.g., is called as one of the hooks specified for the uplink port), defines an encapsulating overlay header 1240 for this data message and encapsulates the data message with this overlay header.

In some embodiments, the overlay header is a Geneve header that stores the SMD and STL attributes in one or more of its TLVs. As mentioned above, the SMD attributes in some embodiments include the SCI value, the SPI value, the SI value, and the service direction. Also, in some embodiments, the STL attributes includes the original L2 source MAC address and the original L2 destination MAC address. FIG. 12 illustrates an example of this encapsulating header.

Figure 14:
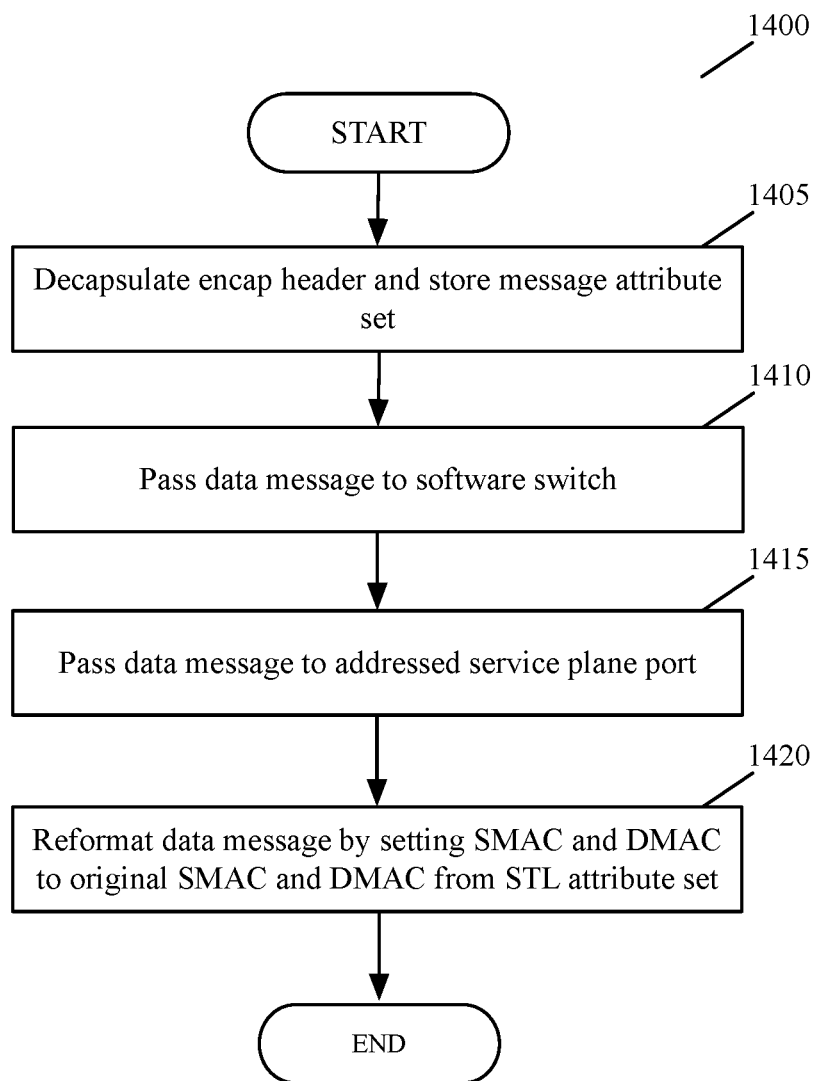
FIG. 14 conceptually illustrates a process started by an encap processor on a next hop computer that receives an encapsulated data message that needs to be processed by an SVM executing on its computer.

When the encapsulated data message is received at the next hop's host computer 114, the data message is captured by the STL encap processor 628 of (e.g., defined as a hook for) a downlink port 1252 that connects to the VTEP connecting through the overlay network tunnel to the prior hop's VTEP. FIG. 14 illustrates a process 1400 started by an encap processor 628 on a next hop computer that receives an encapsulated data message that needs to be processed by an SVM executing on its computer.

As shown, this encap processor removes (at 1405) the encapsulation header from the data message, and stores (at 1405) the STL and SMD attributes as the associated set of attributes of the data message. It then passes (at 1410) the decapsulated message to the downlink port, which then passes it to the software switch to forward (at 1415) to its port that is connected to the next hop SVM (i.e., that is associated with the destination MAC address). This port then passes the data message 1208 and the attribute set 1210 to the ingress path of the next hop SVM, as shown in the example of FIG. 12 for the SVM 108.

The STL module 626 on this ingress path then re-formats (at 1420) the data message by replacing the previous and current hop service plane MAC address (i.e., the hop1mac and hop2mac) with the original source and destination MAC addresses of the data message, which it retrieves from the data message attribute set. In retrieving the original SMAC and DMAC addresses, the STL module 626 modifies the data message's attribute set. The reformatted data message 1230 and the modified attributed set 1232 are depicted in FIG. 12. The STL module then passes this re-formatted data message with its accompanying SMD attributes along the SVM's ingress path, where it is next processed by this hop's ingress service proxy 614.

The operation of this service proxy is as described above by reference to FIGS. 9 and 11. FIG. 12 shows the service proxy of SVM 108 on host 114 passing an encapsulated data message to the SVM. The encapsulating header of this data message is supported by the SVM 108 and stores the SCI, SI, service direction and liveness values. In some embodiments, the SVMs that are part of the same service path support different encapsulating headers. In some of these embodiments, the service proxies along a service path can encapsulate the data message with different encapsulating headers before passing the data message to their associated SVMs. For instance, in one case, the first hop service proxy passes to the SVM 106 the data message with an NSH encapsulating header, while the second hop service proxy passes to the SVM 108 the data message with a QinQ encapsulating header.

Figure 15:
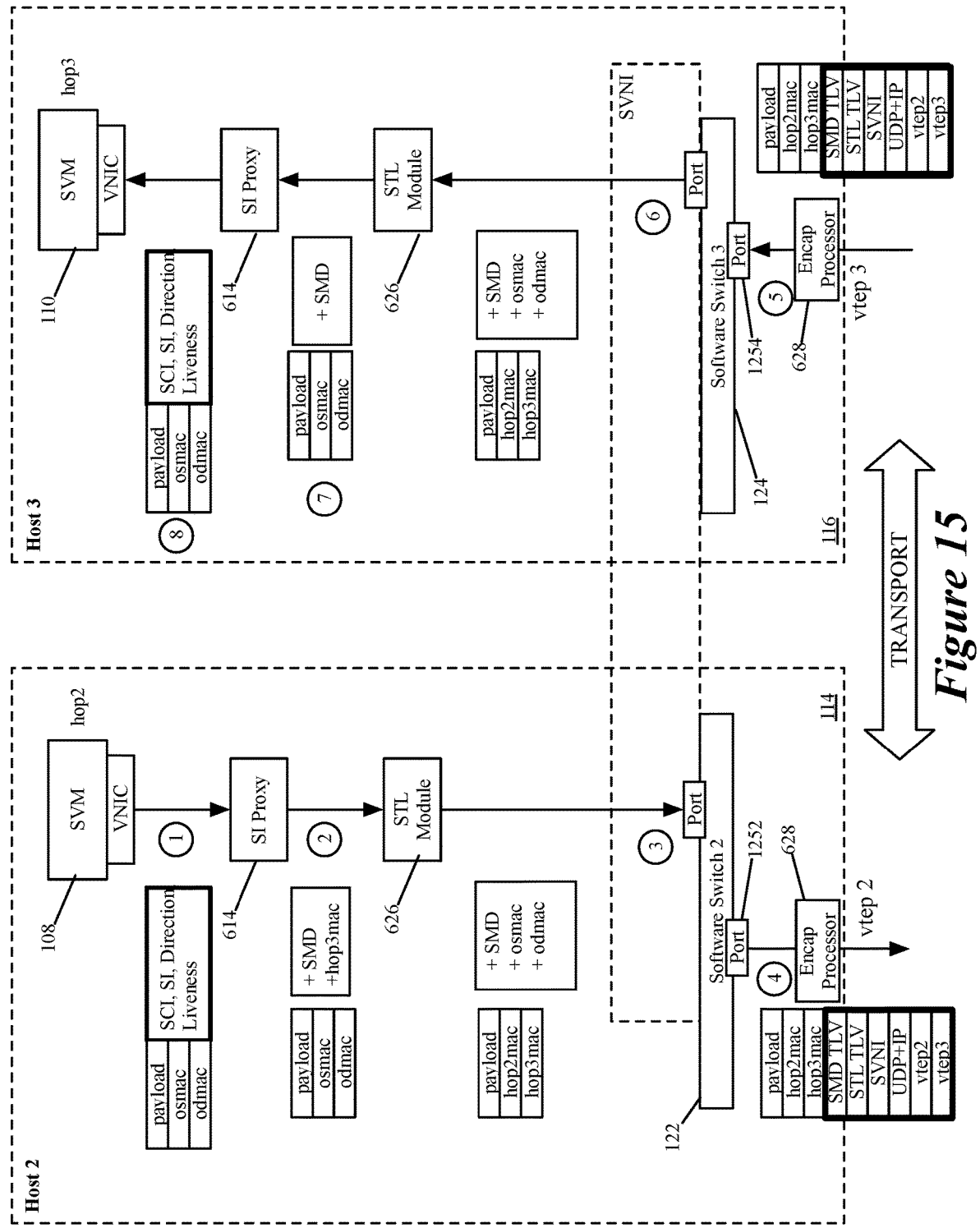
FIG. 15 illustrates an example of a data message in some embodiments being forwarded from a second hop service node to a third hop service node.

Once the SVM 108 performs its service operation on the data message, the SVM sends the processed data message along its egress data path, as shown in FIG. 15. As shown, the service proxy then identifies the MAC address of the next service hop and adds this MAC address to the stored attribute set for the data message. At this point, the next hop is the third service hop, which corresponds to the SVM 110. This proxy identifies this MAC by decrementing the SI value (when the SVM 108 did not decrement the SI value) and then using the embedded SPI value and decremented SI value to lookup a forwarding rule that provides the next hop's MAC address. The STL module in this egress path then replaces the original SMAC and DMAC in the data message with the current hop and next hop MAC addresses (i.e., the hop2mac and the hop3mac in the example of FIG. 15), stores the original SMAC and DMAC in the stored attribute set of the data message, and then passes the data message along the egress path where it is received by the software switch 122.

The software switch then determines that the next hop is associated with its uplink port 1252, and hence passes the data message to this port. As shown in FIG. 15, the encap processor 628 on the egress path of this port (e.g., specified as a hook on this egress path) then encapsulates the data message with a Geneve header that stores the SMD and STL attributes in one or more of TLVs and specifies that the data message is traversing from this port's associated VTEP2 to VTEP3 that is associated with port 1254 of host 116.

The STL encap processor 628 in the ingress path of port 1254 then removes the encapsulation header from the data message and stores the STL and SMD attributes as the associated set of attributes of the data message. It then passes the decapsulated message to the port 1254, which then passes it to the software switch 124 to forward to its port connected to the next hop SVM 110 (i.e., to its port associated with the service plane DMAC). This port then passes the data message and attribute set to the ingress path of this SVM, as shown in FIG. 15.

The STL module 626 in this ingress path replaces the previous and current hop service plane MAC address (i.e., the hop2mac and hop3mac) with the original source and destination MAC addresses of the data message, which it retrieves from the data message attribute set. The STL module 626 also modifies the data message's attribute set by removing the original SMAC and DMAC addresses, and then passes the re-formatted data message with its accompanying SMD attributes along the SVM's ingress path for this hop's ingress service proxy 614 to process. This service proxy passes to the SVM 110 an encapsulated data message with an encapsulating header supported by the SVM 110 and storing the SCI, SI, service direction and liveness values.

Figure 16:
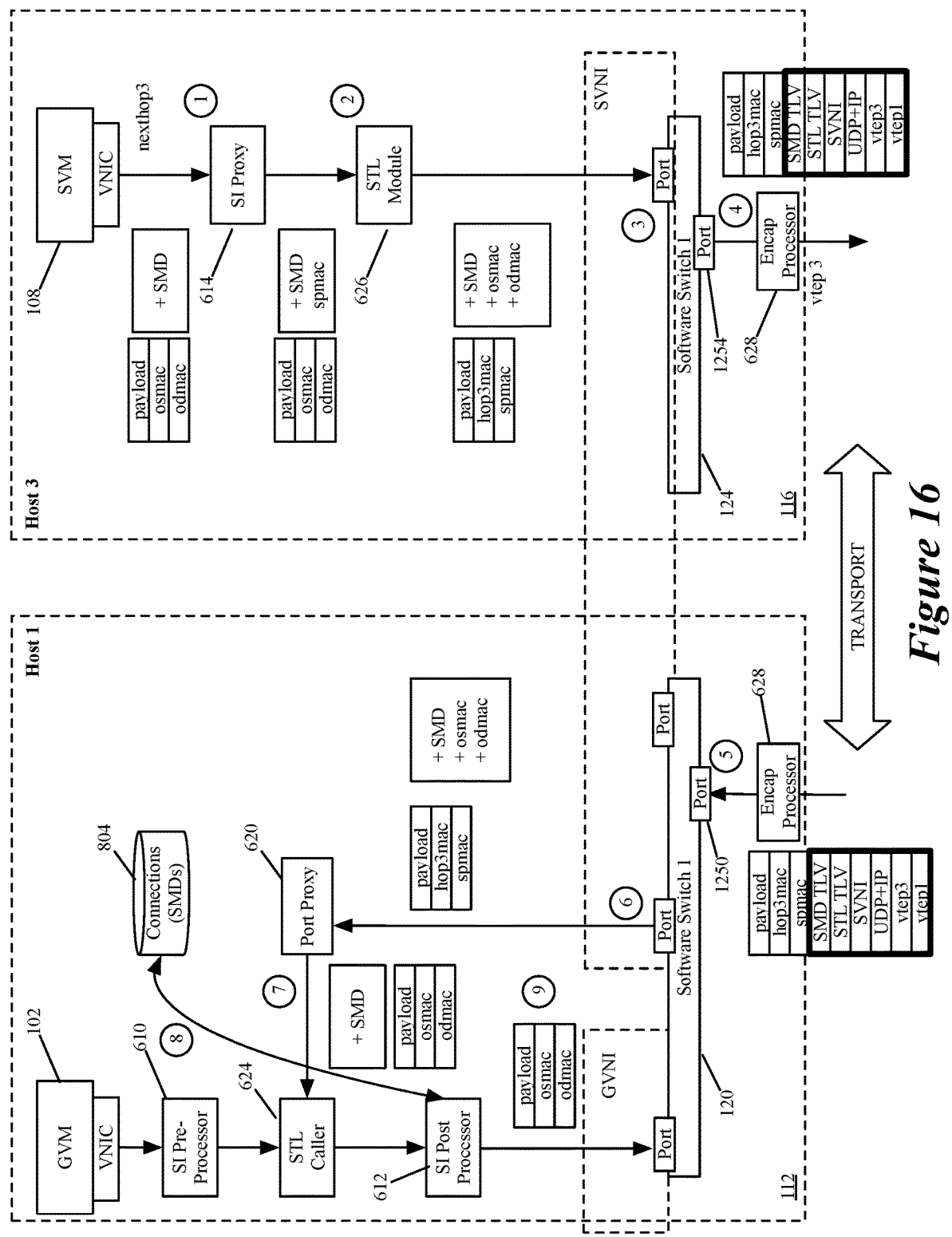
FIG. 16 illustrates an example of a data message in some embodiments being forwarded from a third hop service node back to a first hop service node.

Once the SVM 110 performs its service operation on this data message, the SVM sends the processed data message along its egress data path, as shown in FIG. 16. The service proxy decrements the SI value when assuming that the SVM 110 has not done so already. In this example, the decremented SI value is now zero. In some embodiments, the service proxy then matches this SI value and the SPI value to a rule identifier of a forwarding rule that specifies that it should select the service plane MAC (spmac) of the source GVM as the next hop MAC address. In other embodiments, the hardcoded logic of the service proxy directs it to identify the service plane MAC of the source GVM as the next hop MAC. In either case, the service proxy adds the source GVM's service plane MAC to the attribute set of the data message.

The STL module next replaces the original SMAC and DMAC in the data message with the third hop MAC address and the source GVM's service plane MAC, stores the original SMAC and DMAC in the stored attribute set of the data message, and then passes the data message to its software switch 124. The software switch then determines that the next hop is associated with its port 1254, and hence passes the data message to this port. As shown in FIG. 16, the encap processor 628 on the egress path of this port then encapsulates the data message with a Geneve header that stores the SMD and STL attributes in one or more TLVs and specifies that the data message is traversing from this port's associated VTEP3 to VTEP1 that is associated with port 1250 of host 112.

The STL encap processor 628 in the ingress path of port 1250 then removes the encapsulation header from the data message and stores the STL and SMD attributes as the associated set of attributes of the data message. It then passes the decapsulated message to the port 1250, which then passes it to the software switch 120 to forward to its port connected to the port proxy 620. This port then passes the data message and attribute set to the port proxy 620, as shown in FIG. 16.

The port proxy 620 then replaces the previous and current hop service plane MAC address (i.e., the hop3mac and spmac) with the original source and destination MAC addresses of the data message, which it retrieves from the data message attribute set. The port proxy 620 also modifies the data message's attribute set to remove the original SMAC and DMAC, and then passes this re-formatted data message with its accompanying SMD attributes back to the STL caller 624 that called it in the first place. In some embodiments, the port proxy uses a connection record that it created when the STL caller originally called it, to identify the STL caller to call back. In other embodiments, the port proxy uses a mapping table that maps each service plane MAC with a GVM's STL caller. The mapping table in some embodiments has records that associate service plane MACs and service directions with guest forwarding plane port identifiers associated with the GVMs.

Once called, the STL caller passes the data message along the egress path of GVM 102, where it will next be forwarded to the SI post-processor 612. FIG. 17 illustrates a process 1700 that the SI post-processor 612 performs in some embodiments. The post-processor performs this process 1700 each time it receives a data message that is passed to it along a GVM's IO chain. As shown, the post processor 612 in some embodiments initially determines (at 1705) whether it needs to examine the received data message for SI post processing. This is because as a module along a GVM's IO chain, the post processor will get called for all data message flows that pass along this IO chain and some of these data message might not match an SI rule that requires service insertion operations to be performed on them. In some embodiments, the process 1700 determines (at 1705) whether it needs to process the data message by determining whether the data message has associated service metadata. If not, the process transitions to 1720, which will be described below.

When the SI post processor 612 determines that it needs to process the data message, the process determines (at 1710) whether the SMD metadata associated with the data message specifies a flow programming tag that requires the post processor to perform a flow programming operation. In some embodiments, such a flow programming tag would be specified in the data message's SMD attributes by a service node to change the service path processing at the source GVM, or by a service proxy for the same reason when it detects failure of its service node. When the flow programming tag does not specify any flow programming, the process transitions to 1720, which will be described below.

Otherwise, when the flow programming tag specifies a flow programming operation, the process 1700 performs this operation, and then transitions to 1720. The flow programming operation entails in some embodiments modifying the connection record in the connection tracking storage 804 to specify the desired operation and/or SMD attributes (e.g., allow, drop, etc.) for the data message's flow. The post processor's writing to the connection tracker 804 is depicted in FIG. 16. As mentioned above and further described below, the SMD metadata for the processed data message includes a flow identifier that uniquely identifies the data message's flow by being at least partially derived from the unique service plane identifier of the source GVM. The post processor 612 uses this flow identifier to match the data message's flow in the connection tracker in some embodiments.

In some embodiments, the flow programming tag can specify the following operations (1) NONE when no action is required (which causes no flow programming operation to be performed), (2) DROP when no further data messages of this flow should be forwarded along the service chain and instead should be dropped at the source GVM, (3) ACCEPT when no further data messages of this flow should be forwarded along the service chain and instead the flow should be accepted at the source GVM. In some embodiments, the flow programming tag can also specify DROP_MESSAGE. The DROP_MESSAGE is used when the service node needs to communicate with the proxy (e.g. to respond to a ping request) and wants the user data message (if any) to be dropped, even though no flow programming at the source is desired.

In some embodiments, an additional action is available for the service proxies to internally communicate failure of their SVMs. This action would direct the SI post processor in some embodiments to select another service path (e.g., another SPI) for the data message's flow. This action in some embodiments is carried in-band with a user data message by setting an appropriate metadata field in some embodiments. For instance, as further described below, the service proxies communicate with the post processor of the source GVM through OAM (Operation, Administration, and Maintenance) metadata of the NSH attributes through in-band data message traffic over the data plane. Given that by design flow programming actions are affected by signaling delays and are subject to loss, an SVM or service proxy might still see data messages belonging to a flow that was expected to be dropped, accepted or re-directed at the source for some time after communicating the flow programming action to the proxy. In this case, the service plane should continue set action to drop, allow or redirect at the source.

The process 1700 transitions to 1720 after completing the flow programming operation. It also transitions to 1720 when it determines (at 1705) that no SI post processing needs to be performed on the data message or determines that no flow programming needs to be performed for this data message. At 1720, the process 1700 lets the data message through the egress path of GVM 102, and then ends.

The examples described above by reference to FIGS. 8, 9, 12, 15, and 16 show service plane operations that are performed on a data message that is identified along the egress path of a source GVM. These service plane operations (described by reference to FIGS. 7, 10, 11, 13, 14 and 17) are equally applicable to data messages that are identified as they traverse along the ingress path of a source GVM. To perform these ingress side operations, the SI pre and post processors 610 and 612 on the ingress path are flipped as compared to the locations of these two processors on the egress path. Specifically, as shown in FIG. 6, the preprocessor 610 receives a data message that enters the GVM's ingress path from the software switch port that is associated with this GVM's VNIC, while the post processor 612 passes the processed data message along the ingress IO chain to the GVM's VNIC.

However, the service insertion and service transport operations for the ingress side processing are similar to the egress side processing of data messages to and from a particular GVM. In some cases, this GVM exchanges data messages with another GVM. As described above by reference to FIGS. 4 and 5, the service plane can be directed to perform the same service chain on the data messages in each direction, but in the opposite order. In such cases, the service nodes for the service path on the ingress side perform a series of service operations for a first direction of the service chain for data messages that the other GVM sends to the particular GVM, while the service nodes for the service path on the egress side perform the same series of service operations but in a second, opposite direction through the service chain. Also, as mentioned above, the two sets of service nodes for the forward and reverse directions include the same service nodes in some embodiments.

Figure 18:
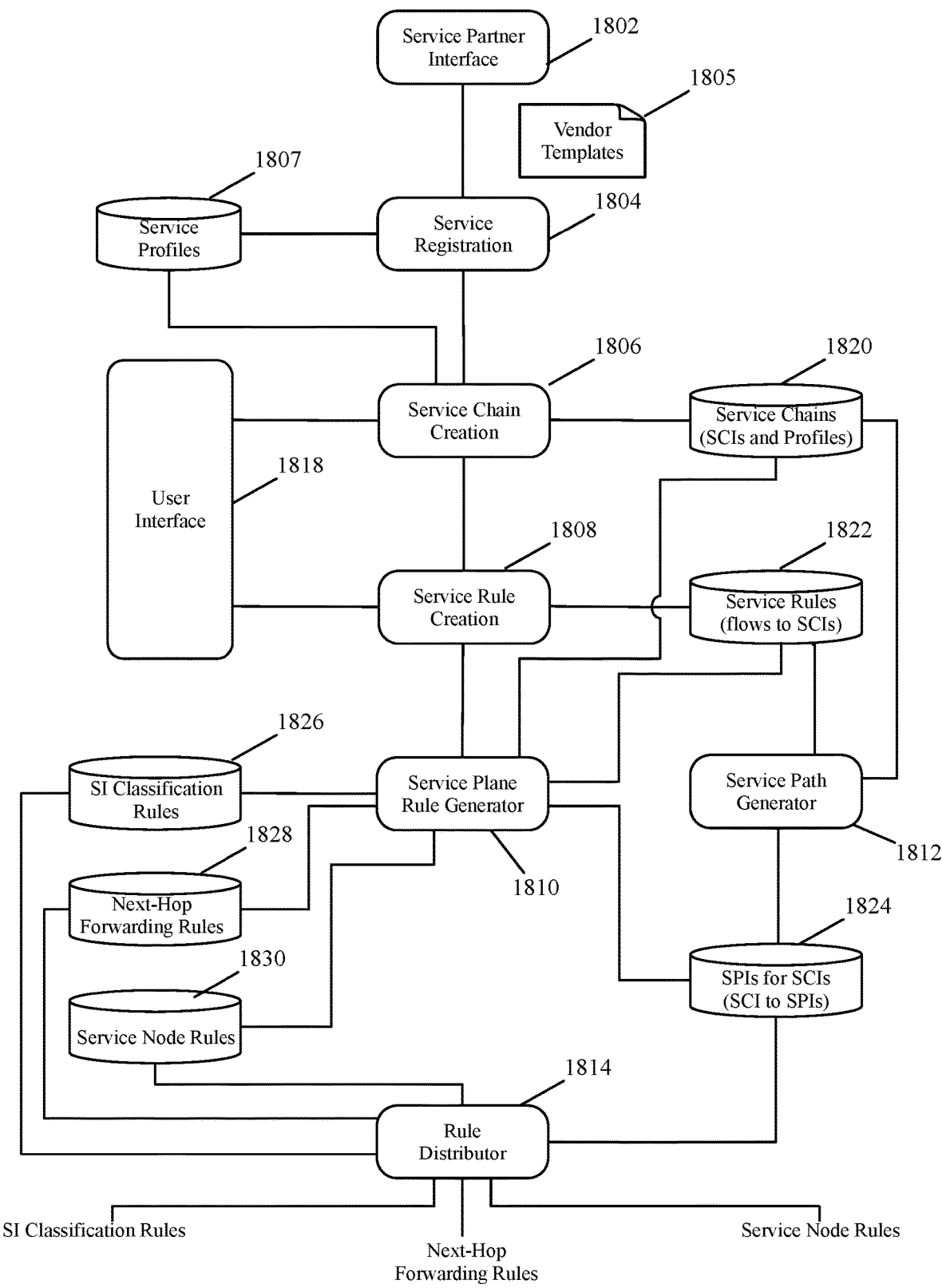
FIG. 18 conceptually illustrates several operations that network managers and controllers perform in some embodiments to define rules for service insertion, next service hop forwarding, and service processing.

FIG. 18 conceptually illustrates several operations that the network managers and controllers perform in some embodiments to define rules for service insertion, next service hop forwarding, and service processing. As shown, these operations are performed by a service registrator 1804, a service chain creator 1806, a service rule creator 1808, a service path generator 1810, a service plane rule generator 1812, and a rule distributor 1814. In some embodiments, each of these operators can be implemented by one or more modules of a network manager or controller and/or can be implemented by one or more standalone servers.

Through a service partner interface 1802 (e.g., a set of APIs or a partner user interface (UI) portal), the service registrator 1804 receives vendor templates 1805 that specify services that different service partners perform. These templates define the partner services in terms of one or more service descriptors, including service profiles. The registrator 1804 stores the service profiles in a profile storage 1807 for the service chain creator 1806 to use to define service chains.

Specifically, through a user interface 1818 (e.g., a set of APIs or a UI portal), the service chain creator 1806 receives from a network administrator (e.g., a datacenter administrator, a tenant administrator, etc.) one or more service chain definitions. In some embodiments, each service chain definition associates a service chain identifier, which identified the service chain, with an ordered sequence of one or more service profiles. Each service profile in a defined service chain is associated with a service operation that needs to be performed by a service node. The service chain creator 1806 stores the definition of each service chain in the service chain storage 1820.

Through the user interface 1818 (e.g., a set of APIs or a UI portal), the service rule creator 1808 receives from a network administrator (e.g., a datacenter administrator, a tenant administrator, etc.) one or more service insertion rules. In some embodiments, each service insertion rule associates a set of data message flow attributes with a service chain identifier. The flow attributes in some embodiments are flow header attributes, like L2 attributes or L3/L4 attributes (e.g., five tuple attributes). In these or other embodiments, the flow attributes are contextual attributes (e.g., AppID, process ID, active directory ID, etc.). Numerous techniques for capturing and using contextual attributes for performing forwarding and service operations are described in U.S. patent application Ser. No. 15/650,251, which is incorporated herein. Any of these techniques can be used in conjunction with the embodiments described herein.

The service rule creator 1808 generates one or more service insertion rules and stores these rules in the SI rule storage 1822. In some embodiments, each service insertion rule has a rule identifier and a service chain identifier. The rule identifier in some embodiments can be defined in terms of flow identifiers (e.g., header attributes, contextual attributes, etc.) that identify data message flow(s) to which the SI rule is applicable. The service chain identifier of each SI rule, on the other hand, identifies the service chain that has to be performed by the service plane for any data message flow that matches the rule identifier of the SI rule.

For each service chain that is part of a service rule, the service path generator 1812 generates one or more service paths, with each path identifying one or more service instance endpoints for one or more service nodes to perform the service operations specified by the chain's sequence of service profiles. In some embodiments, the process that generates the service paths for a service chain accounts for one or more criteria, such as (1) the data message processing load on the service nodes (e.g., SVMs) that are candidate service nodes for the service paths, (2) the number of host computers crossed by the data messages of a flow as they traverse each candidate service path, etc.

The generation of these service paths is further described in U.S. patent application Ser. No. 16/282,802, filed Feb. 22, 2019, now published as U.S. Patent Publication 2020/0274801, which is incorporated herein by reference. As described in this patent application, some embodiments identify the service paths to use for a particular GVM on a particular host based on one or more metrics, such as host crossing count (indicating how many times a data message traversing the service path crosses hosts), a locality count (indicating how many of the SIRs along this path are located on the local host), etc. Other embodiments identify service paths (i.e., select service nodes for service paths) based on other metrics, such as financial and licensing metrics.

The service path generator 1812 stores the identity of the generated service paths in the service path storage 1824. This storage in some embodiments associates each service chain identifier to one or more service path identifiers, and for each service path (i.e., each SPI) it provides a list of service instance endpoints that define the service path. Some embodiments store the service path definitions in one data storage, while storing the association between the service chain and its service paths in another data storage.

The service rule generator 1810 then generates rules for service insertion, next service hop forwarding, and service processing from the rules stored in storages 1820, 1822 and 1824, and stores these rules in rule storages 1826, 1828 and 1830, from where the rule distributor 1814 can retrieve these rules and distribute them to the SI pre-processors, service proxies and service nodes. The distributor 1814 also distributes in some embodiments the path definitions from the service path storage 1824. The path definitions in some embodiments includes the first hop network address (e.g., MAC address) of the first hop along each path. In some embodiments, the service rule generator 1810 and/or the rule distributor 1814 specify and distribute different sets of service paths for the same service chain to different host computers, as different sets of service paths are optimal or preferred for different host computers.

In some embodiments, the SI classification rules that are stored in the rule storage 1826 associate flow identifiers with service chain identifiers. Hence, in some embodiments, the rule generator 1810 retrieves these rules form the storage 1822 and stores them in the classification rule storage 1826. In some embodiments, the rule distributor 1814 directly retrieves the classification rules from the SI rule storage 1822. For these embodiments, the depiction of the SI classification rule storage 1826 is more of a conceptual illustration to highlight the three type of the distributed rules, along with the next-hop forwarding rules and the service node rules.

In some embodiments, the service rule generator 1810 generates the next hop forwarding rules for each hop service proxy of each service path for each service chain. As mentioned above, each service proxy's forwarding table in some embodiments has a forwarding rule that identifies the next hop network address for each service path on which the proxy's associated service node resides. Each such forwarding rule maps the current SPI/SI values to the next hop network address. The service rule generator 1810 generates these rules. For the embodiments in which the SI pre-processor has to look-up the first hop network address, the service rule generator also generates the first hop look-up rule for the SI pre-processor.

Also, in some embodiments, the service rule generator 1810 generates for the service nodes service rules that map service chain identifier, service index values and service directions to service profiles of the service nodes. To do this, the service rule generator uses the service chain and service path definitions from the storages 1820 and 1824, as well as the service profile definitions from the service profile storage 1807. In some embodiments, the rule distributor forwards the service node rules to a service node through a service manager of the service node when such a service manager exists. The service profile definitions are also distributed by the distributor 1814 to the host computers (e.g., to their LCPs) in some embodiments, so that these host computers (e.g., the LCPs) can use these service profiles to configure their service proxies, e.g., to configure the service proxies to forward received data messages to their service nodes, or to copy the received data messages and forward the copies to their service nodes, while forwarding the original received data messages to their next service node hops or back to their source GVMs when they are the last hops.

Figure 19:
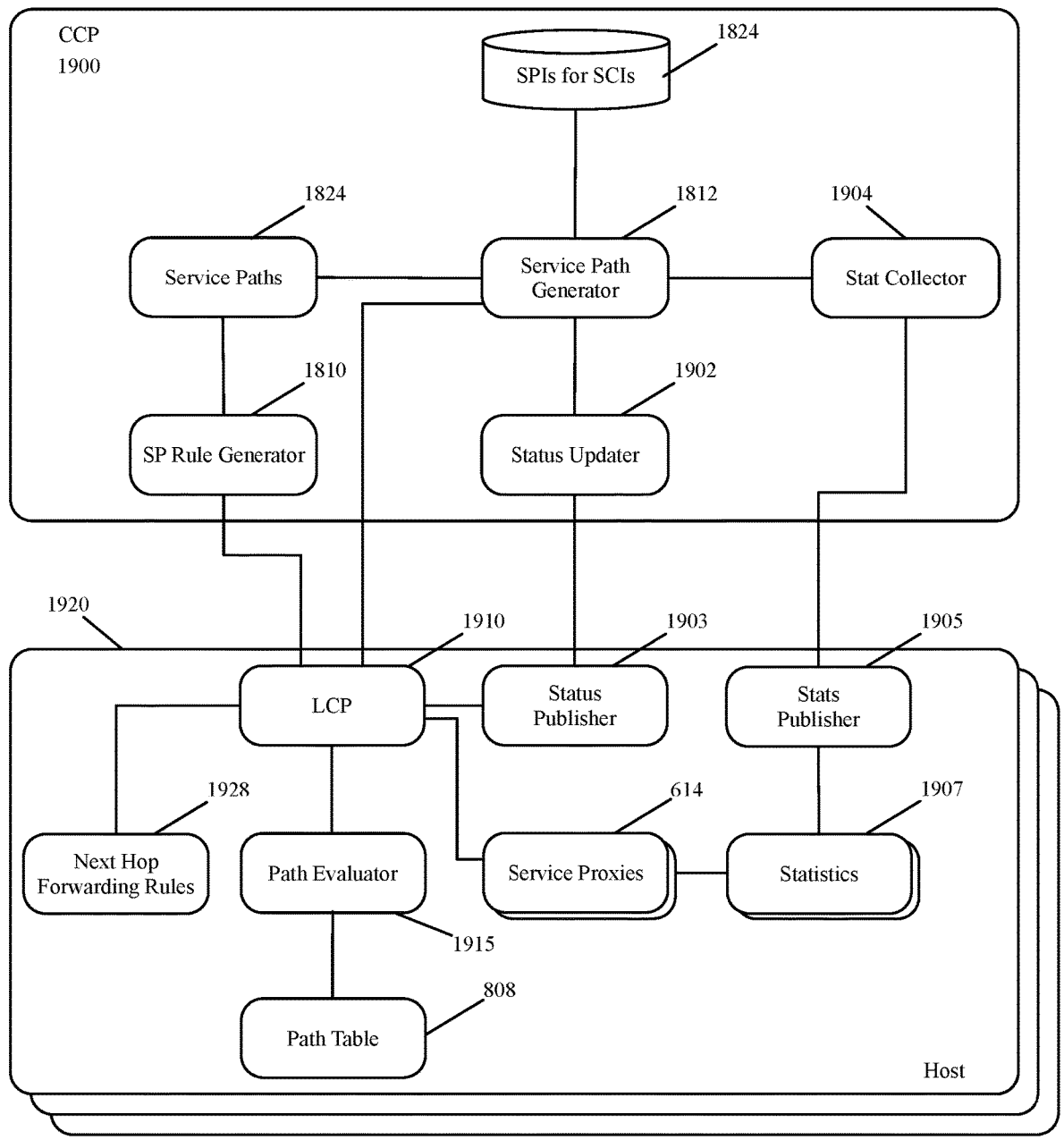
FIG. 19 illustrates how service paths are dynamically modified in some embodiments.

In some embodiments, the management and control plane dynamically modify the service paths for a service chain, based on the status of the service nodes of the service paths and the data message processing loads on these service nodes. FIG. 19 illustrates how service paths are dynamically modified in some embodiments. In these embodiments, a central control plane 1900 works with a local control plane 1910 on the host computers 1920 to define service paths for a service chain, and to modify these service paths. The CCP 1900 in some embodiments is a cluster of servers (e.g., three servers) that provide control plane operations for defining configurations based on service rules specified by network administrators through a cluster of management servers that provide management operations.

As shown, the CCP has a status updater 1902 that receives service node status data from status publishers 1903 on the host computers 1920. As mentioned above, each time that a service proxy determines that its associated service node has failed (e.g., each time a service node fails to respond to the service proxy's liveness signal twice in a row), the service proxy notifies the LCP 1910 of its host. The LCP then has its status publisher 1903 notify the CCP's status updater 1902 of the service node's failure.

The status updater 1902 relays any service node failures to the service path generator 1812, which in some embodiments is part of the CCP along with the SP rule generator 1810 and a statistic collector 1904. Each time a service node fails, the service path generator removes from the service path storage 1824 its previously defined service paths that use this service node. For each removed service path, the service path generator 1812 deletes or deactivates the removed path's SPI value for the service chain identifier of the corresponding service chain.

In some embodiments, each removed service path is removed (e.g., deleted or deactivated) from the records of all hosts that previously received forwarding rules or path definitions that were for this service path. In some embodiments, the CCP (e.g., the service path generator 1810 or the rule distributor 1814) directs these hosts to remove the service path from the forwarding and path definition rules of their forwarding rule storages 1928 and path definition storage 808. The LCP of the failed service node in some embodiments removes the service path from its forwarding and path definition rules, while in other embodiments even this LCP waits for instructions to do so from the CCP.

Each host 1920 also has a statistics publisher 1905 that publishes data message load statistics that the service proxies generate for their service nodes in some embodiments. Each time a service proxy receives a data message that has been processed by its service node, the service proxy in some embodiments increments statistics (e.g., data message count, byte count, etc.) that it maintains in a statistic storage 1907 for its service node. In some embodiments, the statistics publisher 1905 periodically or on-demand retrieves the collected statistics from the storage 1907 and forwards these statistics to a statistic collector 1904 of the CCP. In some embodiments, the statistics collector 1904 receives (through the management plane) statistics that the service managers of the service nodes receive from the service nodes.

The statistics collector 1904 relays the collected statistics to the service path generator 1812. As mentioned above, the service path generator in some embodiments defines the service paths through the service nodes based in part on the data message load on the service nodes. For instance, when the data message load on a service node exceeds a threshold value, the service path generator performs one or more actions in some embodiments to reduce the load on this service node. For instance, in some embodiments, it stops adding the service node to any new service paths that it might define. In these or other embodiments, it also directs the distributor 1814 to remove the service paths that use this service node from some or all of the hosts.

Conjunctively or alternatively, the service path generator directs a CCP module (e.g., the distributor 1814) to direct the LCPs of one or more host computers to adjust the selection criteria 820 used for selecting service paths that the LCPs generate in order to control how the SI pre-processor performs its path selections. In other embodiments, the service path generator or another CCP module aggregates the load statistics for each service node and distributes the aggregated load to host LCPs along with their associated SPI values so that the LCPs can analyze these statistics and adjust the path selection criteria that they generate. In some embodiments, each LCP uses or has a path evaluator 1915 to generate the path selection criteria to evaluate and select paths based on service node statistics, and/or based on other criteria, such as number of hosts traversed by each service path.

In some embodiments, the servers that implement the management plane, the control plane, the service managers are in the same datacenter as the host computers on which the guest and service machines and modules (e.g., GVMs, SVMs, service proxies, port proxies, STL modules, SFEs, etc.) execute. In these embodiments, the management plane servers, the control plane servers, the service managers and the host computer modules (e.g., the LCPs, SVMs, GVMs, hypervisor modules, etc.) communicate with each other through the shared network infrastructure (e.g., the switches, routers, wired and wireless links, etc.) of the datacenter.

In other embodiments, the management plane servers, the control plane servers, the service managers and/or the host computers operate in different datacenters (e.g., enterprise private datacenters and public cloud datacenters). In some such embodiments, management plane servers, the control plane servers, the service managers and/or the host computer modules (e.g., the LCPs, SVMs, GVMs, hypervisor modules, etc.) communicate with each other through network infrastructures outside of their respective datacenters. Also, some such embodiments implement the service transport layer as a distributed logical L3 routers and/or network that spans multiple datacenters (e.g., multiple private datacenters, multiple public datacenters, and/or multiple private/public datacenters).

Figure 20:
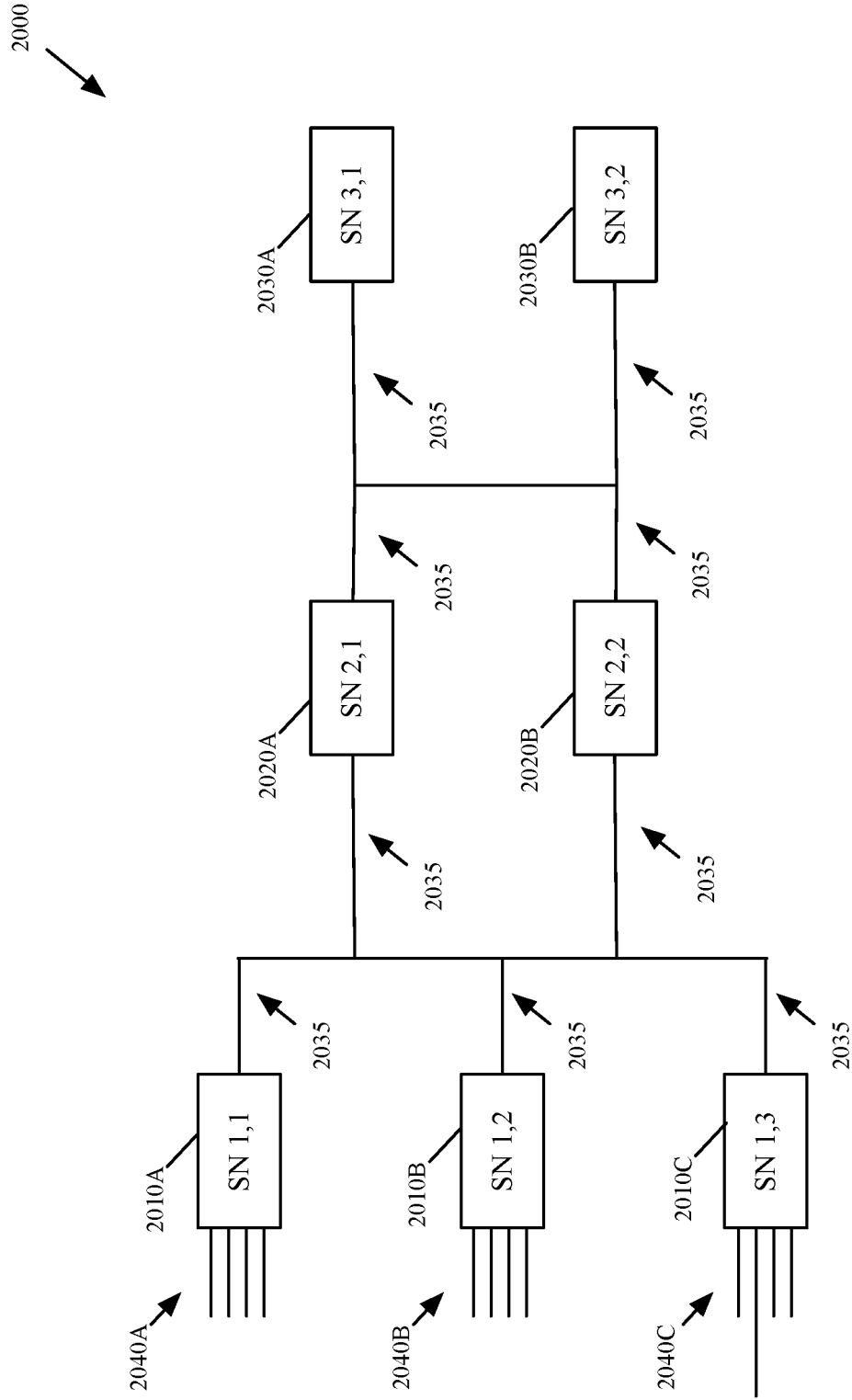
FIG. 20 illustrates an example of a graphical user interface (GUI) of some embodiments that displays elements implementing a service chain.

In order to properly control and coordinate the above described service chains, some embodiments provide a graphical user interface (GUI). The GUI of some embodiments allows a user to select a particular service chain. FIG. 20 illustrates an example of a GUI 2000 of some embodiments that displays the elements implementing a selected service chain. GUI 2000 includes service nodes 2010A-2030B, links 2035, and path selectors 2040A-2040C.

Each of the service nodes 2010A-2030B is a visual representation of a single instantiation of a service. Service nodes 2010A-2010C represent the nodes implementing a first service operation of the service chain, service nodes 2020A-2020B represent the nodes implementing a second service operation, and service nodes 2030A-2030B represent the nodes implementing a third service operation.

Figure 21:
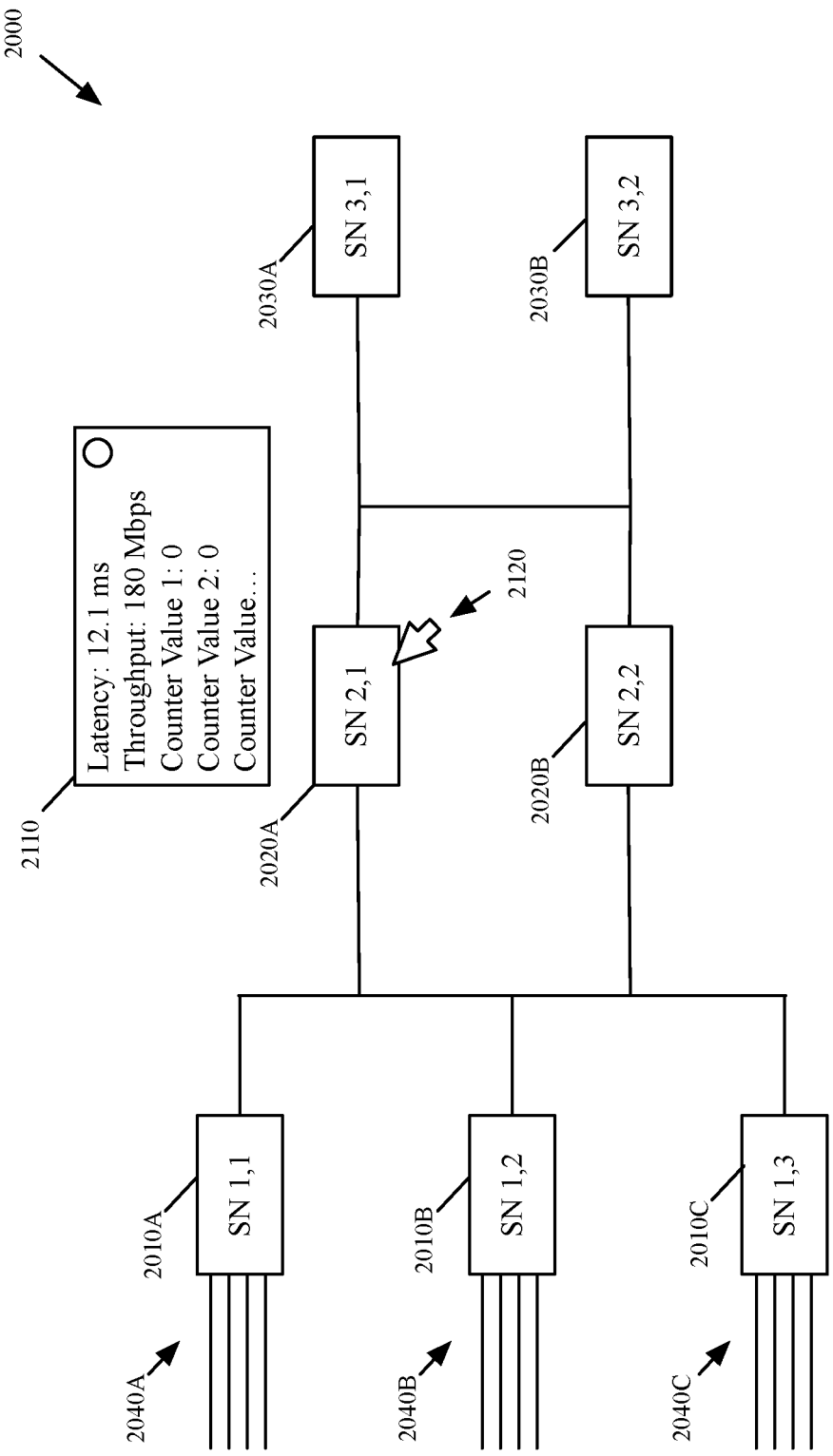
FIG. 21 illustrates a GUI displaying operational data for a service node in response to a user selection of the node.
Figure 22A:
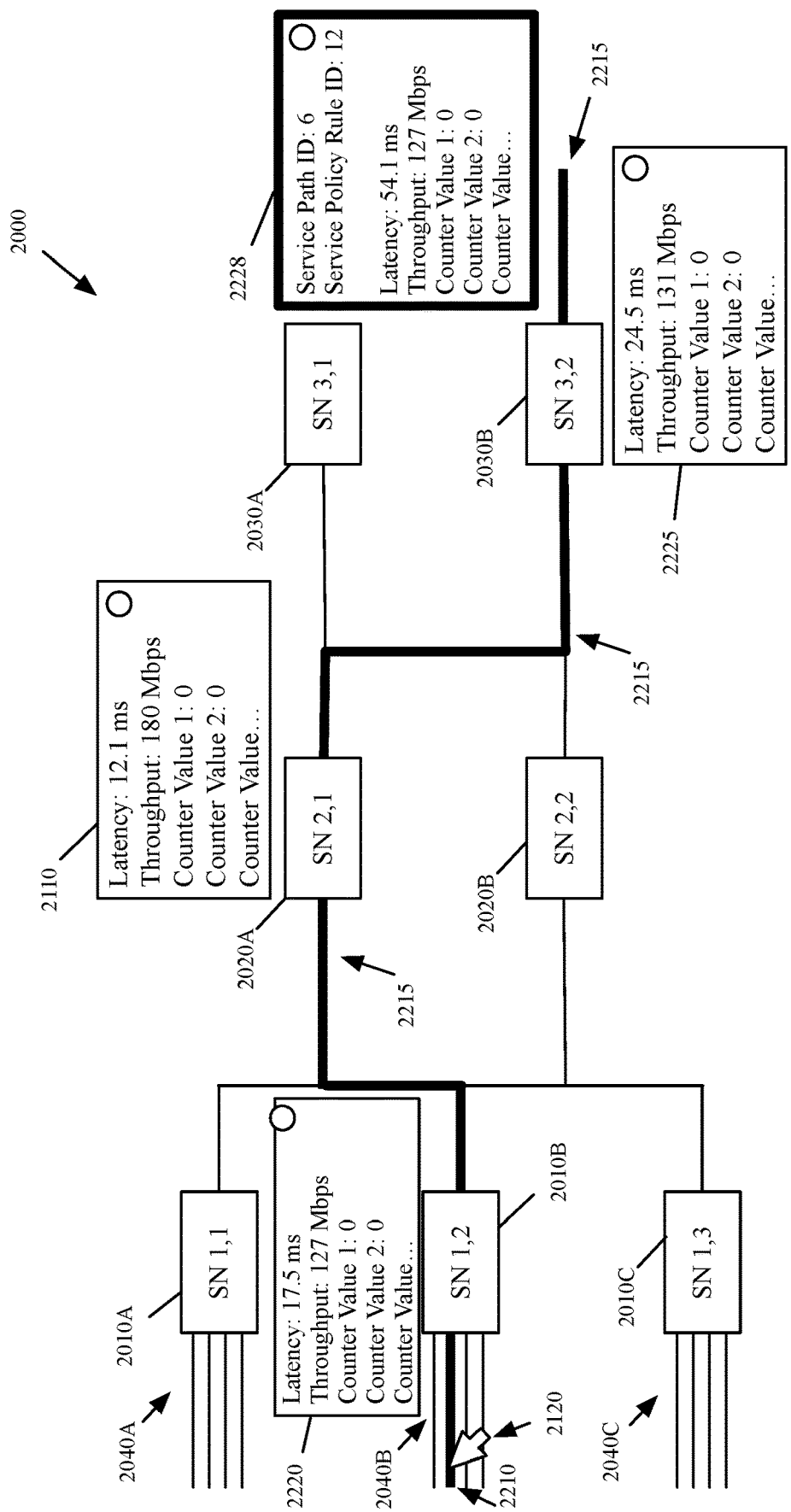
FIG. 22A illustrates a GUI displaying operational data for the nodes along a service path in response to a user selection of the service path.
Figure 22B:
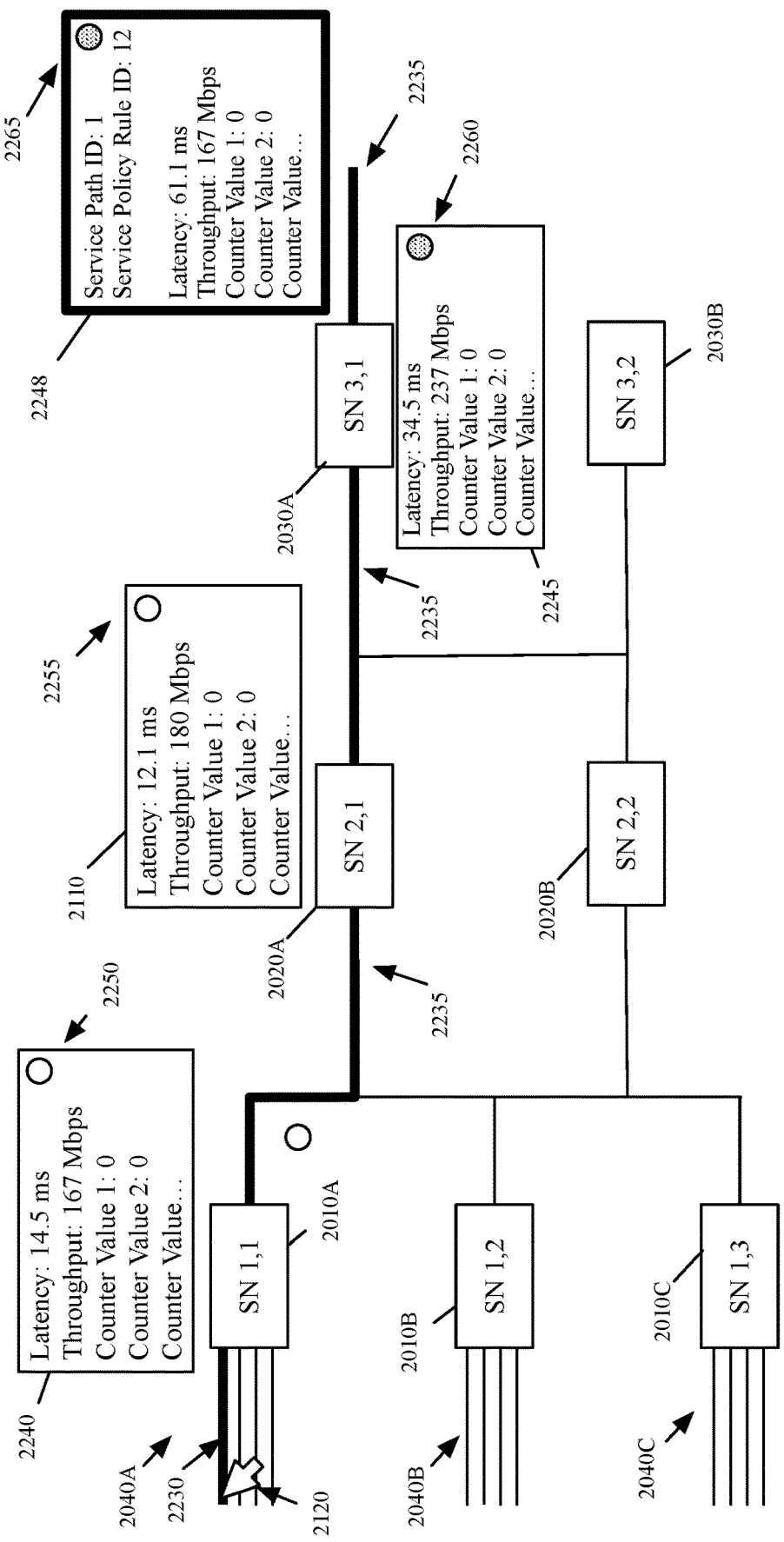
FIG. 22B illustrates a GUI displaying a visual indicator of a poorly functioning node.

In the GUI 2000, between the various service nodes 2010A-2030B are links 2035 connecting each successive pair of service nodes. The links 2035 of GUI 2000 provide a concurrent representation of multiple service paths in the service chain. The links 2035 are shown in FIGS. 20-24 as directly connecting service nodes. However, one of ordinary skill in the art will understand that the links 2035 identify a sequence of service operations of the service chain rather than representing direct communication between service nodes. In some network systems, service nodes of a service path may communicate directly. However, in other network systems the processed data from one service node may be sent to one or more intermediary systems before those systems send the processed data to a service node implementing the next service in the service path. The links in the illustrated embodiments are shown between service nodes. However, in other embodiments, there may be similar links or other indicators after the service nodes on the end nodes of a service chain to indicate that data messages are sent to other entities (e.g., to be sent to other virtual machines on the network, machines external to the network, etc.) after the last service node in the service chain. Examples of links shown after end nodes of a service chain are illustrated in FIGS. 22A-22B.

Each service path of the service chain passes through one service node of each service. The GUI 2000 provides path selectors 2040A-2040C as user selectable objects that each allow a user to select a particular path to view. For reasons of clarity and space, the figures herein include path selectors for only the service nodes of the first service (i.e., service nodes 2010A-2010C). However, one of ordinary skill in the art will understand that other embodiments may include path selectors for other nodes. The effects of user interaction with the path selectors 2040A-2040C are further described with respect to FIGS. 22A and 22B, below.

In addition to displaying the service nodes and links of a service chain, the GUI 2000 also displays operational data for various components of the service chain in response to user commands. FIG. 21 illustrates the GUI 2000 displaying operational data for a service node in response to a user selection of the node. FIG. 21 shows service node representation 2020A, data display area 2110, and cursor 2120. Service node 2020A is one of two nodes that implement the second service in the service chain. Data display area 2110 is a pop-up display that shows operational data for service node 2020A. Cursor 2120 represents a cursor of a control device used to interact with the GUI 2000.

The GUI 2000 displays a data display area with operational data relating to a particular node when a user selects that node. As shown in this figure, the cursor 2120 hovers (e.g., is placed over) over the service node 2020A to select it. In response to the selection, the GUI 2000 provides the data display area 2110 with operational data relating to service node 2020A. The operational data in the display area 2110 may include a latency measurement of the node, throughput of the node, error measurements, or other data about the node.

In addition to latency and throughput, the display area of some embodiments may provide various types of additional counters, such as (1) initial counters, (2) error counters, (3) latency and byte counters, and/or (4) liveness check counters. Initial counters provide the user traffic and liveness packet counts to/from a serviceVM vNIC. Examples of initial counters in some embodiments include rx_from_svm, rx_from_iochain, to_svm_liveness_pkts, and from_svm_liveness_pkts. Error counters show measurements of different types of errors that can cause packet drop by the serviceVM proxy (e.g., the proxy sitting on the service VM vNIC). Examples of error counters in some embodiment include native_length_patch_fail, bad_eth_hdr, quench, get_nsh_fail, ingress_inject_fail, copy_fail, nsh_ttl_expired, zero_si, unknown_next_hop, set_nsh_fail, push_headroom_fail, insufficient_decap_bytes, insufficient_spf_bytes, and insufficient_map_bytes, partial_copy. Latency and bytes counters can be utilized to show latency cause and throughput per hop in the service chain. In some embodiments, the latency and byte counters can also be utilized for the whole chain (i.e., to evaluate the performance of one chain with the performance of another chain). The previously mentioned latency (shown in ms) and throughput counters are examples of latency and byte counters. Other examples of latency and byte counters in some embodiments include service_latency_seconds, rx_bytes_from_svm, and rx_bytes_from_iochain. The liveness check counters are used for debugging whether liveness checks are happening as expected (when liveness checks are enabled). Examples of liveness check counters in some embodiments include liveness_checks_performed, svm_alive, liveness_bitmap, and sequence_number.

In some embodiments, any or all of these counters can be exposed in the GUI and in some embodiments can be extracted from the same CLI. In some embodiments, all of the above counters can help with isolating any specific hop in the service chain; for determining packet drops, latency, throughput, and/or overall liveness status. Further description of how the operational data is generated is described with respect to FIGS. 26-28, below.

Although the GUI of the illustrated embodiment displays operational data in response to a hover operation, one of ordinary skill in the art will understand that other user command operations are used in other embodiments. For example, in some embodiments, a cursor-click with a particular button, a keyboard hotkey, a click-and-drag operation, rather than a hover operation, are used to select a node.

In the preceding figure, the GUI 2000 displays operational data for a single service node. However, the GUI of some embodiments allows a user to view operational data for all service nodes on a particular service path. FIG. 22A illustrates the example GUI 2000 displaying operational data for the nodes along a service path in response to a user selection of the service path. FIG. 22A shows path selectors 2040B, including path selector 2210, selected path 2215, data display areas 2220 and 2225, and aggregate display area 2228. As previously mentioned with respect to the links of FIG. 20, the illustrated paths of FIGS. 22A and 22B identify the order in which the services of the nodes they connect are performed and do not indicate direct communication between the linked nodes.

In the GUI 2000 the number of path selectors associated with a service node of the first service indicate how many service paths include that particular service node. Thus, the selectors indicate four paths that include service node 2010A, two paths that include service node 2010B, and three paths that include service node 2010C. In this figure, the user has selected path selector 2210, one of the service path selectors associated with service node 2010B, with a cursor operation (e.g., hover, click, etc.). In response to this selection, the GUI 2000 has highlighted the selected service path 2215. The path 2215 goes through service nodes 2010B, 2020A, and 2030B then out of node 2030B. After leaving node 2030B, data packets are forwarded on toward their destinations. One of ordinary skill in the art will understand that although the illustrated implementation shows path 2215 extending beyond node 2030B, in other embodiments the display shows the path 2215 stopping at 2030B.

In some embodiments, the paths are bi-directional. That is, an initial set of packets are sent along the path, through service nodes 2010B, 2020A, and 2030B in that order, while reply packets (packets with source and destination reversed) are sent back through the same service path in the reverse order, through service nodes 2030B, 2020A, and 2010B in that order.

The GUI 2000 provides operational data for each service node along the selected path 2215. That is, the GUI 2000 displays operational data for: (1) node 2010B in display area 2220; (2) node 2020A in display area 2110; and (3) node 2030B in display area 2225. Thus the user can determine the operational performance of all nodes along the service path by reading the operational statistics for each node. In addition to displaying operational data for each individual node in the path, the GUI 2000 also displays an aggregate display area 2228. The aggregate display area 2228 provides operational data that is the aggregate of the individual paths. The display area 2228 identifies which service path is currently selected for display (here Service Path 6) and the policy rule that causes data to be sent along this path (here, Policy Rule 12). The counters of the aggregate display area 2228 are individually computed according to stored formulas. How an aggregate value is determined depends on what value is being measured. For example, the overall latency of a path is the sum of the latencies of the individual nodes. However, the throughput of a path is the minimum throughput of the individual nodes rather than the sum of the throughputs.

In order to allow problematic nodes to be identified more easily than by reaching all the operational statistics for each node, the GUI of some embodiments provides a visual (e.g., color coded) indicator of whether the nodes are operating within preset thresholds. FIG. 22B illustrates an example GUI displaying a visual indicator of a poorly functioning node. FIG. 22B shows path selector 2230 (one of the set of path selectors 2040A), selected path 2235, data display areas 2240 and 2245, aggregate display area 2248, and visual indicators 2250-2265.

In this figure, in response to a user selection of path selector 2230, the GUI 2000 has highlighted the selected service path 2235. The path 2235 goes through service nodes 2010A, 2020A, and 2030A. The operational data displayed by the GUI 2000 includes color coded visual indicators 2250, 2255, and 2260 in addition to the numerical indicators of service node performance. The specific color of each indicator 2250, 2255, and 2260 identifies whether an operational statistic of its corresponding node has gone beyond a threshold. In the illustrated example, a threshold latency of 30 ms has been set as an upper limit. Accordingly, as nodes 2010A and 2020A each have a latency below 30 ms (as shown in display areas 2240 and 2110), the indicators 2250 and 2255 are white circles. In contrast, node 2030A has a latency of 34.5 ms (as shown in display area 2245). 34.5 ms is above the threshold, therefore the indicator 2260 is a gray circle to draw the user's attention to node 2030A.

The thresholds of some embodiments are set by a user. In other embodiments the threshold may be set by a network virtualization manager or other network system (e.g., based on past performance data, pre-programmed threshold levels, etc.). Some embodiments provide multiple thresholds and multiple colors/patterns to indicate them. For example, in some embodiments, a node with latency below a 30 ms threshold will have a green indicator, a node with a latency between 30 and 50 ms will have a yellow indicator, and a node with a latency above 50 ms will have a red indicator.

Aggregate display area 2248 also includes a color coded visual indicator 2265. Here, the indicator is a gray circle. Various embodiments may display a colored visual indicator in the aggregate display area for different reasons. For example, in some embodiments, the color of a visual indicator may indicate that an aggregate statistic exceeds a particular threshold (e.g., total latency for the path is above 60 ms). Alternatively, or in addition, to identifying an out of bounds aggregate statistic the visual indicator may be set to the color of the node with the worst performance (in this figure, node 2030A).

Figure 23:
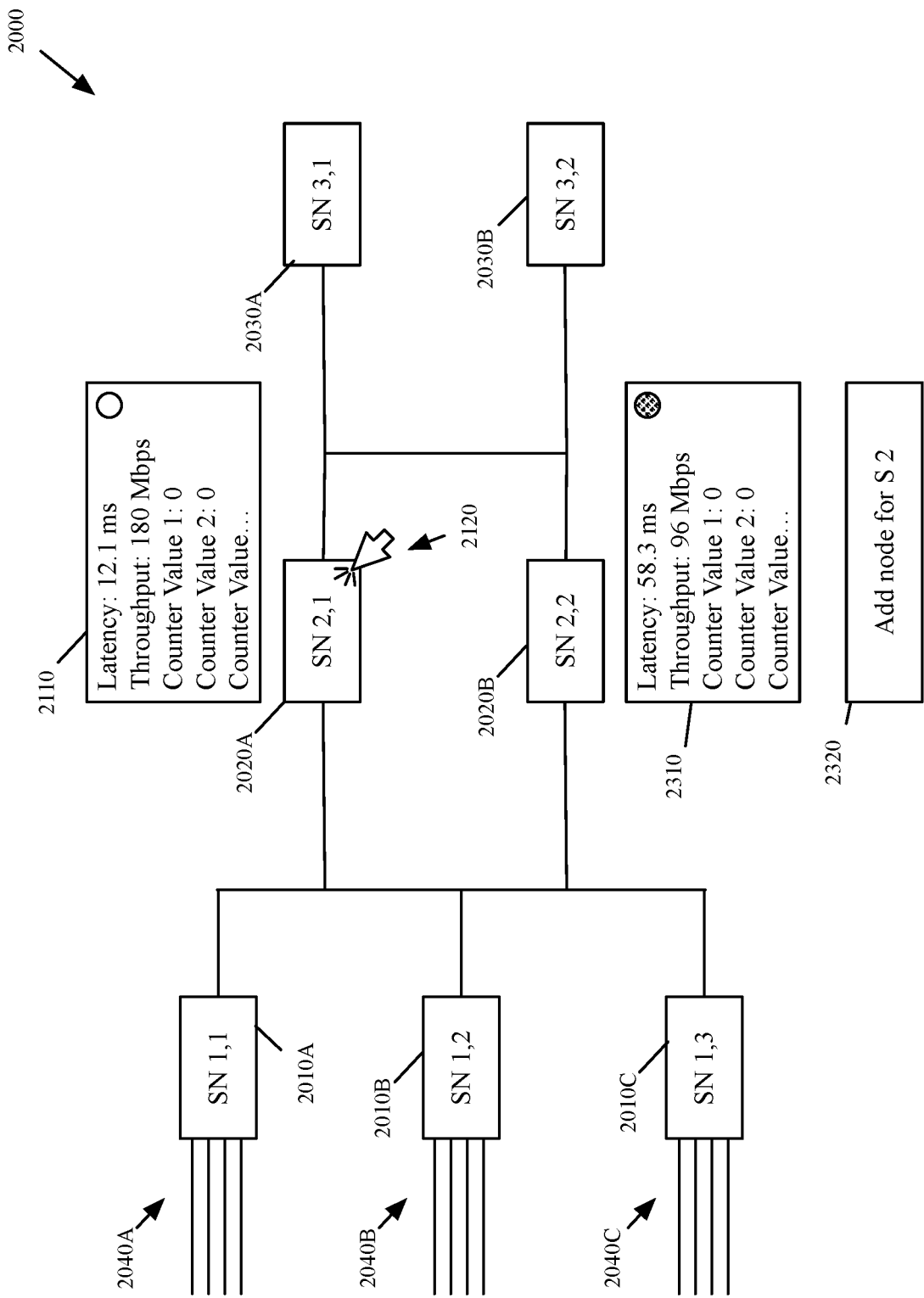
FIG. 23 illustrates the example GUI displaying operational data for the nodes that provide a particular service in response to a user selection of one of the nodes implementing the service.

In addition to or instead of path selectors for selecting a service path, the GUI of some embodiments provides controls that allow a user to select an entire set of service nodes that each implement a particular service operation. FIG. 23 illustrates GUI 2000 displaying operational data for all the nodes that provide a particular service in response to a user selection of one of the nodes implementing that service. The figure shows cursor 2120, node 2020A, display areas 2110 and 2310, and service control object 2320.

In FIG. 23, the GUI 2000 receives a cursor click that selects node 2020A. In response, the GUI 2000 displays operational data for node 2020A in display area 2110, and operational data for node 2020B (that provides the same service) in display area 2310. By displaying operational data for an entire service, the GUI 2000 allows a user to determine whether that service is inadequate for the data coming through the service chain and whether individual nodes of the service are functioning properly. When the service is performing inadequately, the user may decide to add additional nodes for the service (service 2). Accordingly, the GUI 2000 provides a service control object 2320 for that service. Further details about the control object 2320 is illustrated in the following figures.

Figure 24:
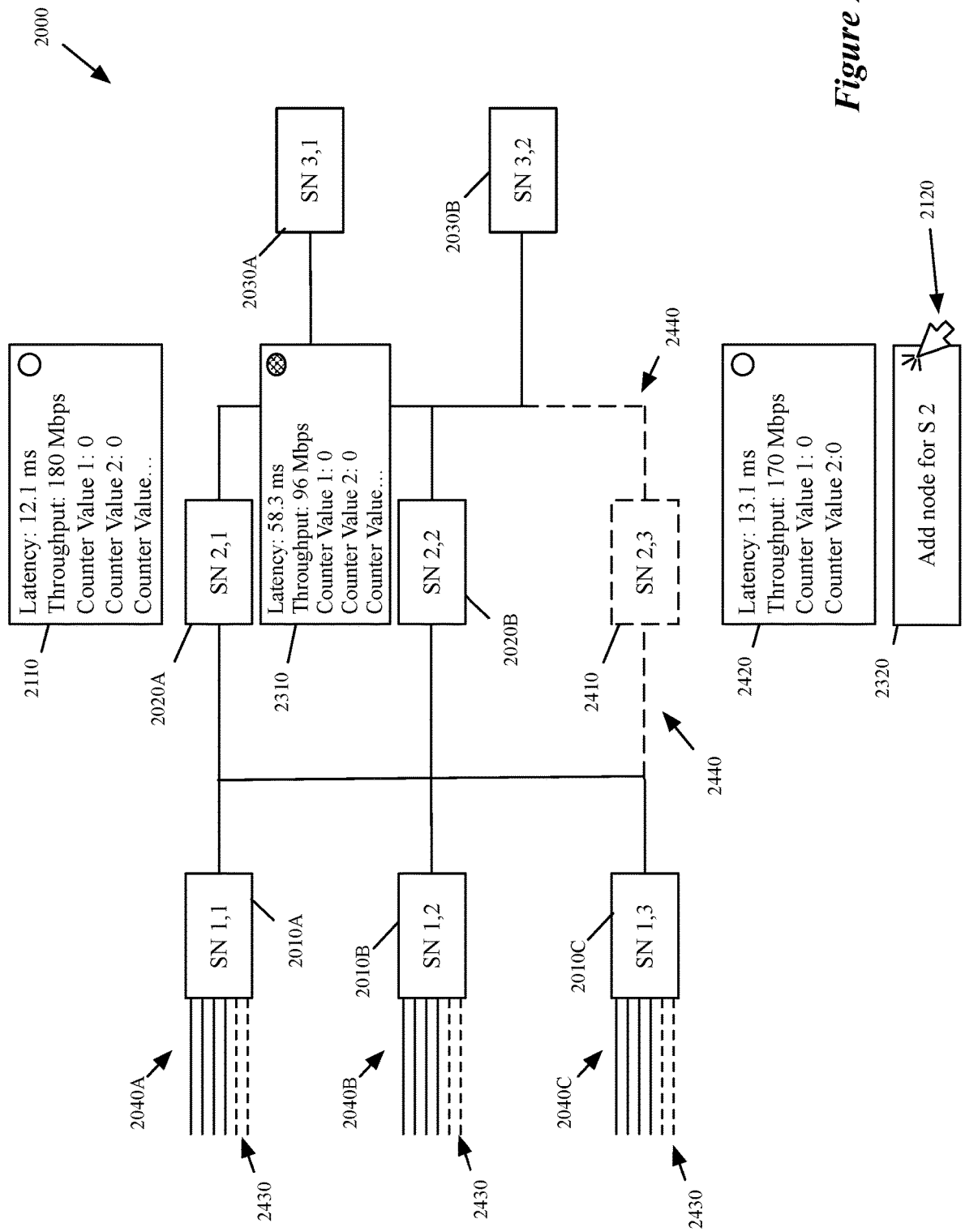
FIG. 24 illustrates a GUI adding an additional service node for the selected service in response to a user command.

FIG. 24 illustrates GUI 2000 adding an additional service node for the selected service in response to a user command. In this figure, the cursor 2120 has just clicked on service control object 2320. In response, a new service node and at least one new service path has been added to the service chain. The GUI 2000 provides a new service node representation 2410 for the newly implemented node. Adding new node 2410 also creates new service paths. Previously, with two nodes of service 2 and two nodes of service 3, each node of service 1 was the start of four (two options for service 2 times two options for service 3) potential service paths of the service chain. In FIG. 24, with three nodes for service 2, each node of service 1 is the start of six (three options for service 2 times two options for service 3) potential service paths of the service chain. Accordingly, the GUI has also added two new path selectors 2430 to each set of path selectors 2040A-2040C to identify new paths that use the new links 2440 that run through new service node 2410.

The GUIs of some embodiments use a different pattern or color from previously displayed paths, or use other visual indicators for newly added paths. For example, the new links 2440 and the path selectors 2430 are shown in FIG. 24 with dotted lines as an indicator of a newly added link/node. The GUIs of some other embodiments do not visually differentiate new links/nodes from previously existing links/nodes.

In addition to or instead of providing controls to add a node, some embodiments allow a user to command that an operational node restart or shut down. GUIs of different embodiments receive restart or shutdown commands in different ways, such as (1) through a particular cursor operation on the node to be restarted/shut down, (2) selection of a shutdown option from a menu of options, or (3) some combination of cursor options and menu items. In some such embodiments, a central controller will flag (as inactive) paths through a node that is about to be restarted or shut down, in order to stop data traffic from using that node while it is restarting/shutting down.

Figure 25:
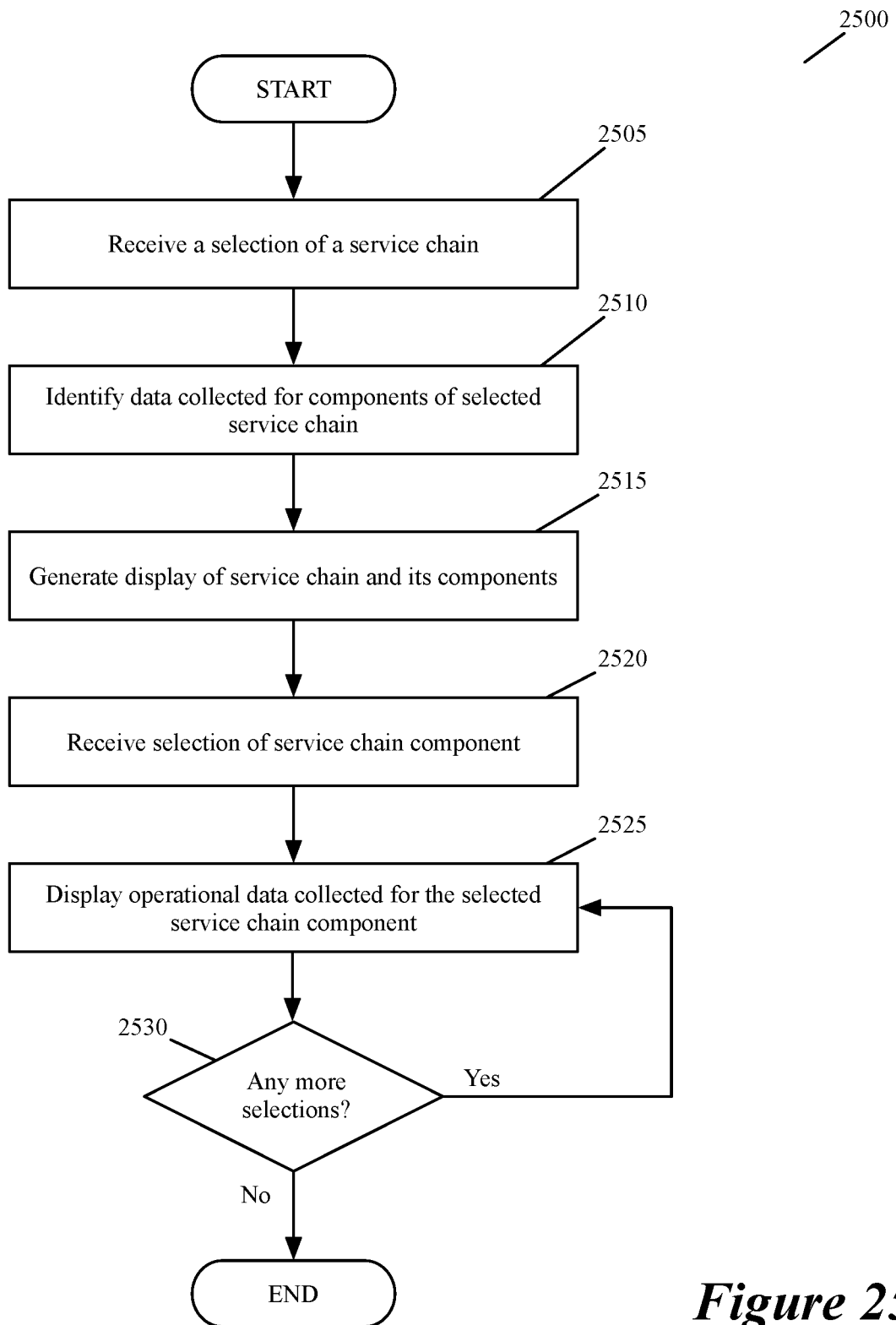
FIG. 25 illustrates a process of some embodiments for selecting a service chain then receiving and displaying operational data for components that implement that service chain.

The above figures illustrate a GUI displaying a particular service chain. The GUIs of some embodiments allow a user to select one out of multiple service chains of a network. FIG. 25 illustrates a process 2500 of some embodiments for selecting a service chain, then receiving and displaying operational data for components that implement that service chain. The process 2500 starts when a server of the network (e.g., a server implementing a network controller or manager) receives (at 2505) a selection of a service chain. The service chain may be one of multiple service chains operating on a network or network segment. In some embodiments, the selection can be received via a menu of service chains, a set of graphical representations of service chains or some other selection method.

After a service chain is selected, the process 2500 then identifies (at 2510) data collected for components of that service chain. In some embodiments, the process 2500 identifies this data in a database such as the one described with respect to FIG. 28, below. This data may include throughput values, latency values, other statistical data collected by proxy servers or calculated from measurements by the proxy servers, averages or weighted averages of such statistical data, and/or other operational data about service nodes (e.g., what type of packets each service node processes, what service is provided by each service node, etc.). In some embodiments, the process 2500 retrieves the identified data in this operation. In other embodiments, the process identifies which data in the database should be accessed for each component, but does not retrieve the operational data for a component until the component is selected by a user.

After identifying the relevant data for the selected service chain, the process 2500 then generates (at 2515) a graphical display of the service chain and its components. In some embodiments, as described with respect to FIGS. 20-24, above, the graphical display includes representations of the service nodes implementing a service chain and links between the nodes.

The process 2500 receives (at 2520) a selection of a service chain component (e.g., as shown in FIG. 21, above). In some embodiments, multiple service chain components can be selected at the same time (e.g., as shown in FIGS. 22A-23, above). The process then displays (at 2525) operational data collected for the selected service chain component(s). In some embodiments, displaying the operational data in operation 2525 includes periodically updating the displayed data as new data about the selected component(s) becomes available.

After displaying the operational data for the selected component(s), the process 2500 then determines (at 2530) whether there are any more selections of service chain components. If there are more selections, the process 2500 returns to operation 2525 and displays operational data for the selected service chain component. If there are no further selections the process ends. In some embodiments, when the process 2500 ends, the GUI will continue to display the operational data for the previously selected components and may also update the displayed operational data.

Although the above described process 2500 is in a particular order for purposed of description, one of ordinary skill in the art will understand that other embodiments may perform such a process in a different order. The FIGS. 20-25 describe GUI displays in terms of components of a single service chain. However, one of ordinary skill in the art will understand that a particular service node may implement part of multiple service chains, rather than being exclusive to one service chain.

As previously mentioned, the operational data displayed in the above described GUIs may be collected by service proxies, each of which monitors a corresponding service node. The following three figures describe a service proxy and processes for collating and analyzing the data from these service proxies.

Figure 26:
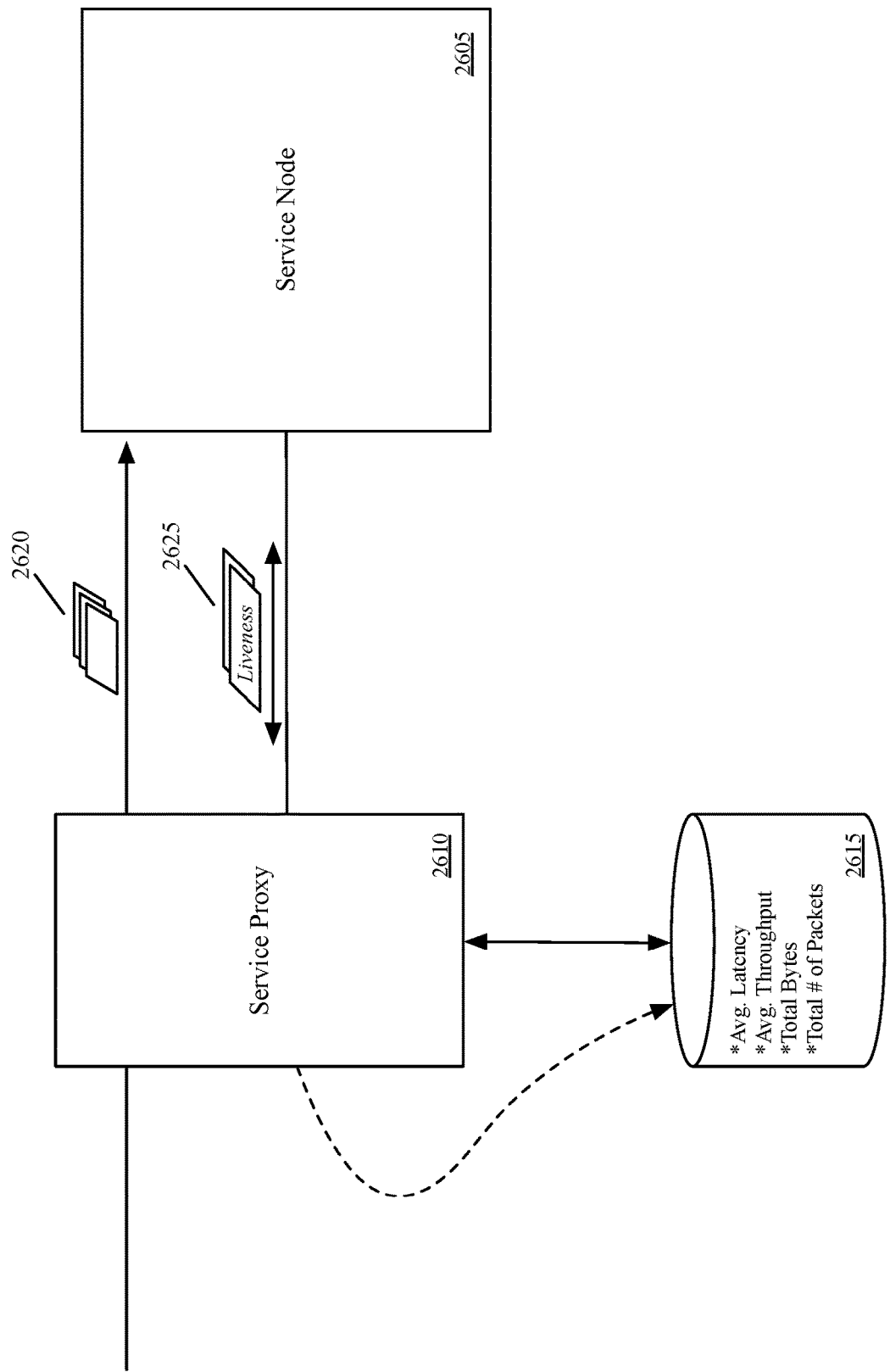
FIG. 26 illustrates an example of a service proxy monitoring a service node.

Each service proxy in some embodiments monitors its respective service node to determine whether the service node is functioning and to generate multiple statistics regarding the operation of its service node. FIG. 26 illustrates an example of a service proxy 2610 monitoring its service node 2605. As shown, the service proxy 2610 passes data packets 2620 to and from the service node 2605. While doing this, the service node in some embodiments generates statistics regarding the number of data packets 2620, the size (e.g., bits, bytes, etc.) of the payloads of those packets, and the throughput of the service node. In some embodiments, the service node computes a throughput value by dividing the number of bits/bytes in a packet's payload by the time that it takes the service node to process the packet (i.e., by the duration of time from when the packet leaves the service proxy to when it returns to the service proxy from the service node). Some embodiments compute a throughput value of a service node by measuring the total amount of data (in bits or bytes) in all payloads of all data messages are processed by a service node over some regular period (e.g., 1 second, 5 seconds, 10 seconds, etc.) then dividing by the duration of that period. Other embodiments may count the bits/bytes in the payloads of data messages until some threshold number of bits/bytes are processed, while measuring the time the service node takes to process those data messages, then divide the number of bits/bytes processed by the measured time. Other embodiments may measure the number of bits/bytes in a set number of packets (e.g., 1 packet, 1024 packets, etc.) processed by the service node while measuring the time it takes the service node to process that number of packets, then divide the bits/bytes in those packets by the time it took the service node to process them.

In some embodiments, the service proxy 2610 stores the generated statistics (e.g., number of data packets, number of bytes, and throughput) in a data storage 2615 of the service proxy 2610. As mentioned above, the service proxy in some embodiments periodically exchanges liveness messages 2625 to perform periodic liveness checks to ensure that the service node is operational. From these liveness messaging exchange, the service proxy generates latency metric values that gauge the responsiveness of the service node, and stores an average latency metric value in its data storage 2615. Periodically the service proxy 2610 provides the statistics (e.g., the latency values, the throughput, etc.) that it maintains in its storage 2615 to the controller cluster, which then assesses this data to determine whether a service chain's implementation should be modified.

Figure 27:
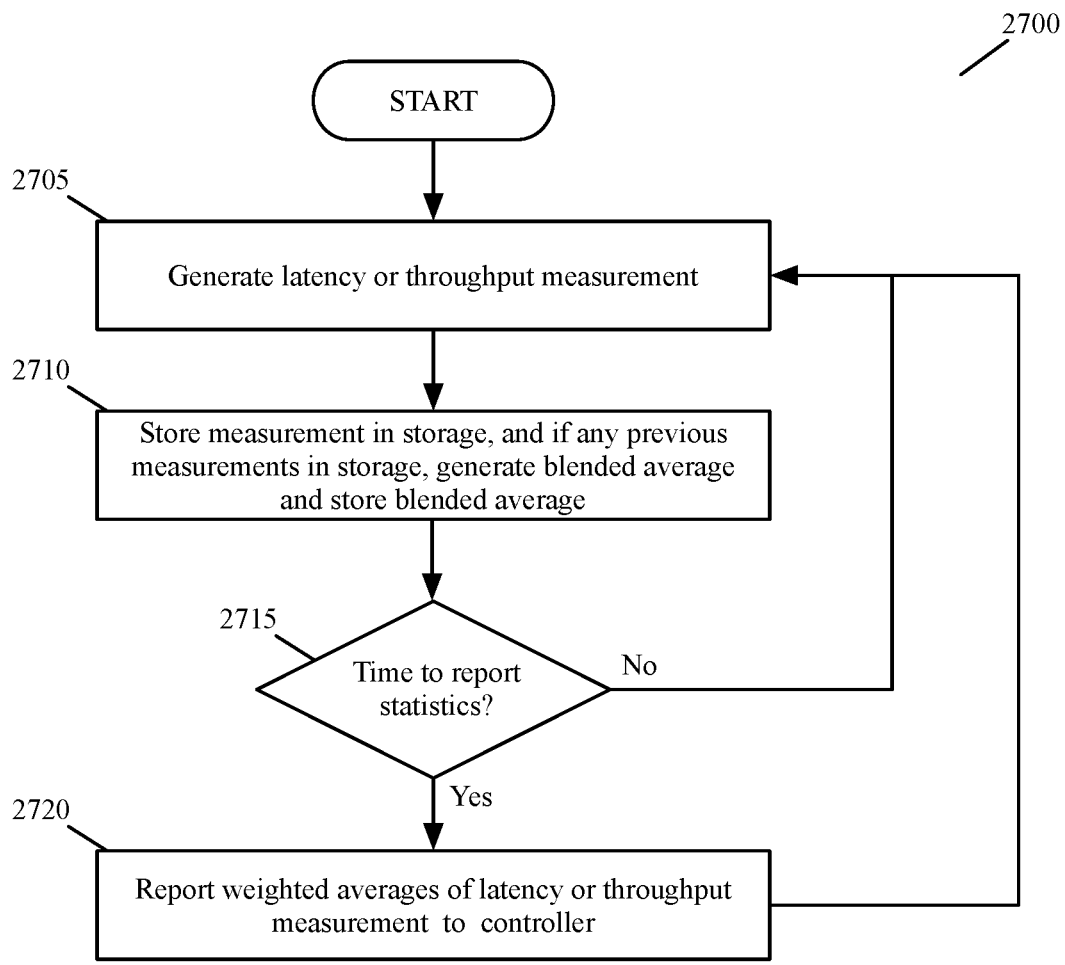
FIG. 27 conceptually illustrates a process of some embodiments for calculating and reporting statistics of a service node at a service proxy.

FIG. 27 conceptually illustrates a process 2700 that the service proxy performs in some embodiments to calculate and report statistics for its associated service node. In some embodiments, the service proxy continuously performs the process 2700 while the proxy and its corresponding service node are operational. The process 2700 starts when the process generates (at 2705) a statistical measurement regarding the operation of its service node. In some embodiments, the measurement generated at 2705 can be either a latency value or a throughput value of the service node. The process 2700 then stores (at 2710) the generated measurement in the data storage 2615 in FIG. 26 when it is the first measurement of its kind (i.e., it is the first latency value or first throughput value) for the reporting period.

When this measurement is not the first measurement of its kind for the reporting period, the process averages (at 2710) the generated measurement (i.e., averages the generated latency) with the previous measurement or average measurement (i.e., with the previous latency or average latency) stored in the data storage 2615. In some embodiments, the service proxy calculates weighted averages of each measurement to be more heavily weighted to recent throughput or latency measurements (i.e., uses a larger weight value for the measurement value computed at 2705 than the measurement value or average measurement value retrieved from the storage 2615). After generating an average measurement value at 2710, the process (at 2710) stores back in the data storage 2615 the average measurement value.

The process 2700 next determines (at 2715) whether it is time to report the statistics. If it is not time to report the statistics, the process 2700 returns to operations 2705 where it waits until it generates another measurement value (e.g., another latency or throughput value) for its service proxy. On the other hand, when the process determines (at 2715) that it is time to report the generated statistics, the process 2700 reports (at 2720) the generated measurements (e.g., the generated latency and throughput measurements) to the controller cluster. It then returns to operation 2705, where it waits until it generates another measurement value (e.g., another latency or throughput value) for its service proxy.

After the service proxies of some embodiments collect operational statistics, these statistics are sent to a central controller for further aggregation, storage in a database, and analysis. The database of some embodiments may be used to provide operational data to a user, as previously described. In addition to or instead of using the database for providing operational data to a user, the aggregated statistics in the database may be analyzed in order to automatically adjust a service chain for better results.

Figure 28:
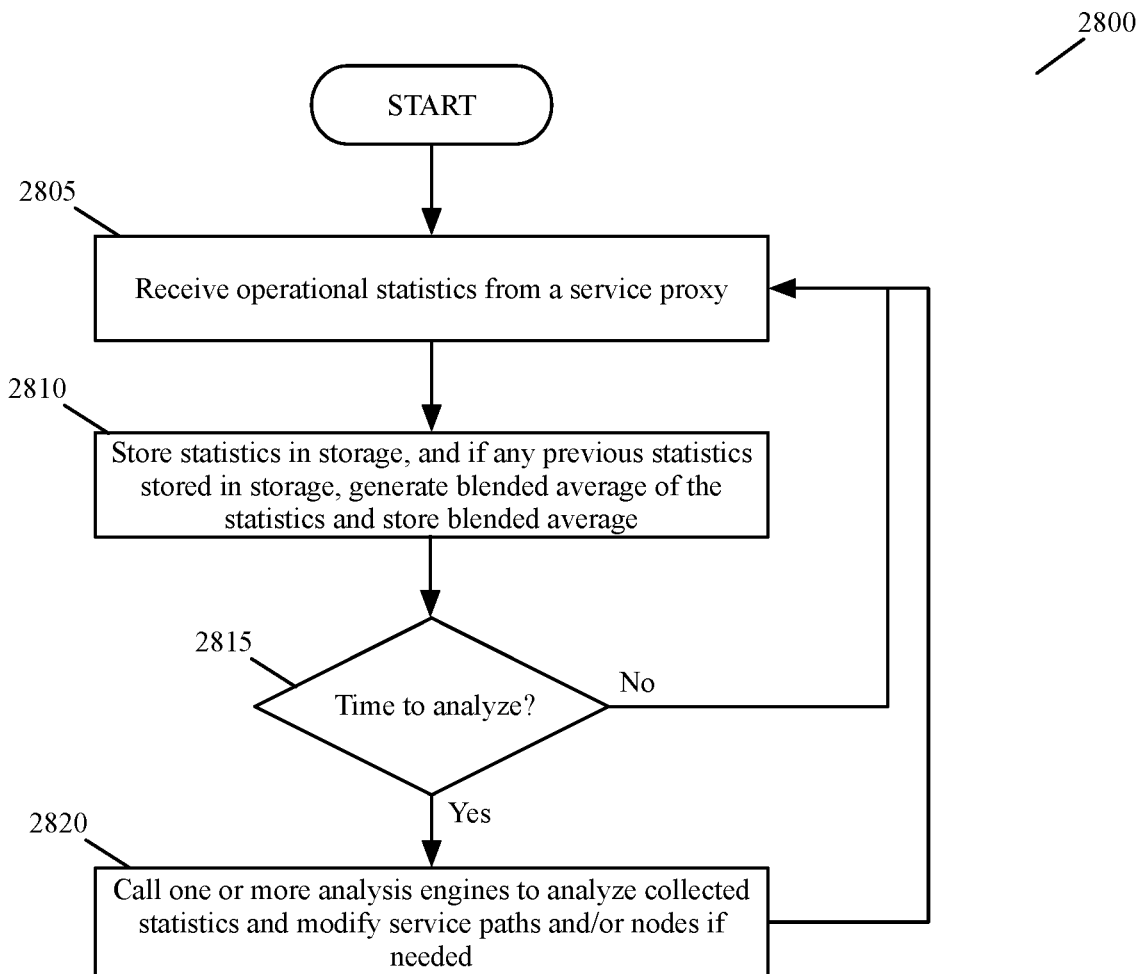
FIG. 28 conceptually illustrates a process of some embodiments for receiving, storing, and analyzing, at a central controller, statistics from a service proxy.

FIG. 28 conceptually illustrates a process 2800 of some embodiments for receiving, storing, and analyzing, at a central controller, statistics from a service proxy. The process 2800 starts when the central controller receives (at 2805) operational statistics from a service proxy. In some embodiments, these operational statistics are forwarded periodically by the service proxy to the controller cluster. In other embodiments, the operational statistics may be received after the controller commands the service proxy to send the statistics.

After receiving the statistics from the service proxy, the process 2800 stores (at 2810) them in a database. If any previous statistics from that proxy are stored in the database, the process generates blended averages of the statistics and stores the blended averages in the database. By storing blended averages, the central controller further smooths the data received from the service proxy. After storing the statistics, the process 2800 determines (at 2815) whether it is time to analyze them. If it is not time to analyze the stored statistics, then the process 2800 returns to operation 2805 to receive more operational statistics. If it is time to analyze the stored statistics, then the process 2800 calls (at 2820) one or more analysis engines to analyze collected statistics. The central controller will modify service paths or nodes if the analysis indicates that changes to the service paths are needed. One of ordinary skill in the art will understand that although one iteration through operations 2805-2815 receives and blends statistics from a single node, that the analysis engines called in operation 2820 may analyze statistics from multiple nodes (e.g., all nodes in a service chain). The network of some embodiments uses a single server (e.g., a server implementing the central controller) to both collect and analyze the data relating to a particular service chain. In other embodiments, the analysis engines run on a separate server or servers from the central controller. Examples of analysis of statistics of nodes and modification of service paths and service nodes are described in the following three figures.

One problem encountered with service chains is a failure of a single service node. When this failure results in a service node that is inoperative, too slow, generating too many errors, or otherwise falling below a performance threshold, the system of some embodiments alters the service paths of the service chain by restarting or remediating the failing service node.

Figure 29:
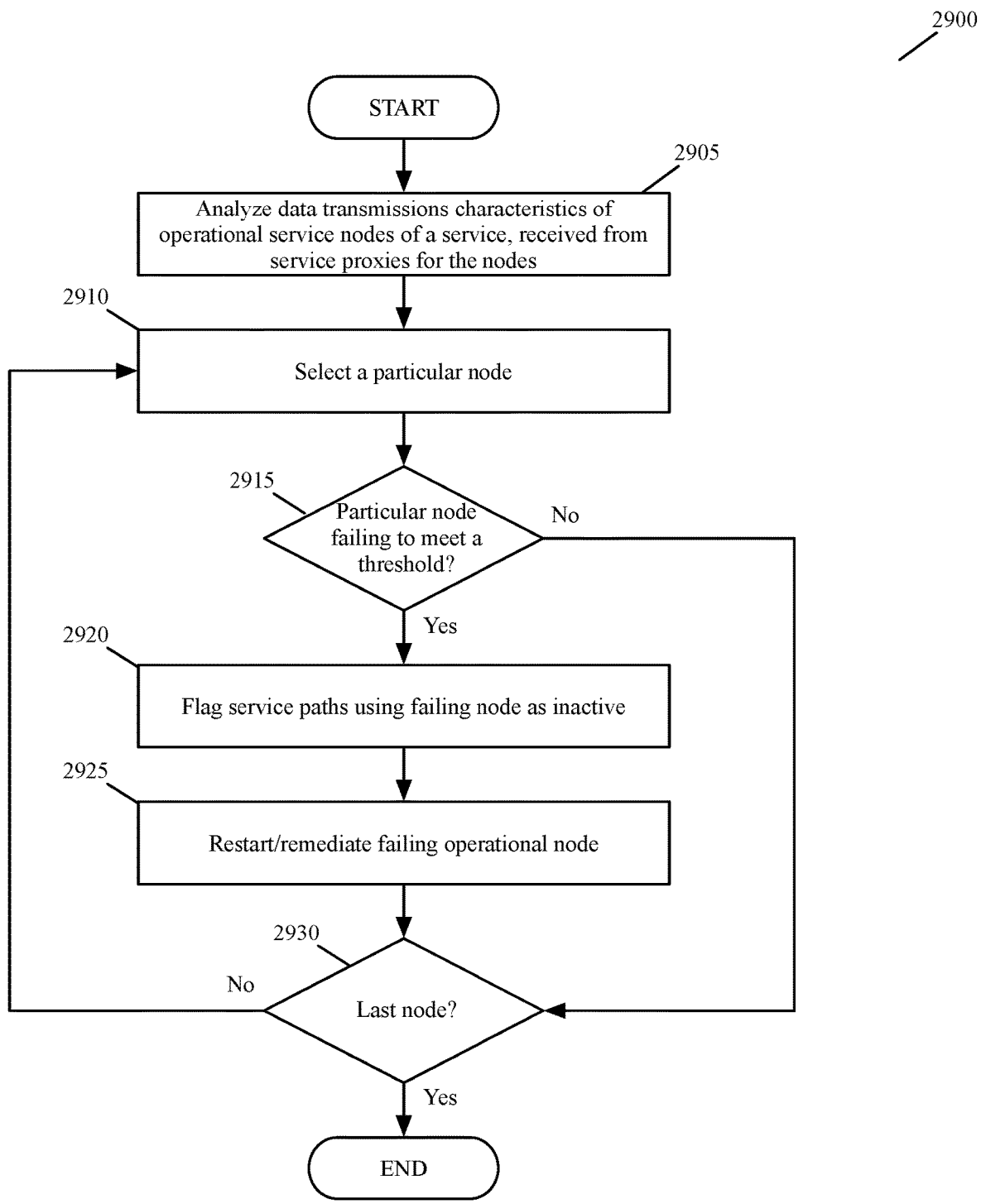
FIG. 29 illustrates a process for automatically restarting/remediating an operational service node when the particular service node fails to meet a threshold.

FIG. 29 illustrates a process for automatically restarting/remediating an operational service node when the particular service node is fails to meet a threshold. Not operating properly could include, for example, producing excessive errors, operating too slowly, pausing unexpectedly, etc.

The process 2900 analyzes (at 2905) data transmission characteristics of operational service nodes of a service. The data transmission characteristics received from service proxies for the nodes. Although the process 2900 analyzes nodes of a particular service, in some embodiments a similar process analyzes all nodes in a service chain. As mentioned with respect to FIG. 28, above, the analysis may be by an analysis engine called by a central controller.

The process 2900 selects (at 2910) a particular node. The processes 2900 of some embodiments may have some pre-filtering to select the node to be examined. For example, in some embodiments, an analysis engine may select a node if the service proxy of that node has flagged it as failing. In other embodiments, the process 2900 selects each node of a service until all the nodes have been selected.

If the performance of the node meets (at 2915) a threshold, then the process 2900 proceeds to operation 2930. If the performance of the service node fails to meet (at 2915) the threshold, then the process 2900 proceeds to operation 2920. The process 2900 then flags (at 2920) the service paths using the failing node as inactive. The service paths are flagged as inactive in order to stop data traffic through the node before restarting or otherwise remediating whatever problem is causing the node to fail. The networks of some embodiments use a centralized service to generate a service path index. The networks of other embodiments generate service paths dynamically in a decentralized manner. In embodiments that use a single service path index, the process 2900 flags service paths as inactive by identifying which specific paths in the service path index pass through the failing node and designating those paths as inactive. In embodiments where the service paths are generated dynamically in a decentralized manner, the process 2900 flags service paths as inactive by notifying the service path generators not to use the failing node as part of a service path.

The process then restarts the node or performs other actions that remediate the problem with the node (at 2925). If (at 2930) the process has not analyzed all the nodes, then the process returns to operation 2910 and selects another node. If (at 2930) the process has analyzed all the nodes, then the process 2900 ends.

Even when all nodes of a service operation are functioning properly, the load on that service may be more than the existing nodes of the service can handle. Accordingly, in some embodiments, analysis is directed toward a service operation as a whole, rather than at individual nodes of that service (e.g., after the individual nodes are found to be working properly). In such cases, the method of some embodiments adds new service nodes and new service paths to handle the load. Instantiating the new service node in some embodiments is in response to operational data indicating that a throughput or latency of one or more service nodes implementing the particular service is beyond a threshold (e.g., lower than a set minimum threshold or above a set maximum threshold).

Figure 30:
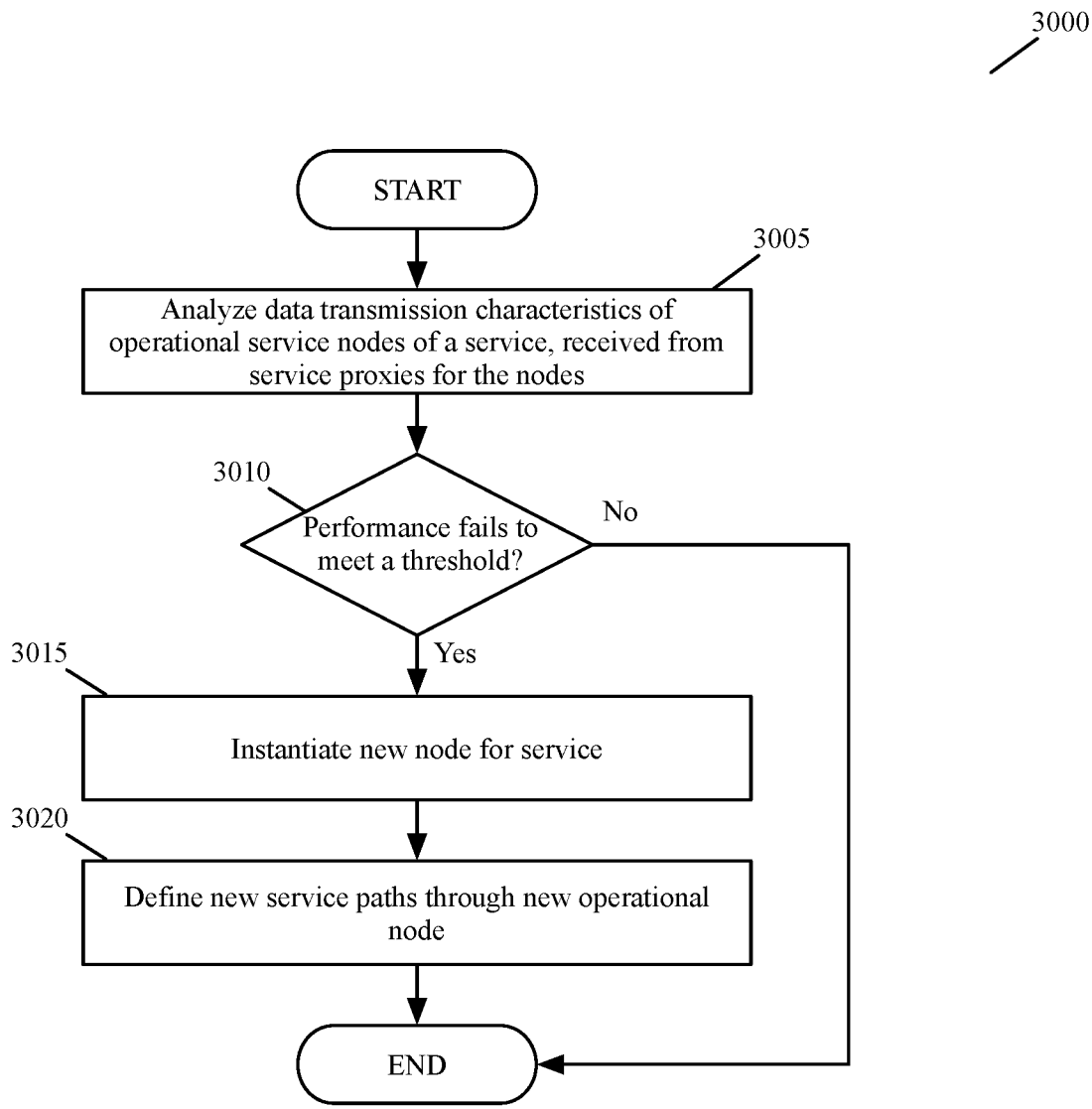
FIG. 30 illustrates a process for automatically adding a new service node when the performance of the service nodes implementing a particular service fail to meet a threshold.

FIG. 30 illustrates a process 3000 for automatically adding a new service node when the collective performance of service nodes implementing a service path fail to meet a threshold. The process 3000 is used in some embodiments to identify and remediate cases where the nodes that perform a particular service are collectively overwhelmed by the amount of data to be processed by that service.

The process 3000 analyzes (at 3005) data transmission characteristics of operational service nodes of a service. The data transmission characteristics are received from service proxies for the nodes. If the performance of the service nodes performing that service meets (at 3010) a threshold, then the process 3000 ends. If the performance of the service nodes of a service fails to meet (at 3010) the threshold, then the process 3000 proceeds to operation 3015.

The process 3000 then instantiates (at 3015) a new node for the service. The process 3000 also defines (at 3020) new service paths through the new operational node. In some embodiments, defining new service paths for a new operational node includes eliminating one or more existing service paths through already operational service nodes. In other embodiments, existing service paths are not eliminated, but the amount of data messages through the paths is reduced. The central controllers of some embodiments may reduce the amount of data messages through existing paths and increase the amount of data messages through new paths by adjusting a set of weighting values in selection metrics that are then distributed to host machines of the network that use those selection metrics to determine when to add a new data flow to a service path.

Another issue for a network implementing service chains is that the flow of data traffic for a particular service chain will not be constant. When more data traffic is sent through a service chain, the network may add additional service nodes to handle the increased traffic. However, when the data traffic drops for a particular chain, there may be more service nodes for a particular service node than are needed to process the data traffic at that time. Accordingly, the method of some embodiments may deactivate an existing service node that is implementing a particular service and eliminate the paths through that node. Deactivating the existing service node in some embodiments may be in response to operational data indicating that a throughput or latency of one or more service nodes implementing the particular service is beyond a threshold.

In some cases, a particular node may be underused, not because there is too little data traffic for the service, but because other nodes of the service are being overused. Therefore, in some embodiments when a node is found to be underused, the analysis engines determine whether other nodes of that service are overused (indicating rebalancing of data allocation is needed). If none of the nodes are overused, then the underused node is shut down.

Figure 31:
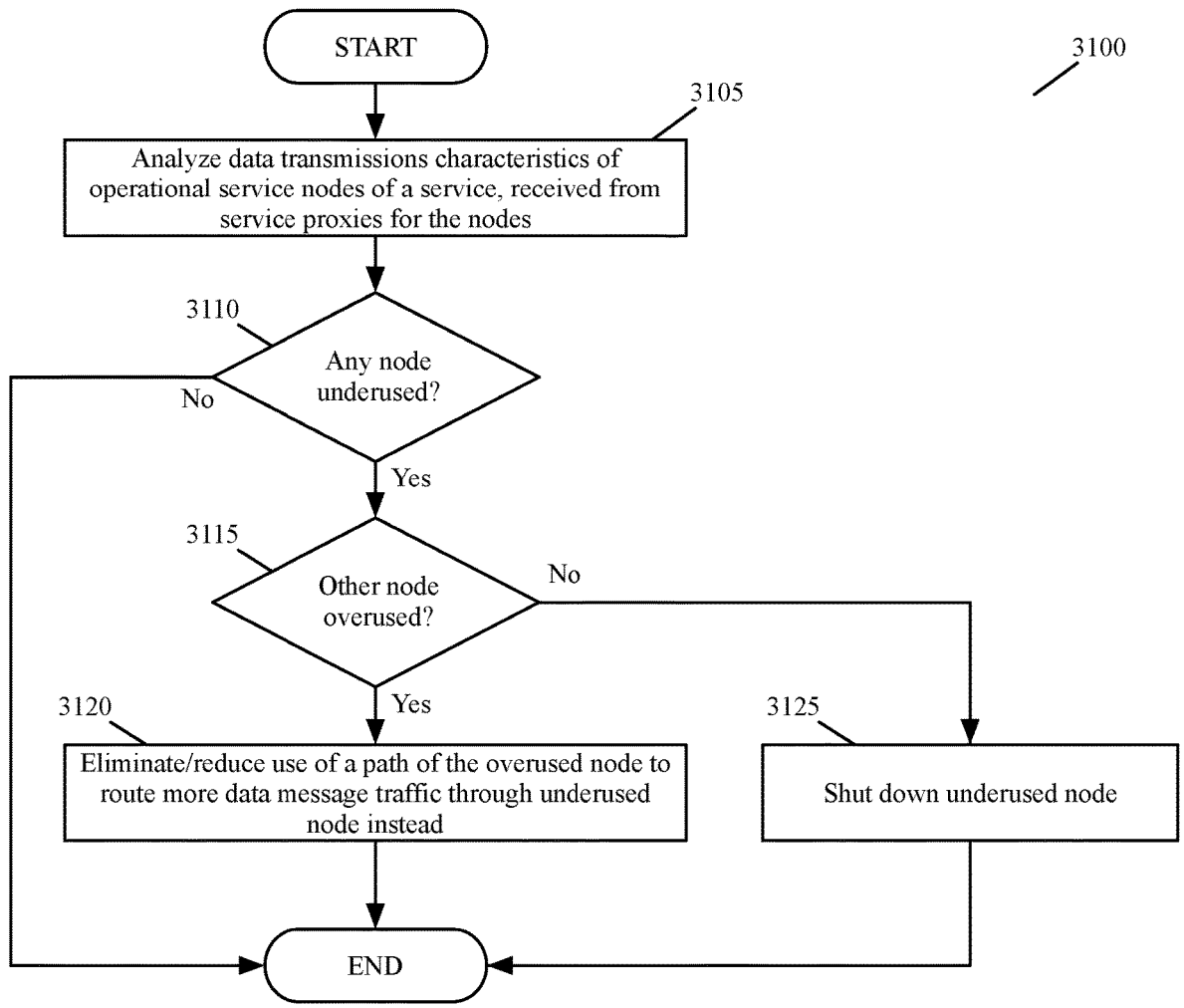
FIG. 31 illustrates a process for automatically shifting data traffic to underused nodes of a service or recovering resources from an underused node of a service.

FIG. 31 illustrates a process for automatically shifting data traffic to underused nodes of a service or recovering resources from an underused node of a service. Some embodiments shift data traffic to an underused node by (1) eliminating or reducing the use of paths through other, overused, nodes of the service and (2) instantiating new paths that pass through the underused node.

The process 3100 analyzes (at 3105) data transmission characteristics of operational service nodes of a service. The data transmission characteristics are received from service proxies for the nodes. The process 3100 determines (at 3110) whether any node is underused. An example of an indicator of an underused node would be a low throughput resulting from a low amount of data messages received rather than from a delay in processing the data messages that are received.

If no node is underused, the process 3100 ends. If a node is underused, the process 3100 determines (at 3115) whether any other node(s) is/are overused. In some embodiments, a node may be overused because too many service paths are using that node. In some embodiments, in addition to or instead of too many service paths using a node, the service paths using that node may be handling too much data.

If another node is overused, the process eliminates (at 3120) or reduces the amount of data message traffic sent on, one or more paths through the overused node. Some or all of the data message traffic through those path is then routed through existing or new path(s) through the underused node. That is, the process increases the load of the underused node while decreasing the lode of the overused node. If no other node is overused, the process shuts down (at 3125) the underused node. In some embodiments, shutting down the underused node is preceded by an operation to flag the paths through the node as inactive, as described with respect to operation 2920 of FIG. 29, above.

In some embodiments, the data sent along a particular path is sent on a per flow basis. That is, when a new flow (e.g., a flow defined by a five-tuple with source and destination IP addresses, source and destination port numbers, and packet protocol, or a tuple with fewer/more attributes) is received by the service chain, the flow is assigned to a particular path by a service insertion pre-processor of a host. The service insertion pre-processor of some embodiments uses selection metrics stored in a path table on the host to determine which path to assign a particular flow to. In some embodiments, the selection metrics are set by a network controller on a server, such as the central controller described with respect to FIG. 28. The central controller of some embodiments, after having the collected statistics analyzed, changes the weights of the selection criteria in the selection metric in favor of paths through underutilized nodes and against paths through overused nodes. The network controller then distributes the updated selection metrics (e.g., through a rule distributor 1814 of FIG. 18) path tables of the hosts.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 32 conceptually illustrates a computer system 3200 with which some embodiments of the invention are implemented. The computer system 3200 can be used to implement any of the above-described hosts, controllers, and managers. As such, it can be used to execute any of the above described processes. This computer system includes various types of non-transitory machine readable media and interfaces for various other types of machine readable media. Computer system 3200 includes a bus 3205, processing unit(s) 3210, a system memory 3225, a read-only memory 3230, a permanent storage device 3235, input devices 3240, and output devices 3245.

The bus 3205 collectively represents all system, peripheral, and chipset buses that communicatively connect the numerous internal devices of the computer system 3200. For instance, the bus 3205 communicatively connects the processing unit(s) 3210 with the read-only memory 3230, the system memory 3225, and the permanent storage device 3235.

From these various memory units, the processing unit(s) 3210 retrieve instructions to execute and data to process in order to execute the processes of the invention. The processing unit(s) may be a single processor or a multi-core processor in different embodiments. The read-only-memory (ROM) 3230 stores static data and instructions that are needed by the processing unit(s) 3210 and other modules of the computer system. The permanent storage device 3235, on the other hand, is a read-and-write memory device. This device is a non-volatile memory unit that stores instructions and data even when the computer system 3200 is off. Some embodiments of the invention use a mass-storage device (such as a magnetic or optical disk and its corresponding disk drive) as the permanent storage device 3235.

Other embodiments use a removable storage device (such as a flash drive, etc.) as the permanent storage device. Like the permanent storage device 3235, the system memory 3225 is a read-and-write memory device. However, unlike storage device 3235, the system memory is a volatile read-and-write memory, such a random access memory. The system memory stores some of the instructions and data that the processor needs at runtime. In some embodiments, the invention's processes are stored in the system memory 3225, the permanent storage device 3235, and/or the read-only memory 3230. From these various memory units, the processing unit(s) 3210 retrieve instructions to execute and data to process in order to execute the processes of some embodiments.

The bus 3205 also connects to the input and output devices 3240 and 3245. The input devices enable the user to communicate information and select commands to the computer system. The input devices 3240 include alphanumeric keyboards and pointing devices (also called "cursor control devices"). The output devices 3245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 32, bus 3205 also couples computer system 3200 to a network 3265 through a network adapter (not shown). In this manner, the computer can be a part of a network of computers (such as a local area network ("LAN"), a wide area network ("WAN"), or an Intranet, or a network of networks, such as the Internet. Any or all components of computer system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Even though the service insertion rules in several of the above-described examples provide service chain identifiers, some of the inventions described herein can be implemented by having a service insertion rule provide the service identifiers (e.g., SPIs) of the different services specified by the service insertion rule. Similarly, several of the above-described embodiments perform distributed service routing that relies at each service hop identifying a next service hop by performing an exact match based on the SPI/SI values. However, some of the inventions described herein can be implemented by having the service insertion pre-processor embed all the service hop identifiers (e.g., service hop MAC addresses) as the data message's service attribute set and/or in the data message's encapsulating service header.

In addition, some embodiments decrement the SI value differently (e.g., at different times) than the approaches described above. Also, instead of performing the next hop lookup just based on the SPI and SI values, some embodiments perform this lookup based on the SPI, SI and service direction values as these embodiments use a common SPI value for both the forward and reverse directions of data messages flowing between two machines.

The above-described methodology is used in some embodiments to express path information in single tenant environments. Thus, one of ordinary skill will realize that some embodiments of the invention are equally applicable to single tenant datacenters. Conversely, in some embodiments, the above-described methodology is used to carry path information across different datacenters of different datacenter providers when one entity (e.g., one corporation) is a tenant in multiple different datacenters of different providers. In these embodiments, the tenant identifiers that are embedded in the tunnel headers have to be unique across the datacenters, or have to be translated when they traverse from one datacenter to the next. Thus, one of ordinary skill in the art would understand that the invention is not to be limited by the foregoing illustrative details, but rather is to be defined by the appended claims.

What is claimed is:

1. A method for monitoring a particular service chain comprising a plurality of services to perform on a set of data messages passing through a network, the method comprising:
   providing a user interface for a user to employ in order to select the particular service chain from a plurality of service chains, the particular service chain implemented by a plurality of service paths each of which comprises a plurality of service nodes that perform the plurality of services of the service chain on the set of data messages passing through the network;
   receiving, through the user interface, the user's selection of the particular service chain;
   in response to the received user selection, generating a graphical display of the plurality of service paths through the plurality of service nodes; and
   as part of the graphical display, providing operational data relating to operations of the plurality of service nodes of the plurality of service paths.

2. The method of claim 1, wherein the graphical display comprises a node representation of each service node and a link connecting the node representations of each successive pair of service nodes in at least one service path.

3. The method of claim 1, wherein the graphical display comprises a concurrent representation of the plurality of service paths.

4. The method of claim 1 further comprising updating the graphical display to add a node representation of a newly implemented service node or to remove a node representation of a service node that is no longer implemented.

5. The method of claim 1, wherein operational data for a service node is provided after receiving a selection of the service node.

6. The method of claim 5, wherein receiving the user's selection comprises receiving a cursor click operation.

7. The method of claim 5, wherein receiving the user's selection comprises receiving a cursor hover operation.

8. The method of claim 1 further comprising, as part of the graphical display, providing operational data relating to operations of a set of service nodes on an individual service path after receiving a selection of the individual service path.

9. The method of claim 1 further comprising, as part of the graphical display, after receiving a selection of a particular service, providing operational data relating to operations of a set of service nodes that each implement an instantiation of the particular service.

10. The method of claim 1, wherein generating the graphical display further comprises providing an interface option for instantiating an additional service node for a particular service.

11. The method of claim 1, wherein generating the graphical display further comprises providing an interface option for deactivating a particular service node.

12. The method of claim 1, wherein generating the graphical display further comprises providing an interface option for restarting a particular service node.

13. The method of claim 1, wherein generating the graphical display further comprises providing an interface option for setting a threshold for a performance parameter for a service chain and providing a visual cue to indicate that the performance parameter is beyond the threshold.

14. The method of claim 1, wherein generating the graphical display further comprises providing an interface option for setting a threshold for a performance parameter for a particular service and providing a visual cue to indicate that the performance parameter is beyond the threshold.

15. The method of claim 1, wherein a particular service node is implemented on a device and providing the operational data comprises processing operational statistics received from a service proxy implemented on the device.

16. The method of claim 15, wherein the device is a service appliance.

17. The method of claim 15, wherein the device is a host computer of the network.

18. The method of claim 1, wherein a particular service node is implemented on a first device and the operational data is at least partly generated by processing operational statistics received from a service proxy implemented on a second device.

19. The method of claim 1, wherein the operational data comprises operational statistics based on data received from a service proxy that collects data transmission characteristics relating to a particular service node.

20. The method of claim 19, wherein the operational statistics are calculated by the service proxy from the data transmission characteristics relating to the particular service node.

21. The method of claim 19, wherein the operational statistics are calculated by a server of the network based on the data transmission characteristics relating to the particular service node.

22. The method of claim 19, wherein the operational statistics are calculated by a server of the network based on data received from a service proxy, the data comprising data calculated at the service proxy from the data transmission characteristics relating to the particular service node.

23. The method of claim 19, wherein the data transmission characteristics comprise latency of a service node.

24. The method of claim 19, wherein the data transmission characteristics comprise throughput of a service node.

25. The method of claim 19, wherein the operational data includes data received from the service proxy relating to packets received by a particular service node.

26. The method of claim 19, wherein the operational data includes data received from the service proxy relating to sizes of payloads of data messages received by a particular service node.

27. The method of claim 1, wherein a service node provides a particular service for a plurality of service paths of the service chain.

28. The method of claim 1, wherein the network is a telecommunications network and the particular service chain comprises a set of service operations each applied to a particular type of data message flow.

29. The method of claim 1 further comprising defining the plurality of service paths for the particular service chain.

30. The method of claim 1, wherein the service nodes comprise at least one of: a service implemented on a virtual machine (VM), a service implemented on a container, and a service implemented by an appliance.

31. A non-transitory machine readable medium storing a program for monitoring a particular service chain comprising a plurality of services to perform on a set of data messages passing through a network, the program comprising instructions for:
providing a user interface for a user to employ in order to select the particular service chain from a plurality of service chains, the particular service chain implemented by a plurality of service paths each of which comprises a plurality of service nodes that perform the plurality of services of the service chain on the set of data messages passing through the network;
receiving, through the user interface, the user's selection of the particular service chain;
in response to the received user selection, generating a graphical display of the plurality of service paths through the plurality of service nodes; and
as part of the graphical display, providing operational data relating to operations of the plurality of service nodes of the plurality of service paths.

32. The non-transitory machine readable medium of claim 31, wherein the graphical display comprises a node representation of each service node and a link connecting the node representations of each successive pair of service nodes in at least one service path.

33. The non-transitory machine readable medium of claim 31, wherein the graphical display comprises a concurrent representation of the plurality of service paths.

34. The non-transitory machine readable medium of claim 31 further comprising updating the graphical display to add a node representation of a newly implemented service node or to remove a node representation of a service node that is no longer implemented.

35. A computer comprising:
a set of processing units for executing instructions; and
a non-transitory machine readable medium storing a program for monitoring a particular service chain comprising a plurality of services to perform on a set of data messages passing through a network, the program comprising instructions for:
providing a user interface for a user to employ in order to select the particular service chain from a plurality of service chains, the particular service chain implemented by a plurality of service paths each of which comprises a plurality of service nodes that perform the plurality of services of the service chain on the set of data messages passing through the network;
receiving, through the user interface, the user's selection of the particular service chain;
in response to the received user selection, generating a graphical display of the plurality of service paths through the plurality of service nodes; and
as part of the graphical display, providing operational data relating to operations of the plurality of service nodes of the plurality of service paths.

* * * * *